(12) United States Patent
Shao-Horn et al.

(10) Patent No.: US 11,575,169 B2
(45) Date of Patent: Feb. 7, 2023

(54) METAL-OXYGEN BATTERY AND COMPONENTS THEREOF

(71) Applicant: MASSACHUSETTS INSTITUTE OF TECHNOLOGY, Cambridge, MA (US)

(72) Inventors: Yang Shao-Horn, Newton, MA (US); Jeremiah Johnson, Boston, MA (US); Wenxu Zhang, Cambridge, MA (US); Mingjun Huang, Everett, MA (US); Shuting Feng, Cambridge, MA (US); Livia Giordano, Cambridge, MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 0 days.

(21) Appl. No.: 16/442,426

(22) Filed: Jun. 14, 2019

(65) Prior Publication Data
US 2019/0386363 A1 Dec. 19, 2019

Related U.S. Application Data

(60) Provisional application No. 62/685,263, filed on Jun. 14, 2018.

(51) Int. Cl.
*H01M 12/08* (2006.01)
*H01M 12/02* (2006.01)
*C08G 81/02* (2006.01)

(52) U.S. Cl.
CPC .......... *H01M 12/08* (2013.01); *C08G 81/024* (2013.01); *H01M 12/02* (2013.01); *H01M 2300/0082* (2013.01); *H01M 2300/0091* (2013.01)

(58) Field of Classification Search
CPC ................ H01M 12/02; H01M 12/08; H01M 2300/0082; H01M 2300/0085; H01M 2300/0091
See application file for complete search history.

(56) References Cited

U.S. PATENT DOCUMENTS

| 2,615,000 A * | 10/1952 | Harris ........................ C08F 8/32 528/386 |
| 3,417,061 A * | 12/1968 | Beermann .................. C08F 8/32 525/344 |
| 6,013,374 A * | 1/2000 | Watanabe ............ H01M 50/172 428/424.8 |
| 11,186,945 B1 * | 11/2021 | O'Bryan ............. D06M 13/322 |
| 2018/0351161 A1 * | 12/2018 | Liu ........................ C08F 220/34 |
| 2019/0144611 A1 * | 5/2019 | Wagener ............. H01M 8/1032 528/391 |

OTHER PUBLICATIONS

Van Hensbergen, T. W. Gaines, K. B. Wagener, R. P. Burford, A. B. Lowe. Functional α,ω-dienes via thiol-Michael chemistry: synthesis, oxidative protection, acyclic diene metathesis (ADMET) polymerization and radical thiol-ene modification, Polym. Chem., 2014, 5, 6225.*

N. K. Boaen and M. A. Hillmyer. Post-polymerization functionalization of polyolefins, Chem. Soc. Rev., 2005, 34, 267-275.*

S. Cerezo, J. Cortés, M. Moreno-Mañas, R. Pleixats, A. Roglans. Palladium(0)-Catalyzed Allylation of Highly Acidic and Non-nucleophilic Arenesulfonamides, Sulfamide, and Cyanamide. I, Tetrahedron 54 (1998) 14869-14884.*

* cited by examiner

*Primary Examiner* — Carlos Barcena
(74) *Attorney, Agent, or Firm* — Honigman LLP

(57) ABSTRACT

A metal-oxygen battery can provide improved energy storage and transportation applications due to high gravimetric energies, and such a metal-oxygen battery can include a polyolefin including a plurality of functional groups such as sulfamide, sulfoxy, carbonyl, phosphoramide or heterocyclic groups.

25 Claims, 48 Drawing Sheets

- Electrolyte: 6 polymer films ([Monomer]:[LiTFSI] = 12 : 1)
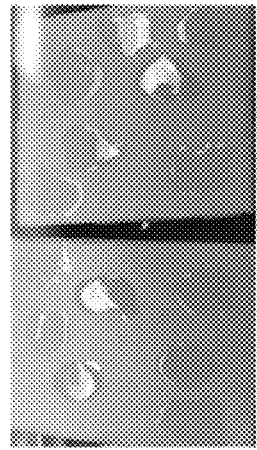
- Positive electrode: TiC:PTFE = 95:5 Coated on stainless steel mesh with polymer; 5 mm diameter
  $m_{TiC} = 0.278$ mg; $m_{polymer} = 3.67$ mg
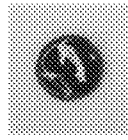
- Polyethylene washer (thickness ~ 0.8 mm) added to prevent shorting
- Negative electrode: Li metal
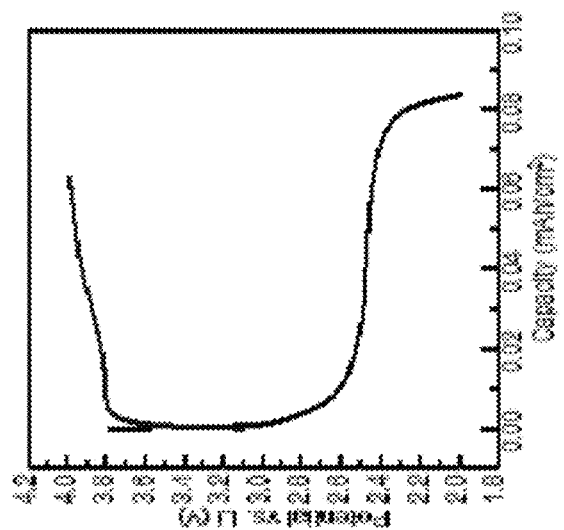
FIG. 28
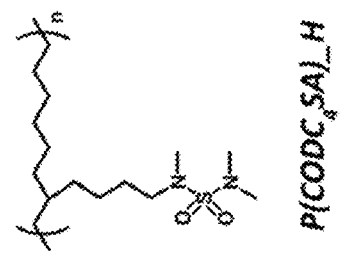
P(CODC$_8$SA)_H

METAL-OXYGEN BATTERY AND COMPONENTS THEREOF

CLAIM OF PRIORITY

This application claims priority to U.S. Provisional Application No. 62/685,263, filed Jun. 14, 2018, which is incorporated by reference in its entirety.

TECHNICAL FIELD

The invention relates to a metal-oxygen battery and components of a metal-oxygen battery.

BACKGROUND

Lithium-oxygen ($Li—O_2$) batteries show great promises in energy storage and transportation applications.

SUMMARY

Aprotic lithium-oxygen ($Li—O_2$) battery show great promises in energy storage and transportation applications owing to their high gravimetric energies that potentially represent a 3 to 5 times increase over lithium-ion batteries.

Solvents and polymers for a metal-oxygen battery can include an organic sulphur or nitrogen-containing component. The component can be aprotic.

In general, a composition can include a polyolefin including a plurality of functional groups, the functional groups including an aprotic polar group selected from the group consisting of sulfamide, sulfoxy, carbonyl, phosphoramide or heterocyclic groups.

In one aspect, a composition can include a polyolefin including a plurality of functional groups, the functional groups including an aprotic polar group selected from the group consisting of sulfamide, sulfoxy, carbonyl, phosphoramide or heterocyclic groups.

In certain circumstances, the polyolefin can include a polymer block selected from the group consisting of:

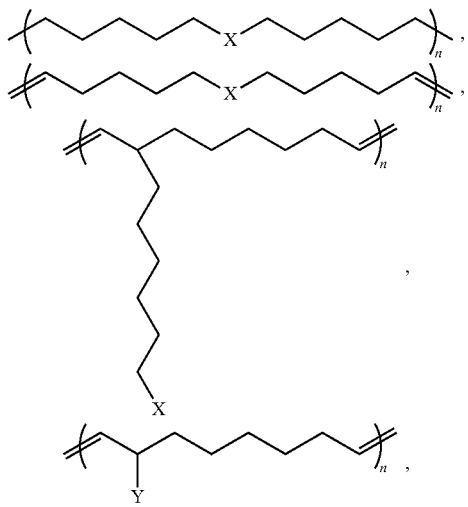

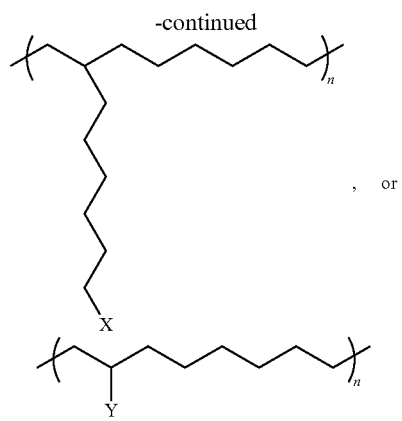

In certain embodiments, n can be 1 to 100,000, less than 50,000, less than 25,000, less than 20,000, less than 10,000, or less than 1,000. In other embodiments, n can be greater than 10, greater than 25, greater than 40, greater than 50, greater than 100, greater than 200, or greater than 250. In certain embodiments, X can be a functional group including one or more sulfamide, sulfoxy, carbonyl, phosphoramide or heterocyclic groups. In certain embodiments, Y can be a bond or a C1-C6 alkyl or alkenyl optionally interrupted by O, S or NR, where NR is N—C1-C6 alkyl and including a moiety having one or more functional group including sulfamide, sulfoxy, carbonyl, phosphoramide or heterocyclic groups.

In certain circumstances, X can be a monovalent or divalent moiety having a structure selected from the group consisting of

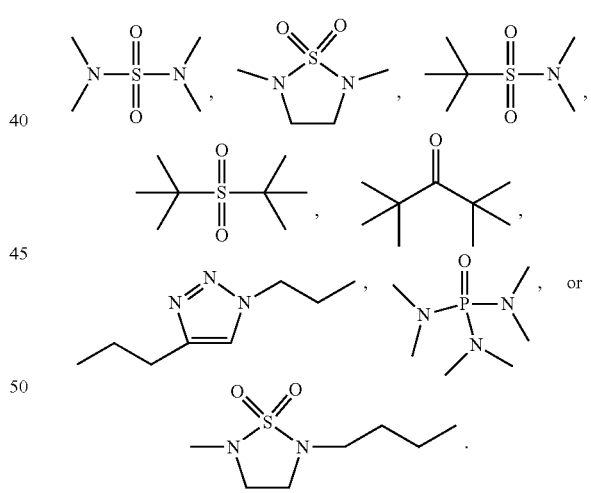

The monovalent moiety can be covalently bonded to the polymer at a single connection point. The divalent moiety can be covalently bonded to the polymer at two connection points, for example, in the polymer chain backbone.

In certain circumstances, Y can be a bond, in which case a functional group, for example, a polar aprotic group, is bonded directly to a polymer backbone.

In certain circumstances, Y can be a C1-C6 alkyl or alkenyl optionally interrupted by O, S or NR, where NR is N—C1-C6 alkyl, in which case a functional group, for example, a polar aprotic group, is bonded directly to an alkyl group pendant from polymer backbone In certain circumstances, the polyolefin can include a polymer block selected from the group consisting of:
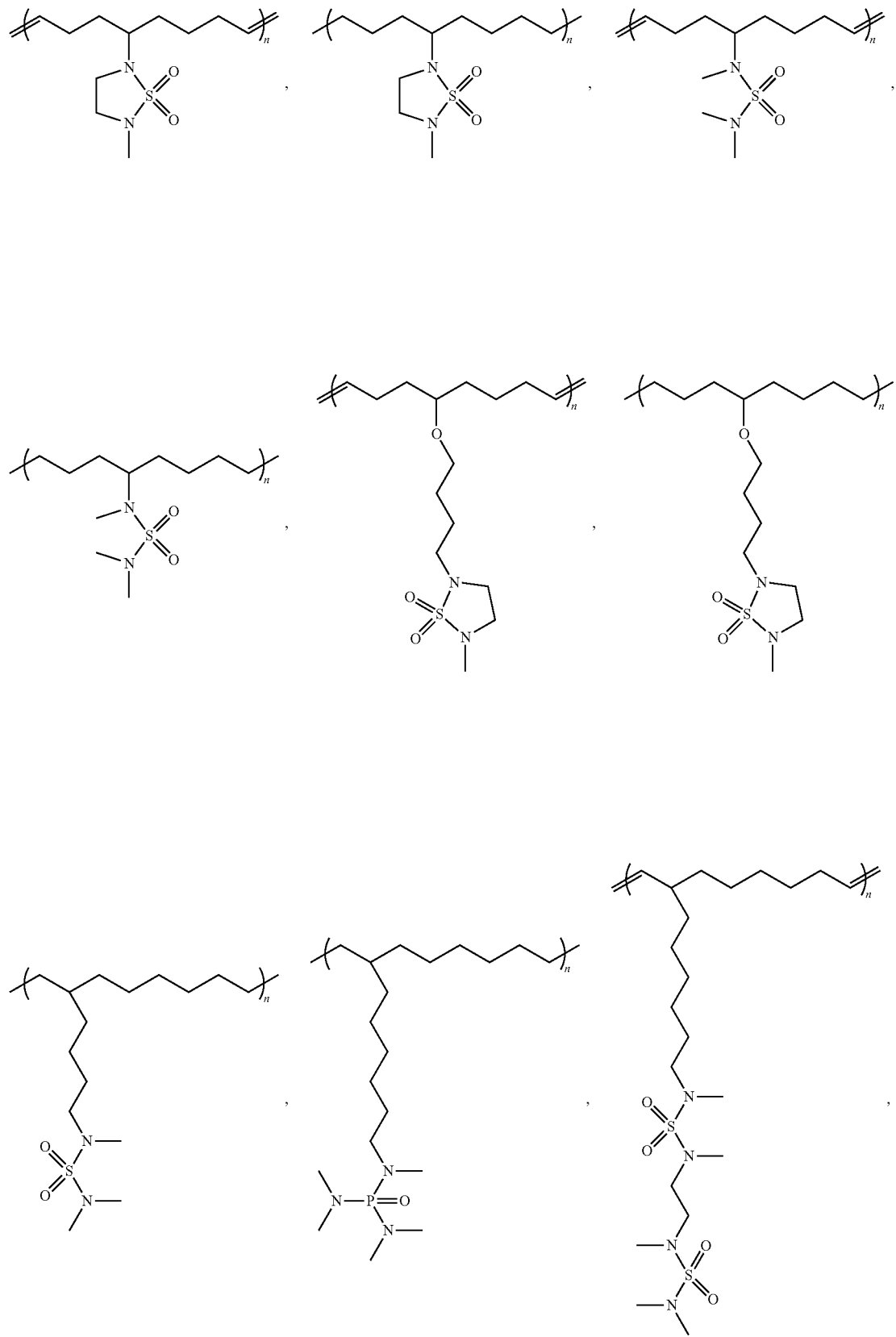

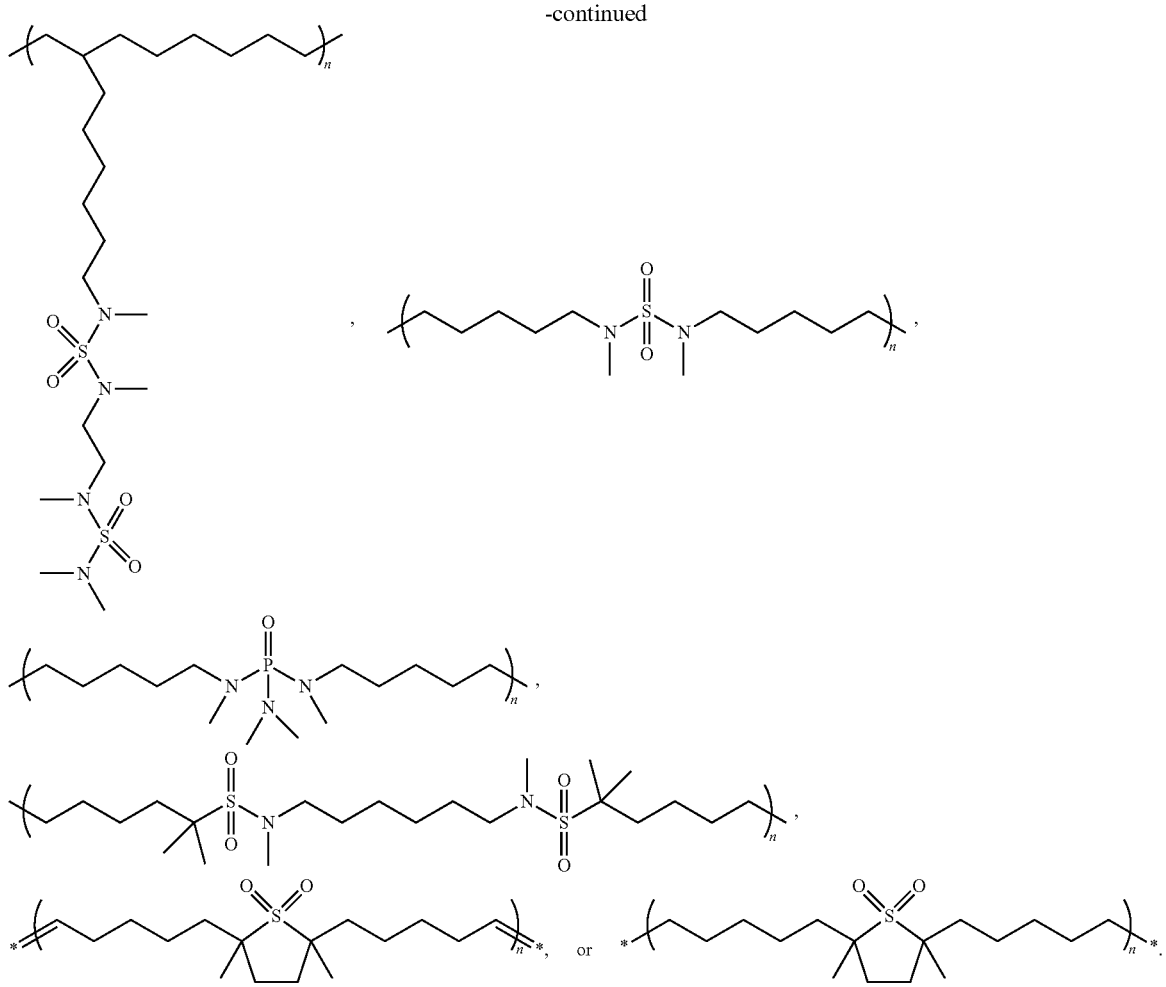

In another aspect, a battery can include a composition as described herein.

In another aspect, a battery can include a solvent including an aprotic polar group.

In certain circumstances, the aprotic polar group includes sulfamide, sulfoxy, carbonyl, phosphoramide or heterocyclic groups.

In certain circumstances, the solvent, or the aprotic polar group can include

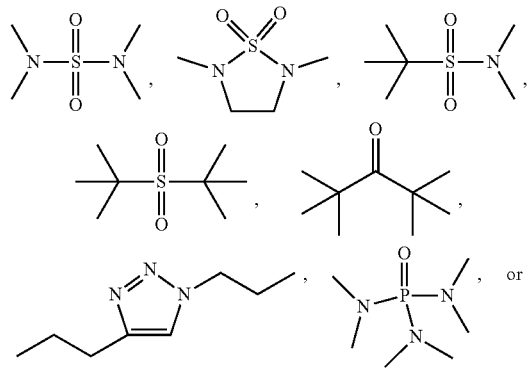

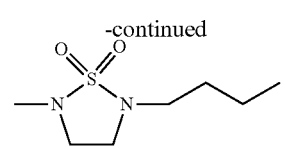

In certain circumstances, the battery can include a lithium salt electrolyte.

Other features, objects, and advantages will be apparent from the description, drawings, and claims.

BRIEF DESCRIPTION OF THE DRAWINGS

FIGS. 28-29 depict properties of batteries with polymers described herein, with different ratios of electrolyte to monomer groups.

DETAILED DESCRIPTION

Figure 1:
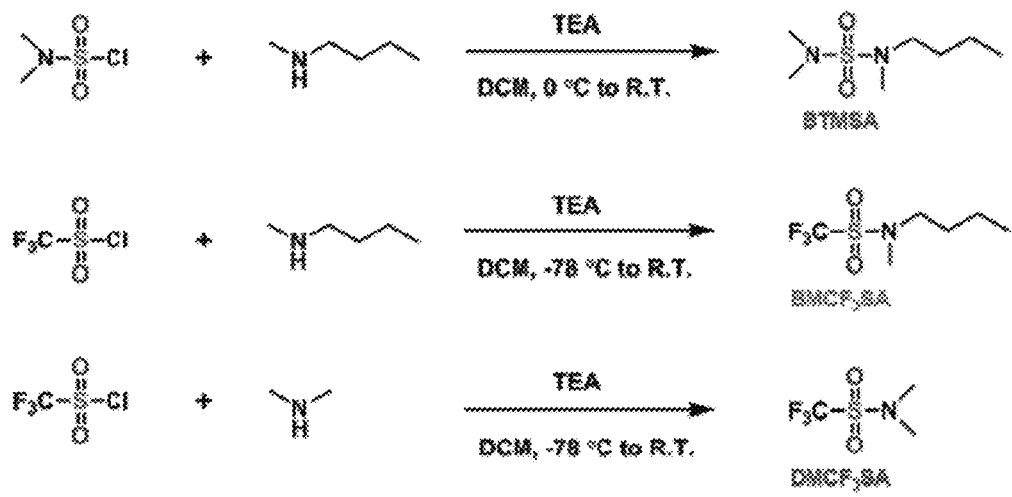
FIG. 1 depicts synthesis of aprotic solvents, for example, sulfamide- and sulfonamide-based solvents, BTMSA, BMCF3 SA, and DMCF3 SA.

Electrolyte instability is one of the most challenging impediments to practical Lithium-Oxygen (Li—$O_2$) battery operations. Sulfamide- and sulfonamide-based solvents can be designed for chemical and electrochemical oxidative stability in aprotic Li—$O_2$ batteries. All three solvents were found to be stable against lithium peroxide and potassium superoxide powders at 80° C. and under full discharge conditions. Sulfonamide-based solvents with electron-withdrawing trifluoromethyl functional group were found to be considerably stable against oxidation ($V_{ox}$>4.5 $V_{Li}$). Differential electrochemical mass spectrometry measurements showed oxygen as the vastly predominant gas evolved on charge. Results presented in this study demonstrate that sulfonamide-based solvents with thoughtfully designed molecular structures are promising candidates for aprotic Li—$O_2$ battery electrolytes.

Aprotic lithium-oxygen (Li—$O_2$) battery show great promises in energy storage and transportation applications owing to their high gravimetric energies that potentially represent a 3 to 5 times increase over lithium-ion batteries. See, for example, Lu, J.; Li, L.; Park, J.-B.; Sun, Y.-K.; Wu, F.; Amine, K. Aprotic and Aqueous Li—O 2 Batteries. Chem. Rev. 2014, 114 (11), 5611-5640; Lu, Y.-C.; Gallant, B. M.; Kwabi, D. G.; Harding, J. R.; Mitchell, R. R.; Whittingham, M. S.; Shao-Horn, Y. Lithium-Oxygen Batteries: Bridging Mechanistic Understanding and Battery Performance. Energy Environ. Sci. 2013, 6 (3), 750-768; Christensen, J.; Albertus, P.; Sanchez-Carrera, R. S.; Lohmann, T.; Kozinsky, B.; Liedtke, R.; Ahmed, J.; Kojic, A. A Critical Review of Li/Air Batteries. J. Electrochem. Soc. 2012, 159 (2), R1; and Abraham, K. M.; Jiang, Z. A Polymer Electrolyte—Based Rechargeable Lithium/Oxygen Battery TECHNICAL PAPERS ELECTROCHEMICAL SCIENCE AND TECHNOLOGY A Polymer Electrolyte-Based Rechargeable Lithium/Oxygen Battery. J. Electrochem. Soc. 1996, 143 (1), 1-5, each of which is incorporated by reference in its entirety. The stable and reversible operation of lithium-oxygen (Li—$O_2$) batteries is currently hindered by severe electrolyte degradation. Common non-aqueous solvents, including carbonates, glymes, dimethyl sulfoxide (DMSO), and dimethylformamide (DMF), have been shown to decompose in the presence of reactive oxygen reduction products. See, for example, Freunberger, S. A.; Chen, Y.; Peng, Z.; Griffin, J. M.; Hardwick, L. J.; Bardé, F.; Novák, P.; Bruce, P. G. Reactions in the Rechargeable Lithium-O2 Battery with Alkyl Carbonate Electrolytes. J. Am. Chem. Soc. 2011, 133 (20), 8040-8047; MIZUNO, F.; NAKANISHI, S.; KOTANI, Y.; YOKOISHI, S.; IBA, H. Rechargeable Li-Air Batteries with Carbonate-Based Liquid Electrolytes. Electrochemistry 2010, 78 (5), 403-405; Xu, W.; Xu, K.; Viswanathan, V. V; Towne, S. A.; Hardy, J. S.; Xiao, J.; Nie, Z.; Hu, D.; Wang, D.; Zhang, J. Reaction Mechanisms for the Limited Reversibility of Li—O2 Chemistry in Organic Carbonate Electrolytes. J. Power Sources 2011, 196 (22), 9631-9639; Bryantsev, V. S.; Blanco, M. Decomposition of Organic Carbonate-Based Electrolytes. J. Phys. Chem. Lett. 2011, 379-383; Freunberger, S. A.; Chen, Y.; Drewett, N. E.; Hardwick, L. J.; Bardé, F.; Bruce, P. G. The Lithium-Oxygen Battery with Ether-Based Electrolytes. Angew. Chemie—Int. Ed. 2011, 50 (37), 8609-8613; McCloskey, B. D.; Bethune, D. S.; Shelby, R. M.; Mori, T.; Scheffler, R.; Speidel, A.; Sherwood, M.; Luntz, A. C. Limitations in Rechargeability of Li—O 2 Batteries and Possible Origins. J. Phys. Chem. Lett. 2012, 3 (20), 3043-3047; Wang, H.; Xie, K. Investigation of Oxygen Reduction Chemistry in Ether and Carbonate Based Electrolytes for Li—O2 Batteries. Electrochim. Acta 2012, 64, 29-34; Kwabi, D. G.; Batcho, T. P.; Amanchukwu, C. V.; Ortiz-Vitoriano, N.; Hammond, P.; Thompson, C. V.; Shao-Horn, Y. Chemical Instability of Dimethyl Sulfoxide in Lithium-Air Batteries. J. Phys. Chem. Lett. 2014, 5 (16), 2850-2856; Mozhzhukhina, N.; Mendez De Leo, L. P.; Calvo, E. J. Infrared Spectroscopy Studies on Stability of Dimethyl Sulfoxide for Application in a Li-Air Battery. J. Phys. Chem. C 2013, 117 (36), 18375-18380, Gampp, H.; Lippard, S. J. Reinvestigation of 18-Crown-6 Ether/Potassium Superoxide Solutions in Me2SO. Inorg. Chem. 1983, 22 (2), 357-358; Chen, Y.; Freunberger, S. A.; Peng, Z.; Bardé, F.; Bruce, P. G. Li—O 2 Battery with a Dimethylformamide Electrolyte. J. Am. Chem. Soc. 2012, 134 (18), 7952-7957, each of which is incorporated by reference in its entirety. Given the radical-rich, basic, nucleophilic and oxidizing environment of the oxygen electrode, the design for stable electrolytes in aprotic Li—$O_2$ batteries must eliminate or minimize chemical moieties prone to hydrogen abstraction, deprotonation, nucleophilic substitution as well as electrochemical oxidation. See, for example, Feng, S.; Chen, M.; Giordano, L.; Huang, M.; Zhang, W.; Amanchukwu, C. V.; Anandakathir, R.; Shao-horn, Y.; Johnson, J. A. Mapping a Stable Solvent Structure Landscape for Aprotic Li-Air Battery Organic Electrolytes. J. Mater. Chem. A 2017, 5 (45), 23987-23998, which is incorporated by reference in its entirety. In an early attempt, by substituting the secondary hydrogens of 1,2-dimethoxyethane (DME) with methyl groups (—$CH_3$) with the aim of improving stability against hydrogen abstraction, Nazar et al. observed improved cycling stability of the substituted solvent over DME. See, for example, Adams, B. D.; Black, R.; Williams, Z.; Fernandes, R.; Cuisinier, M.; Berg, E. J.; Novak, P.; Murphy, G. K.; Nazar, L. F. Towards a Stable Organic Electrolyte for the Lithium Oxygen Battery. Adv. Energy Mater. 2015, 5 (1), which is incorporated by reference in its entirety. More recently, to improve stability against deprotonation and nucleophilic substitution, Aurbach and coworkers designed a new ketone-based solvent, 2,4-dimethoxy-2,4-dimethylpentan-3-one (DMDMP), which lacks acidic α-proton or good leaving groups upon nucleophilic attack, and reported small amounts of decomposition products after 48 cycles. See, for example, Sharon, D.; Sharon, P.; Hirshberg, D.; Salama, M.; Afri, M.; Shimon, L. J. W.; Kwak, W. J.; Sun, Y. K.; Frimer, A. A.; Aurbach, D. 2,4-Dimethoxy-2,4-Dimethylpentan-3-One: An Aprotic Solvent Designed for Stability in Li—O2Cells. J. Am. Chem. Soc. 2017, 139 (34), 11690-11693, which is incorporated by reference in its entirety. With similar design principles, a new pivalate-based solvent, free of acidic α-proton prone to deprotonation or vulnerable α-carbon against nucleophilic substitution, was found to be stable in the presence of potassium superoxide ($KO_2$) for at least 120 hours and after 11 cycles. See, for example, Li, T.; Wang, Z.; Yuan, H.; Li, L.; Yang, J. A Methyl Pivalate Based Electrolyte for Non-Aqueous Lithium-oxygen Batteries. Chem. Commun. 2017, 53 (75), 10426-10428, which is incorporated by reference in its entirety.

In one aspect, a composition can include a polyolefin including a plurality of functional groups, the functional groups including an aprotic polar group selected from the group consisting of sulfamide, sulfoxy, carbonyl, phosphoramide or heterocyclic groups.

In certain circumstances, the polyolefin can include a polymer block selected from the group consisting of:

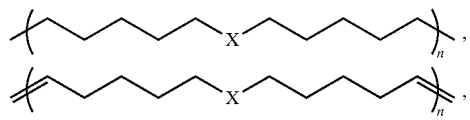

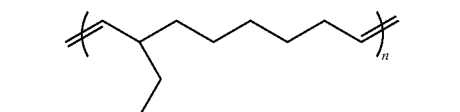

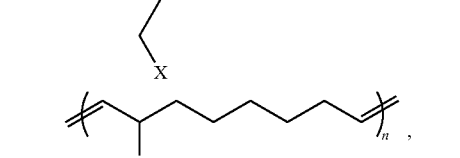

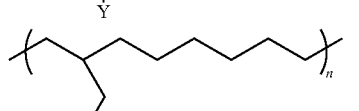

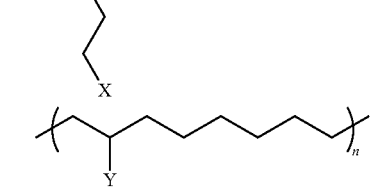

In certain embodiments, n can be 1 to 100,000, less than 50,000, less than 25,000, less than 20,000, less than 10,000, or less than 1,000. In other embodiments, n can be greater than 10, greater than 25, greater than 40, greater than 50, greater than 100, greater than 200, or greater than 250. In certain embodiments, X can be a functional group including one or more sulfamide, sulfoxy, carbonyl, phosphoramide or heterocyclic groups. In certain embodiments, Y can be a bond or a C1-C6 alkyl or alkenyl optionally interrupted by O, S or NR, where NR is N—C1-C6 alkyl and including a moiety having one or more functional group including sulfamide, sulfoxy, carbonyl, phosphoramide or heterocyclic groups.

In certain circumstances, X can be a monovalent or divalent moiety having a structure selected from the group consisting of

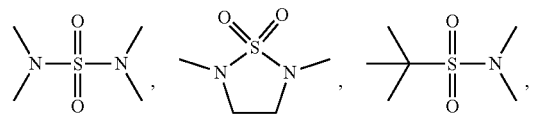

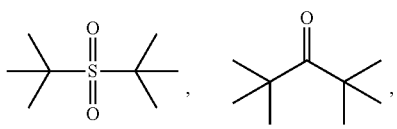

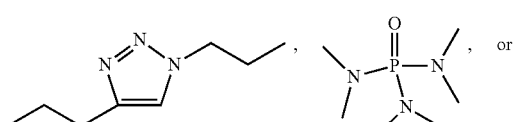

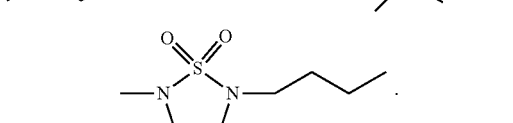

The monovalent moiety can be covalently bonded to the polymer at a single connection point. The divalent moiety can be covalently bonded to the polymer at two connection points, for example, in the polymer chain backbone.

In certain circumstances, Y can be a bond, in which case a functional group, for example, a polar aprotic group, is bonded directly to a polymer backbone.

In certain circumstances, Y can be a C1-C6 alkyl or alkenyl optionally interrupted by O, S or NR, where NR is N—C1-C6 alkyl, in which case a functional group, for example, a polar aprotic group, is bonded directly to an alkyl group pendant from polymer backbone In certain circumstances, the polyolefin can include a polymer block selected from the group consisting of:

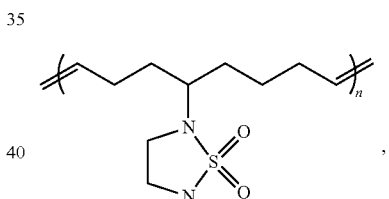

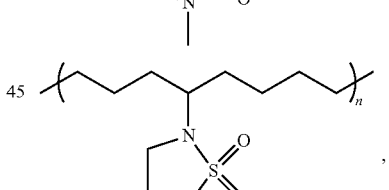

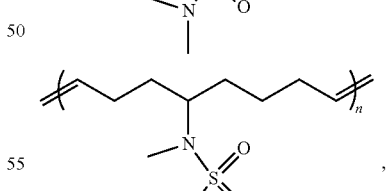

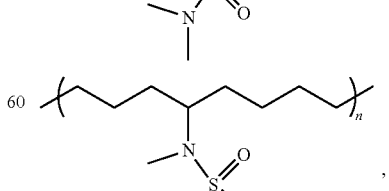

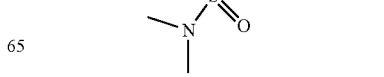

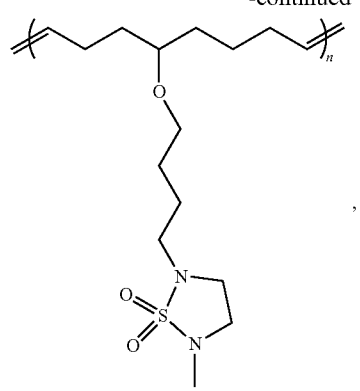
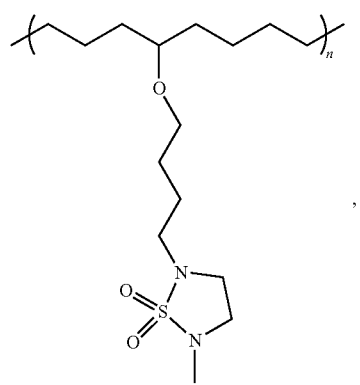
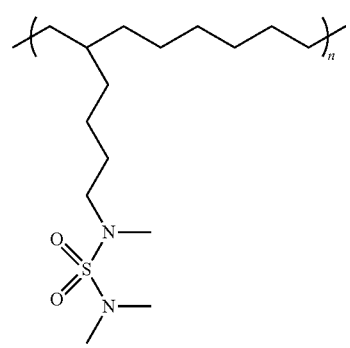
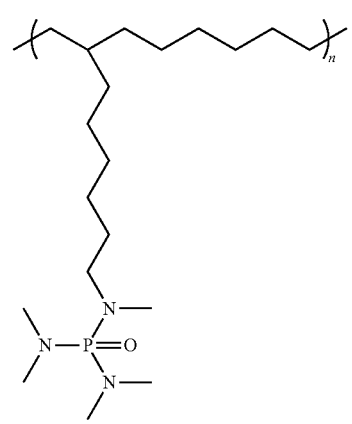
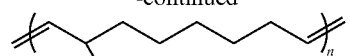
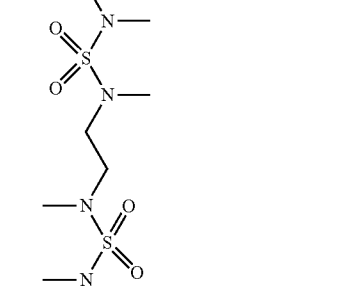
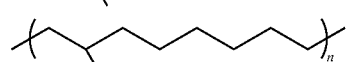
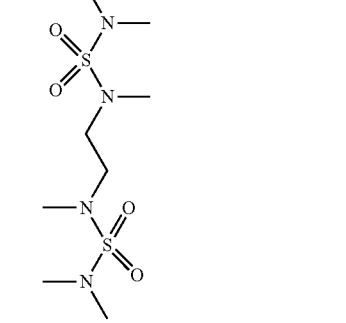
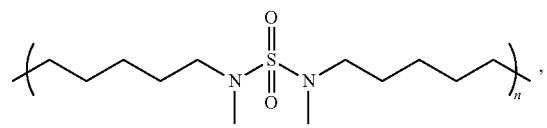
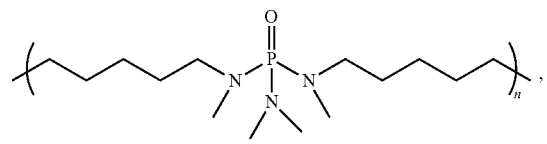
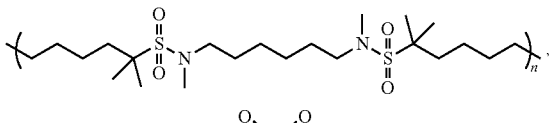
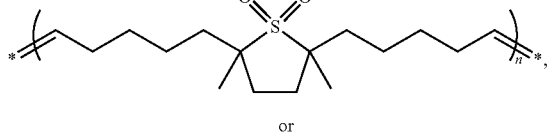
or -continued

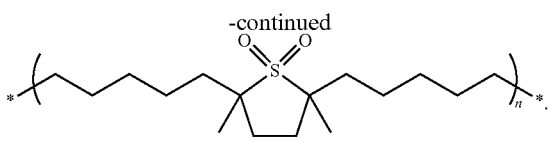

In another aspect, a battery can include a composition as described herein.

In another aspect, a battery can include a solvent including an aprotic polar group.

In certain circumstances, the aprotic polar group includes sulfamide, sulfoxy, carbonyl, phosphoramide or heterocyclic groups.

In certain circumstances, the solvent, or the aprotic polar group can include

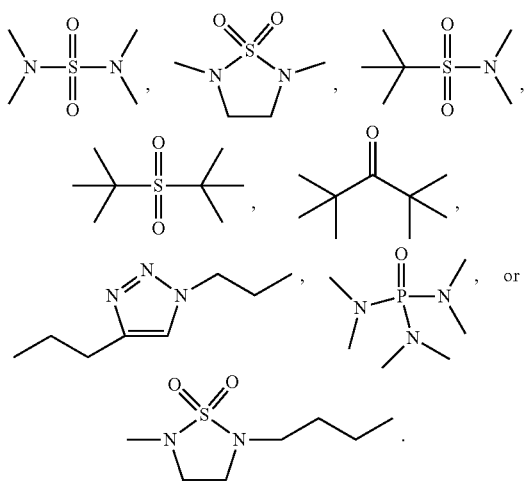

In certain circumstances, the battery can include a lithium salt electrolyte.

Figure 15:
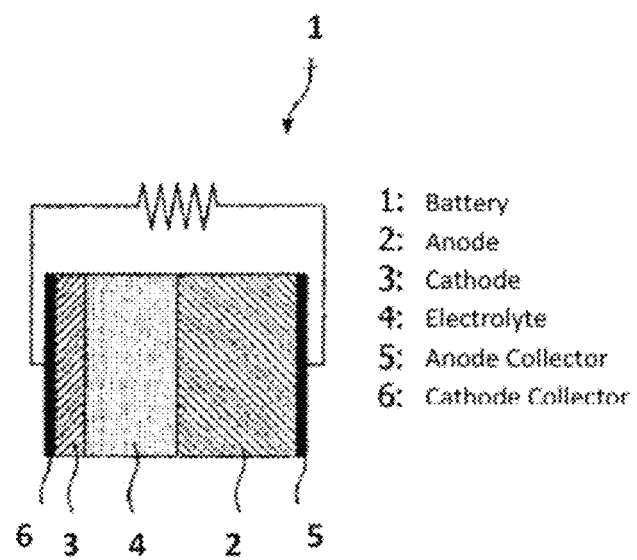
FIG. 15 depicts a battery.

FIG. 15 schematically illustrates a metal-air battery 1, which includes anode 2, cathode 3, electrolyte 4, anode collector 5, and, optionally, cathode collector 6. The battery can include an electrolyte, for example, a lithium salt.

Figure 6:
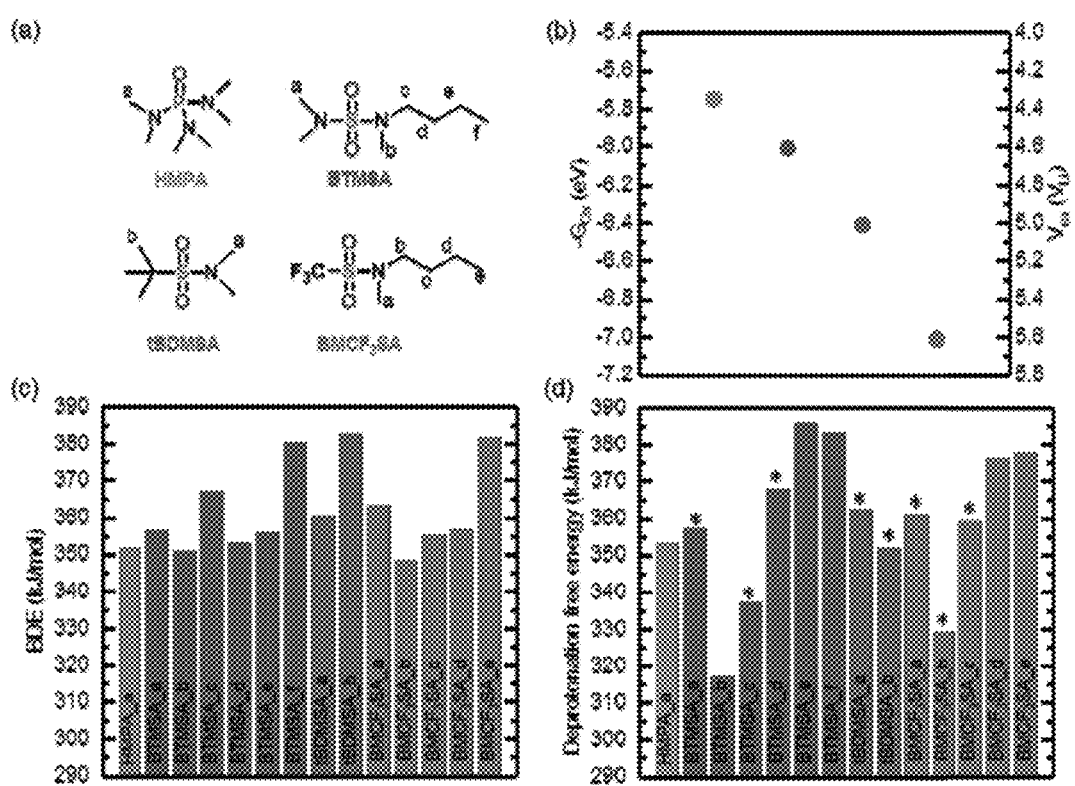
FIG. 6 depicts properties of solvent. Panel (a) shows molecular structures of compounds considered in the computational investigation where each inequivalent hydrogen is labeled. Panel (b) shows adiabatic –G$_{ox}$ and V$_{ox}$ of the compounds shown in panel (a) computed using B3LYP/6-311++G(d,p) with geometries optimized at B3LYP/6-31G(d,p) in implicit DMSO solvent. The experimentally measured scale versus Li/Li$^+$, plotted on the right axis, was obtained from the oxidation energy in eV by the subtraction of 1.4 V. Panel (c) shows bond dissociation energies and panel (d) shows deprotonation free energies of all inequivalent C—H bonds shown in panel (a) computed at the B3LYP/6-31G(d,p) level of theory in implicit DMSO solvent. Asterisk (*) indicates the estimated electronic deprotonation energies prior to elimination reaction (<10% bond elongation).

Three solvents (see, FIG. 1), N,N-Dimethyl-N'-butyl-N'-methylsulfamide (BTMSA), N-butyl-N-methyl-trifluoromethanesulfonamide (BMCF$_3$SA), and N,N-dimethyl-trifluoromethanesulfonamide (DMCF$_3$SA), have been designed for chemical and electrochemical stability in aprotic Li—O$_2$ batteries. Tetraalkylsulfamide solvents such as BTMSA are compatible with strongly basic and nucleophilic reagents, which suggests they may exhibit promising chemical stability in the oxygen electrode of typical aprotic Li—O$_2$ battery. See, for example, Richey, H. G.; Farkas, J. Sulfamides and Sulfonamides as Polar Aprotic Solvents. J. Org. Chem. 1987, 52 (4), 479-483, which is incorporated by reference in its entirety. On the other hand, the electron-withdrawing trifluoromethyl (—CF$_3$) moiety was introduced in the sulfonamide-based solvents, BMCF$_3$SA and DMCF$_3$SA, to enhance their electrochemical oxidative stability. First, the stability of BTMSA and BMCF$_3$SA along with hexamethylphosphoramide (HMPA, a commercially available solvent whose stability in aprotic Li—O$_2$ batteries was demonstrated recently) and N,N-dimethyl-t-butane-sulfonamide (tBDMSA, replacing the —CF$_3$ in DMCF$_3$SA with a t-butyl group) was assessed by a computational framework developed to predict organic molecules' suscep-tibility to electrochemical oxidation, hydrogen abstraction and deprotonation (FIG. 6). See, for example, Zhou, B.; Guo, L.; Zhang, Y.; Wang, J.; Ma, L.; Zhang, W. H.; Fu, Z.; Peng, Z. A High-Performance Li—O2 Battery with a Strongly Solvating Hexamethylphosphoramide Electrolyte and a LiPON-Protected Lithium Anode. Adv. Mater. 2017, 29 (30), 2-7, which is incorporated by reference in its entirety. The electrochemical oxidation potential calculations suggested that, as expected, the sulfonamide with electron-withdrawing —CF$_3$ group, BMCF$_3$SA, is the most stable (i.e., highest predicted oxidation potential), followed by the sulfonamide with t-butyl group, which in turn is more stable than tetraalkylsulfamide BTMSA, which bears strongly electron-donating moieties (FIG. 6, panel b). It is noted that the sulfamide (BTMSA) and sulfonamides (BMCF$_3$SA and tBDMSA) were predicted to have higher electrochemical oxidative stability than the commercial HMPA. Additionally, our computational analyses suggested that all four molecules considered are resistant to hydrogen and proton removal (FIG. 6, panels c-d). To experimentally validate our predictions and further study the performance of these sulfamide- and sulfonamide-based solvents, BTMSA was synthesized via condensation of N,N-dimethylsulfonamoyl chloride and N-butylmethylamine in 90% yield, while BMCF$_3$SA and DMCF$_3$SA (a slight molecular variation of BMCF$_3$SA by replacing the butyl group in BMCF$_3$SA with a methyl group) were prepared via condensation of trifluoromethanesulfonyl chloride and the corresponding secondary amines in 80%-90% yields (FIG. 1). These three solvents are clear, colorless liquids at room temperature; their boiling temperature and viscosity are showed in Table 1.

TABLE 1

Estimated boiling points and viscosities of representative solvents.

| Solvents | BP (° C.) | Viscosity (cP) |
|---|---|---|
| BTMSA | ≈220 | 3.56[a] |
| BMCF$_3$SA | ≈187 | 1.65[b] |
| DMCF$_3$SA | ≈120 | 1.48[b] |

[a]Estimated based on the similar chemical structure from Choquette, Y.; Brisard, G.; Parent, M.; Brouillette, D.; Perron, G.; Desnoyers, J. E.; Armand, M.; Gravel, D.; Slougui, N. Sulfamides and Glymes as Aprotic Solvents for Lithium Batteries. J. Electrochem. Soc. 1998, 145, 3500-3507, which is incorporated by reference in its entirety.
[b]Values taken from Fu, S.-T.; Liao, S.-L.; Nie, J.; Zhou, Z.-B. N,N-dialkyl perfluoroalkanesulfonamides: Synthesis, characterization and properties. J. Fluorine Chem. 2013, 147, 56-64, which is incorporated by reference in its entirety, or estimated based on similar chemical structure.

tBDMSA and N-butyl-N-methyl-t-butanesulfonamide (tBBMSA, replacing one of the methyl groups in tBDMSA with an N-butyl) were also synthesized. However, they are solid at room temperature (melting temperature >50° C.) and thus not suitable for room temperature Li—O$_2$ battery operation; tBDMSA and tBBMSA are excluded in further characterizations. In this work, to assess the suitability of BTMSA, DMCF$_3$SA, and BMCF$_3$SA as electrolyte solvents in aprotic Li—O$_2$ batteries, we evaluated their donor numbers (DNs), conductivity, as well as chemical and electrochemical stability. Furthermore, we studied the galvanostatic discharge and charge behaviors, oxygen evolution profiles on charge, and cyclability of Li—O$_2$ cells containing sulfonamide-based electrolytes. Results presented in this study demonstrate that sulfonamide-based solvents with thoughtfully designed molecular structures are promising candidates for aprotic Li—O$_2$ battery electrolytes.

Figure 2:
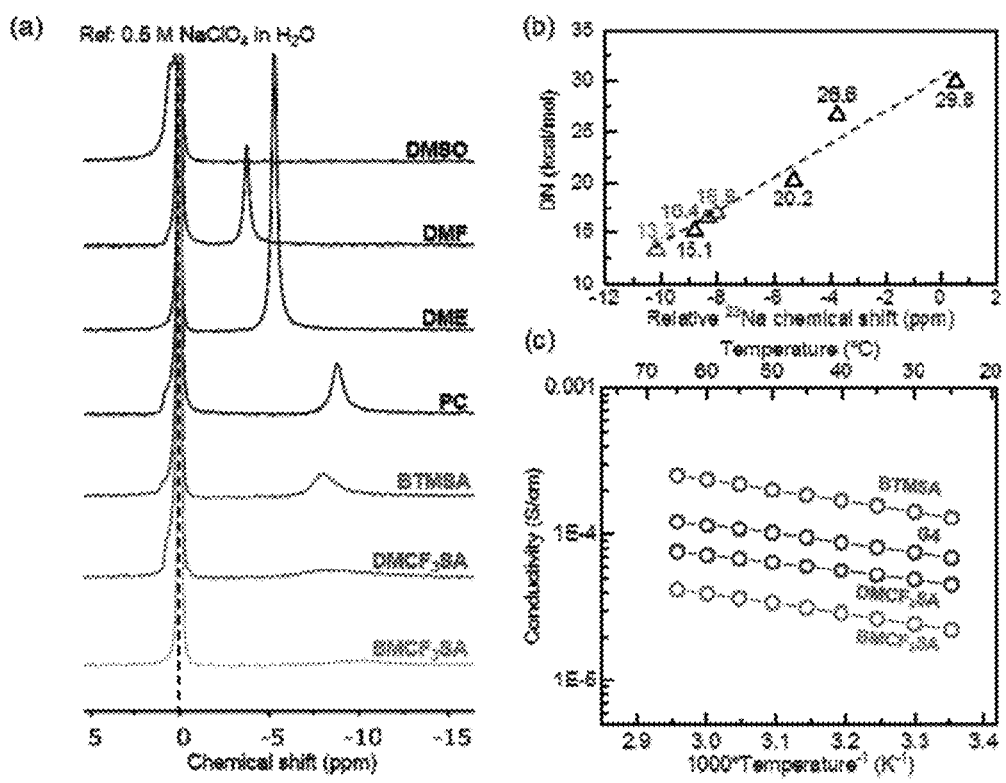
FIG. 2 depicts properties of aprotic solvents. Panel (a) shows the measured chemical shifts of $^{23}$Na NMR signal of 20 mM NaTFSI in BTMSA, DMCF$_3$SA, and BMCF$_3$SA compared to that of DMSO, DMF, DME, and PC. The $^{23}$Na signal from the internal standard, 0.5 M NaClO$_4$ in H$_2$O, is set to 0 ppm. Panel (b) shows a linear trend line, indicated by the dashed line, correlating the DNs of DMSO (29.8), DMF (26.6), DME (20.2), and PC (15.1) and their measured relative $^{23}$Na NMR shifts was used to estimate the DNs of BTMSA, DMCF$_3$SA, and BMCF$_3$SA, which were determined to be 16.9, 16.4, and 13.3, respectively. Panel (c) shows conductivity of solutions containing 0.1 M LiTFSI in BTMSA, DMCF$_3$SA, and BMCF$_3$SA compared to that of tetraglyme (G4) as a commercial reference at various temperatures.
Figure 7:
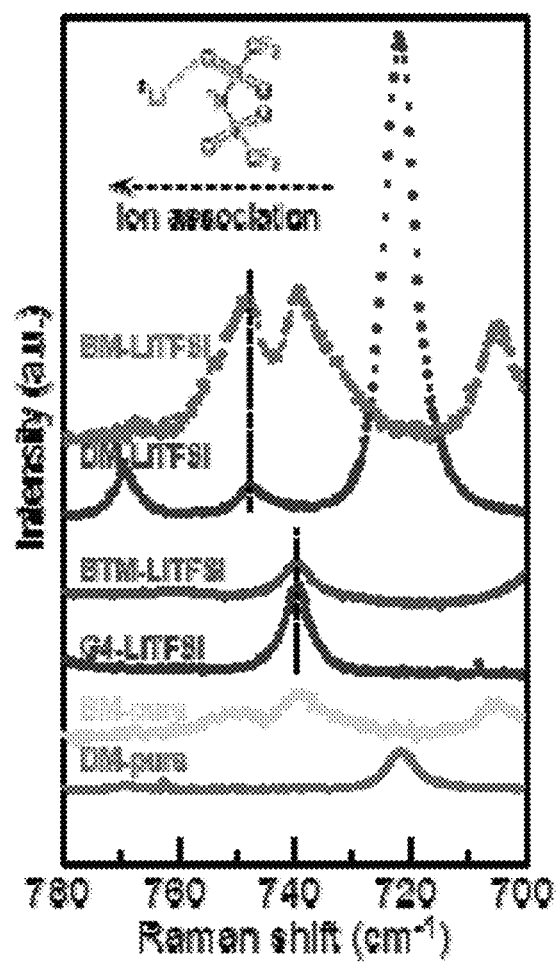
FIG. 7 depicts Raman spectra of pure BMCF$_3$SA and DMCF$_3$SA (denoted by BM-pure and DM-pure, respectively, for brevity) as well as 0.2 M LiTFSI in G4, BTMSA, DMCF$_3$SA, and BMCF$_3$SA (denoted by G4-LiTFSI, BTM-LiTFSI, DM-LiTFSI, and BM-LiTFSI, respectively) in the range of 700 to 780 cm$^{-1}$ measured at 25° C. The peak attributable to the S—N symmetric stretching of TFSI anion, marked with vertical dashed lines, shifts to higher wave numbers in BMCF$_3$SA and DMCF$_3$SA, indicating stronger ion association in these two solvents.

The DN of an electrolyte describes its ability to interact with Li$^+$ through donating electron density (i.e., Lewis basicity), which in turn influences the solubility and life time of oxygen reduction reaction (ORR) intermediate, $LiO_2$, as well as the discharge product morphology and capacity. See, for example, Gutmann, V. Solvent Effects on the Reactivities of Organometallic Compounds. Coord. Chem. Rev. 1976, 18 (2), 225-255, Younesi, R.; Veith, G. M.; Johansson, P.; Edström, K.; Vegge, T. Lithium Salts for Advanced Lithium Batteries: Li-metal, Li—O 2, and Li—S. Energy Environ. Sci. 2015, 8 (7), 1905-1922; Abraham, K. M. Electrolyte-Directed Reactions of the Oxygen Electrode in Lithium-Air Batteries. J. Electrochem. Soc. 2014, 162 (2), A3021-A3031; Johnson, L.; Li, C.; Liu, Z.; Chen, Y.; Freunberger, S. A.; Ashok, P. C.; Praveen, B. B.; Dholakia, K.; Tarascon, J.-M.; Bruce, P. G. The Role of LiO2 Solubility in O2 Reduction in Aprotic Solvents and Its Consequences for Li—O2 Batteries. Nat. Chem. 2014, 6 (12), 1091-1099, each of which is incorporated by reference in its entirety. The DNs of BTMSA, $BMCF_3SA$, and $DMCF_3SA$ were estimated by $^{23}Na$ NMR. See, for example, Erlich, R. H.; Popov, A. I. Spectroscopic Studies of Ionic Solvation. X. Study of the Solvation of Sodium Ions in Nonaqueous Solvents by Sodium-23 Nuclear Magnetic Resonance. J. Am. Chem. Soc. 1971, 93 (22), 5620-5623, which is incorporated by reference in its entirety. Solutions of 20 mM sodium bis(trifluoromethanesulfonyl)imide (NaTFSI) were prepared in BTMSA, $BMCF_3SA$, $DMCF_3SA$ as well as in DMSO, N-dimethylformamide (DMF), DME, and propylene carbonate (PC) with 0.5 M sodium perchlorate ($NaClO_4$) in deionized water ($H_2O$) as the internal standard. The $^{23}Na$ NMR shifts of NaTFSI in these seven solvents are shown in FIG. 2, panel a. Drawing a linear trend line correlating the reported DNs of DMSO (29.8), DMF (26.6), DME (20.2), and PC (15.1) and their $^{23}Na$ NMR shifts, the DNs of BTMSA, $DMCF_3SA$, and $BMCF_3SA$ were estimated to be 16.9, 16.4, and 13.3, respectively (shown in FIG. 2, panel b). See, for example, Erlich, R. H.; Popov, A. I. Spectroscopic Studies of Ionic Solvation. X. Study of the Solvation of Sodium Ions in Nonaqueous Solvents by Sodium-23 Nuclear Magnetic Resonance. J. Am. Chem. Soc. 1971, 93 (22), 5620-5623; Linert, W.; Jameson, R. F.; Taha, A. Donor Numbers of Anions in Solution: The Use of Solvatochromic Lewis Acid?Base Indicators. J. Chem. Soc. Dalt. Trans. 1993, No. 21, 3181; Burke, C. M.; Pande, V.; Khetan, A.; Viswanathan, V.; McCloskey, B. D. Enhancing Electrochemical Intermediate Solvation through Electrolyte Anion Selection to Increase Nonaqueous Li—O 2 Battery Capacity. Proc. Natl. Acad. Sci. 2015, 112 (30), 9293-9298; Cahen, Y. M.; Handy, P. R.; Roach, E. T.; Popov, A. I. Spectroscopic Studies of Ionic Solvation. XVI. Lithium-7 and Chlorine-35 Nuclear Magnetic Resonance Studies in Various Solvents. J. Phys. Chem. 1975, 79 (1), 80-85; Handy, P. R.; Popov, A. I. Spectroscopic Studies of Ionic Solvation-XII. Spectrochim. Acta Part A Mol. Spectrosc. 1972, 28 (8), 1545-1553, each of which is incorporated by reference in its entirety. As expected, solvents with electron-withdrawing —$CF_3$ group have lower donor abilities. The measured conductivities of solutions containing 0.1 M LiTFSI in BTMSA, $BMCF_3SA$, and $DMCF_3SA$ at various temperatures are compared to that of tetraglyme (G4) as a commercial reference in FIG. 1, panel c. The solvent with the highest DN, BTMSA, exhibited conductivity approximately two times as high as G4, whereas $DMCF_3SA$, and $BMCF_3SA$ showed lower conductivities, ~2 and 5 times lower than that of BTMSA, respectively. We believe the lower conductivity of $DMCF_3SA$, and $BMCF_3SA$ can be attributed to weaker $Li^+$ binding energies ($\Delta G_{binding}$= $G(Li^+ \ldots Solvent)$-$G(Li^+)$-$G(Solvent)$, -5.6 and -5.1 kJ/mol for $DMCF_3SA$, and $BMCF_3SA$, respectively, compared to -21.5 kJ/mol in BTMSA). As expected, LiTFSI is less dissociative in $BMCF_3SA$, and $DMCF_3SA$, indicated by higher Raman shifts of the S—N symmetric stretching of TFSI anion (FIG. 7), leading to lower charge carrier concentration and conductivity. See, for example, Tatara, R.; Kwabi, D. G.; Batcho, T. P.; Tulodziecki, M.; Watanabe, K.; Kwon, H.-M.; Thomas, M. L.; Ueno, K.; Thompson, C. V.; Dokko, K.; et al. Oxygen Reduction Reaction in Highly Concentrated Electrolyte Solutions of Lithium Bis(Trifluoromethanesulfonyl)Amide/Dimethyl Sulfoxide. J. Phys. Chem. C 2017, 121 (17), 9162-9172; and Umebayashi, Y.; Mitsugi, T.; Fukuda, S.; Fujimori, T.; Fujii, K.; Kanzaki, R.; Takeuchi, M.; Ishiguro, S.-I. Lithium Ion Solvation in Room-Temperature Ionic Liquids Involving Bis(Trifluoromethanesulfonyl) Imide Anion Studied by Raman Spectroscopy and DFT Calculations. J. Phys. Chem. B 2007, 111 (45), 13028-13032, each of which is incorporated by reference in its entirety. Additionally, we note that $BMCF_3SA$ not only binds to $Li^+$ more weakly than $DMCF_3SA$ but also has higher viscosity (Table S1), both of which contributed to its lower conductivity than $DMCF_3SA$.

Figure 8:
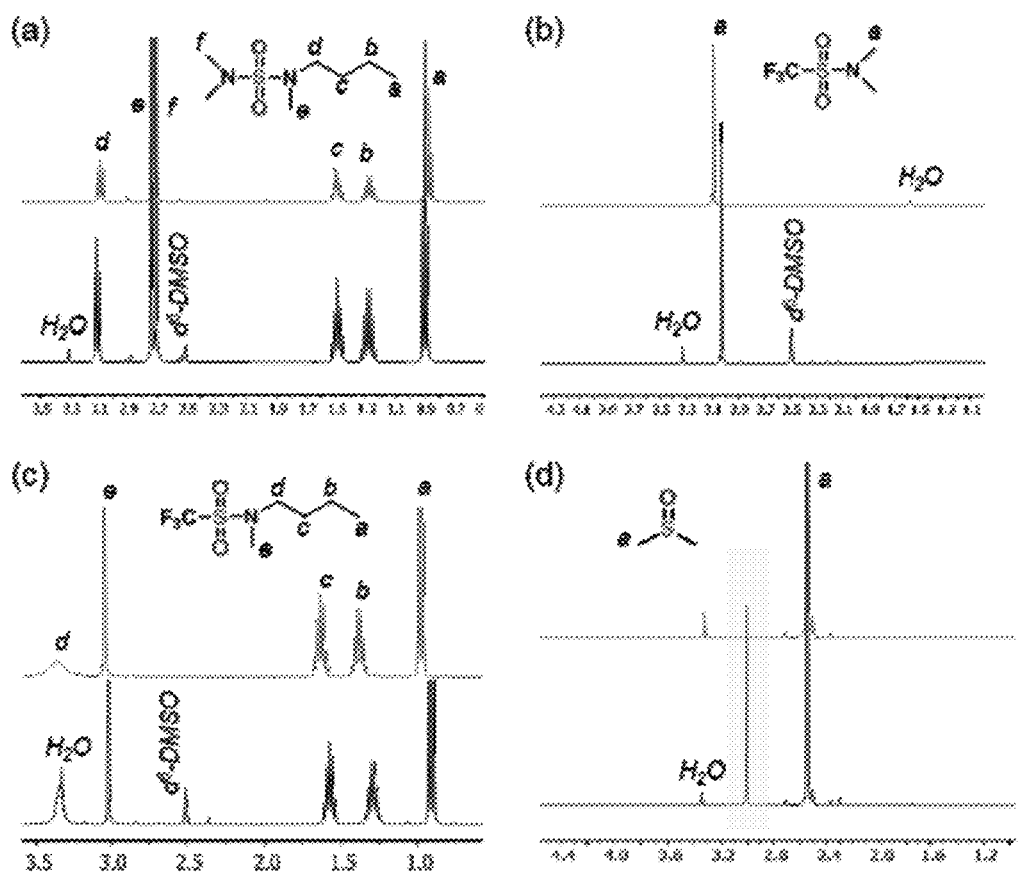
FIG. 8 depicts $^1$H NMR analyses of the chemical stability of: panel (a) BTMSA, panel (b) DMCF$_3$SA, panel (c) BMCF$_3$SA, and panel (d) DMSO. Teal and red spectra were obtained before and after the chemical stability test, in which the samples were mixed with 0.5 equiv. commercial Li$_2$O$_2$ and KO$_2$ powders. The mixtures were stirred and maintained at 80° C. for three days.

The chemical stability of BTMSA, $BMCF_3SA$, and $DMCF_3SA$ was evaluated under conditions mimicking the oxygen electrode of aprotic Li—$O_2$ batteries using a previously established protocol. See, for example, Huang, M.; Feng, S.; Zhang, W.; Giordano, L.; Chen, M.; Amanchukwu, C. V.; Anandakathir, R.; Shao-Horn, Y.; Johnson, J. A. Fluorinated Aryl Sulfonimide Tagged (FAST) Salts: Modular Synthesis and Structure-property Relationships for Battery Applications. Energy Environ. Sci. 2018, which is incorporated by reference in its entirety. The solvents were mixed with 0.5 equivalent commercial lithium peroxide ($Li_2O_2$) and $KO_2$ powders; the mixtures were stirred and maintained at 80° C. for three days. The lack of appreciable change in the $^1H$ NMR spectra collected before and after the exposure to $Li_2O_2$ and $KO_2$ (FIG. 8) indicate that these solvents are highly resistant to chemical degradation by the oxygen reduction species, in good agreement with our computational analyses (FIG. 6). In contrast, DMSO decomposed significantly under the same testing conditions to form dimethyl sulfone, indicated by a strong peak around 3 ppm (FIG. 8). See, for example, Weber, M.; Hellriegel, C.; Rueck, A.; Wuethrich, J.; Jenks, P. Using High-Performance 1H NMR (HP-QNMR®) for the Certification of Organic Reference Materials under Accreditation Guidelines—Describing the Overall Process with Focus on Homogeneity and Stability Assessment. J. Pharm. Biomed. Anal. 2014, 93, 102-110; Weber, M.; Hellriegel, C.; Rueck, A.; Wuethrich, J.; Jenks, P. Using High-Performance 1H NMR (HP-QNMR®) for the Certification of Organic Reference Materials under Accreditation Guidelines—Describing the Overall Process with Focus on Homogeneity and Stability Assessment. J. Pharm. Biomed. Anal. 2014, 93, 102-110, each of which is incorporated by reference in its entirety.

Figure 9:
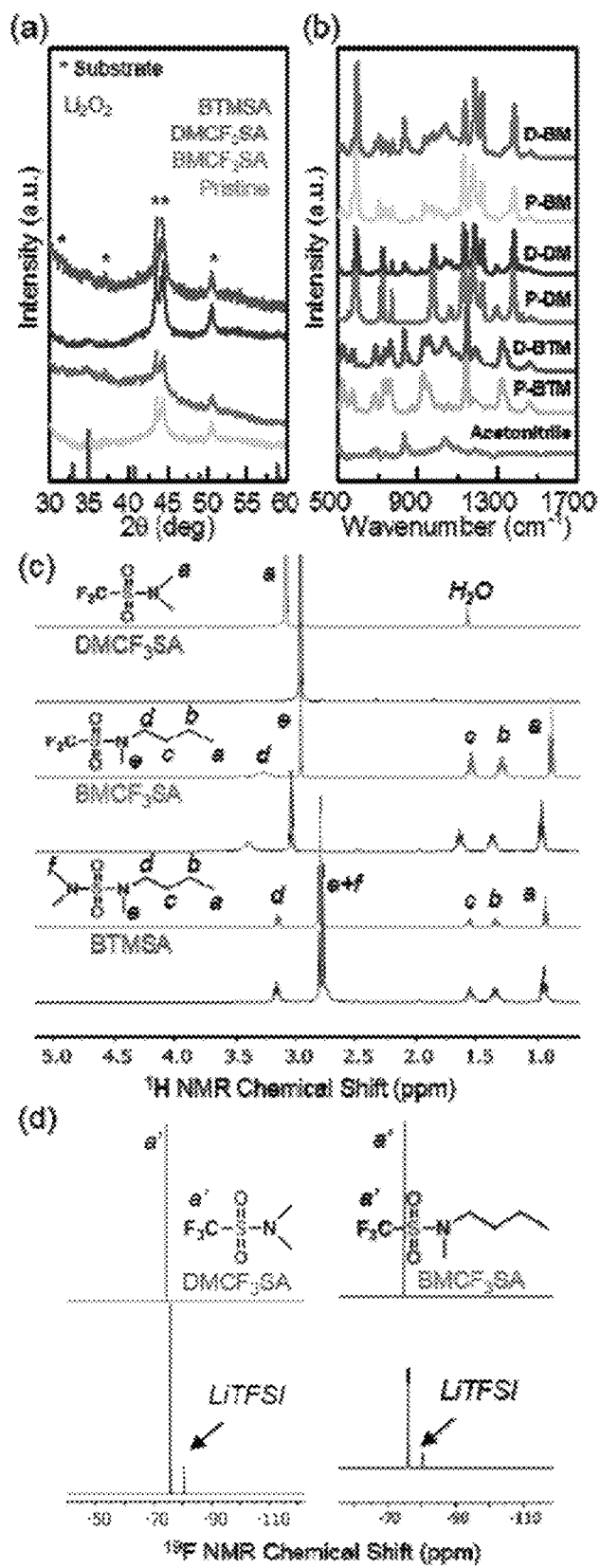
FIG. 9 depicts characteristics of discharge electrodes. Panel (a) shows XRD characterization of the full discharge electrodes in electrolytes containing 0.2 M LiTFSI in BTMSA, DMCF$_3$SA, and BMCF$_3$SA. The presence of Li$_2$O$_2$, albeit of relatively low intensity, was detected for all three discharged electrodes. Panel (b) shows FTIR spectra of electrolytes collected after full discharge (denoted by D followed by the solvent, BTM=BTMSA, DM=DMCF$_3$SA, and BM=BMCF$_3$SA) compared to the pristine electrolytes (denoted by P). No noticeable change was observed for all three electrolyte solvents. Panel (c) shows $^1$H NMR and panel (d) shows $^{19}$F NMR analyses on electrolytes collected after full discharge (red) compared to the pristine electrolyte solvents (teal). No noticeable change was observed for all three electrolytes.

To evaluate the discharge characteristics and chemical stability of these electrolytes in real Li—$O_2$ battery environment, Li—$O_2$ cells with electrolytes containing 0.2 M LiTFSI in BTMSA, $BMCF_3SA$, and $DMCF_3SA$, sandwiched by carbon paper with gas diffusion layer (CP-GDL) cathode and Li metal anode, were fully discharged with a voltage cutoff of 2.0 $V_{Li}$. Cells containing electrolyte solvents with higher DNs, BTMSA (16.9) and $DMCF_3SA$ (16.4), exhibited higher full discharge capacities, 1.04 and 0.95 mAh/$cm^2$, respectively, than the lower-DN solvent, $BMCF_3SA$ (DN=13.3, full discharge capacity=0.79 mAh/$cm^2$). This observation agrees with the previously reported trend between higher-DN electrolyte and higher discharge capacity in Li—$O_2$ batteries. XRD characterization of the CP-GDL cathodes after full discharge showed $Li_2O_2$, albeit of relatively low intensity, as the discharge product (FIG. 9 panel a). The electrolytes after full discharge were collected and analyzed by FTIR (FIG. 9 panel b), $^1$H (FIG. 9 panel c) and $^{19}$F NMR (FIG. 9 panel d), and compared to the pristine electrolytes. No perceivable change was observed in the FTIR or NMR spectra for all three electrolytes, indicating that these electrolytes are resistant to chemical degradation under full discharge conditions.

Figure 3:
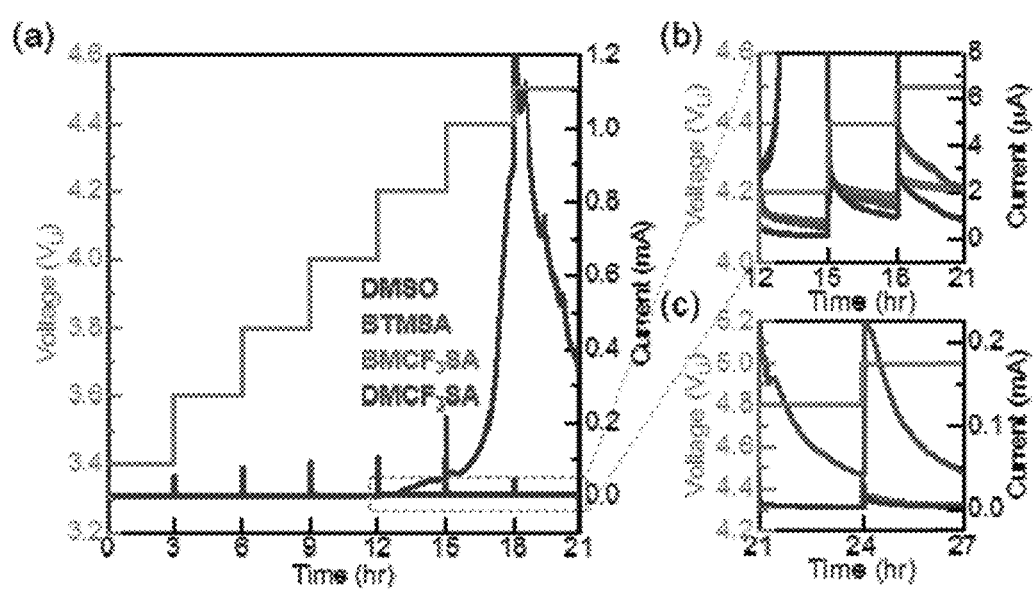
FIG. 3 depicts potentiostatic electrochemical stability tests of electrolytes containing 0.1 M LiTFSI in BTMSA, DMCF$_3$SA, and BMCF$_3$SA compared to DMSO at potential ≤4.5 V$_{Li}$. Panel (b) shows an enlarged view of a portion of panel (a). Panel (c) shows oxidative current at potential ≥4.8 V$_{Li}$.
Figure 10:
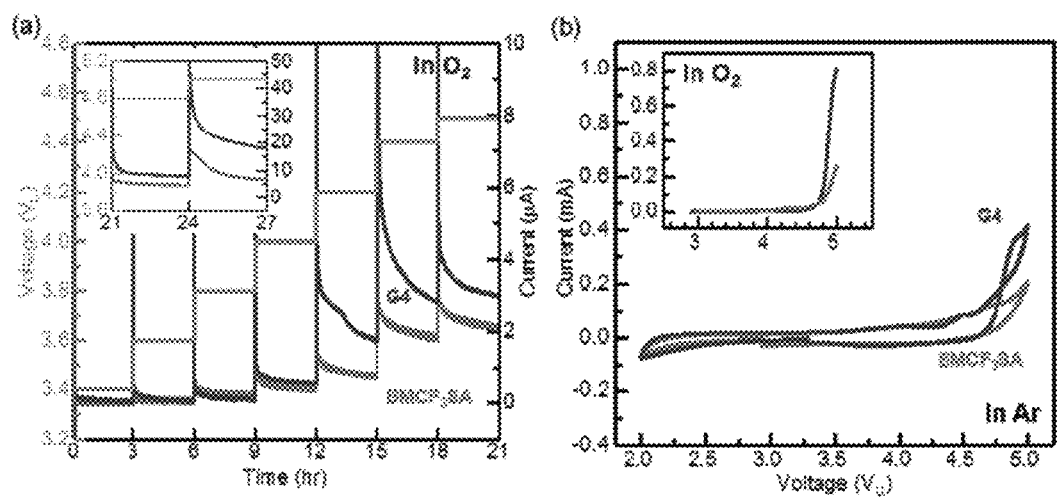
FIG. 10 depicts electrochemical stability of electrolytes containing 0.1 M LiTFSI in G4 and BMCF$_3$SA. Panel (a) shows potentiostatic tests performed in O$_2$. Inset: oxidative current recorded at potential ≥4.8 V$_{Li}$. Panel (b) shows a cyclic voltammogram (CV, 1 mV/s) between 2.0 and 5.0 V$_{Li}$ was performed in Ar. Inset: linear sweep voltammogram (LSV, 0.1 mV/s) from open circuit voltage to 5.0 V$_{Li}$ in O$_2$. Panel (c) shows galvanostatic discharge and charge (0.03 mA/cm$^2$) curves and panel (d) shows O$_2$ evolution rate on charge of Li—O$_2$ cell containing 0.2 M LiTFSI in G4.
Figure 11:
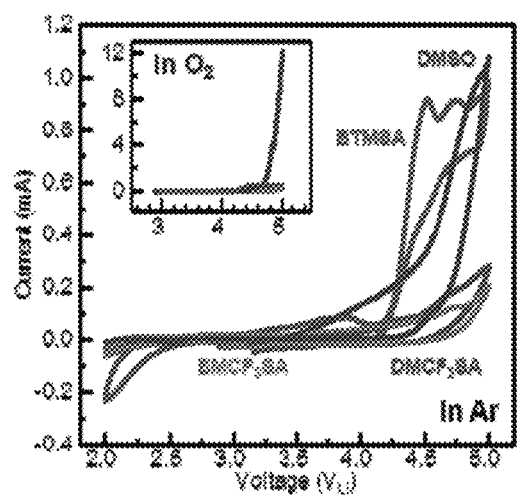
FIG. 11 depicts electrochemical stability of electrolytes containing Electrochemical stability of electrolytes containing 0.1 M LiTFSI in BTMSA, DMCF$_3$SA, and BMCF$_3$SA compared to DMSO as a commercial reference. Cyclic voltammogram (CV, 1 mV/s) between 2.0 and 5.0 V$_{Li}$ in Ar. Inset: linear sweep voltammogram (LSV, 0.1 mV/s) from open circuit voltage to 5.0 V$_{Li}$ in O$_2$.

Next, we evaluated the electrochemical stability of electrolytes containing 0.1 M LiTFSI in BTMSA, BMCF$_3$SA, and DMCF$_3$SA using potentiostatic measurements, cyclic voltammetry (CV), and linear sweep voltammetry (LSV). The potentiostatic measurements were performed under an oxygenated environment in a two-electrode electrochemical cell held at various potentials from 3.4 to 5.0 $V_{Li}$ for 3 hours each (FIG. 3, panel a). The electrochemical cell consists of a glass fiber separator impregnated with the electrolyte and sandwiched between stainless steel mesh (316) current collector and Li metal foil. The same measurement was performed on DMSO- and G4-based electrolytes as comparisons. The sulfamide- and sulfonamide-based electrolytes exhibited desirable oxidative stability (oxidative current <5 µA, zoomed-in view in FIG. 3, panel b) at potentials ≤4.5 $V_{Li}$, similar to the G4-based electrolyte (FIG. 10, panel a), whereas the cell containing DMSO showed oxidative current that was 1~2 orders of magnitude higher. At higher potentials (≥4.8 $V_{Li}$, FIG. 3, panel c), sulfonamides with the electron-withdrawing —CF$_3$ moiety, BMCF$_3$SA, and DMCF$_3$SA, exhibited considerably greater electrochemical oxidative stability (oxidative current <20 µA) than the sulfamide BTMSA (oxidative current 50~220 µA), in great agreement with our computational prediction (FIG. 6). It has been reported that carbon-based electrodes commonly-used in aprotic Li—$O_2$ batteries can participate in parasitic reactions, especially at high charging potential. See, for example, Gallant, B. M.; Mitchell, R. R.; Kwabi, D. G.; Zhou, J.; Zuin, L.; Thompson, C. V.; Shao-Horn, Y. Chemical and Morphological Changes of Li—O 2 Battery Electrodes upon Cycling. J. Phys. Chem. C 2012, 116 (39), 20800-20805; Itkis, D. M.; Semenenko, D. A.; Kataev, E. Y.; Belova, A. I.; Neudachina, V. S.; Sirotina, A. P.; Hävecker, M.; Teschner, D.; Knop-Gericke, A.; Dudin, P.; et al. Reactivity of Carbon in Lithium-Oxygen Battery Positive Electrodes. Nano Lett. 2013, 13 (10), 4697-4701; McCloskey, B. D.; Speidel, A.; Scheffler, R.; Miller, D. C.; Viswanathan, V.; Hummelshøj, J. S.; Nørskov, J. K.; Luntz, A. C. Twin Problems of Interfacial Carbonate Formation in Nonaqueous Li—O 2 Batteries. J. Phys. Chem. Lett. 2012, 3 (8), 997-1001; Ottakam Thotiyl, M. M.; Freunberger, S. A.; Peng, Z.; Bruce, P. G. The Carbon Electrode in Nonaqueous Li—O 2 Cells. J. Am. Chem. Soc. 2013, 135 (1), 494-500, each of which is incorporated by reference in its entirety. To investigate the electrochemical stability of the sulfamide- and sulfonamide-based electrolytes in the presence of carbon, we performed cyclic voltammetry (CV, 1 mV/s, 2.0-5.0 $V_{Li}$, FIG. 11) tests in Ar and linear sweep voltammetry (LSV, 0.1 mV/s, from open circuit voltage to 5.0 V, FIG. 11 inset) tests in $O_2$ using CP-GDL as the working electrode. It is observed that, in both Ar and $O_2$, the BTMSA-based electrolyte started to exhibit increasing oxidative current around 4.2 $V_{Li}$ in the presence of carbon electrode; nonetheless, in the potentiostatic tests employing stainless steel current collector, this electrolyte only showed significant oxidative current at potentials >4.5 $V_{Li}$. On the other hand, similar to the potentiostatic measurements, the —CF$_3$ containing solvents, BMCF$_3$SA, and DMCF$_3$SA, showed significantly improved oxidative stability that is clearly superior to the commercial reference DMSO at highly oxidizing potentials.

Figure 4:
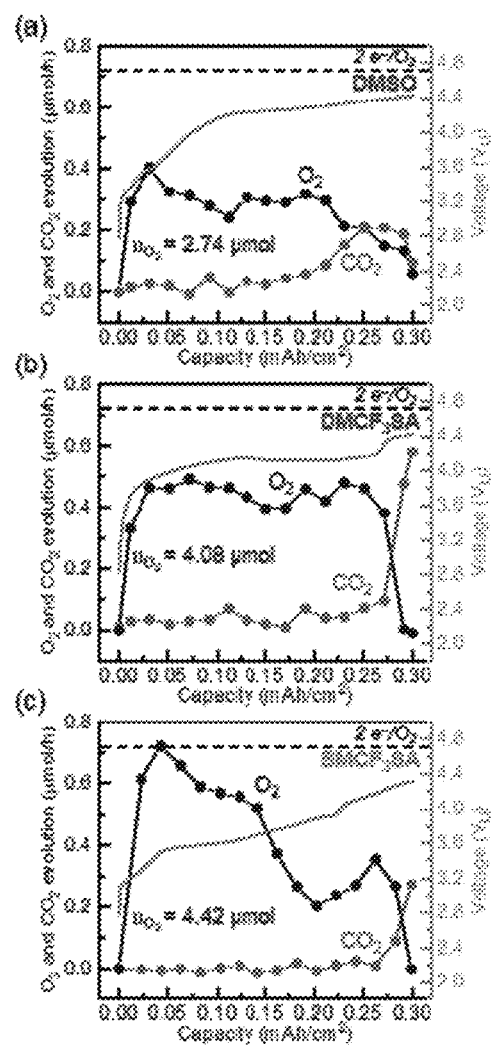
FIG. 4 depicts galvanostatic discharge/charge (0.03 mA/cm$^2$) curves and gas evolution rates on charge of Li—O$_2$ cells containing 0.2 M LiTFSI in panel (a) DMSO, panel (b) DMCF$_3$SA, and panel (c) BMCF$_3$SA.
Figure 5:
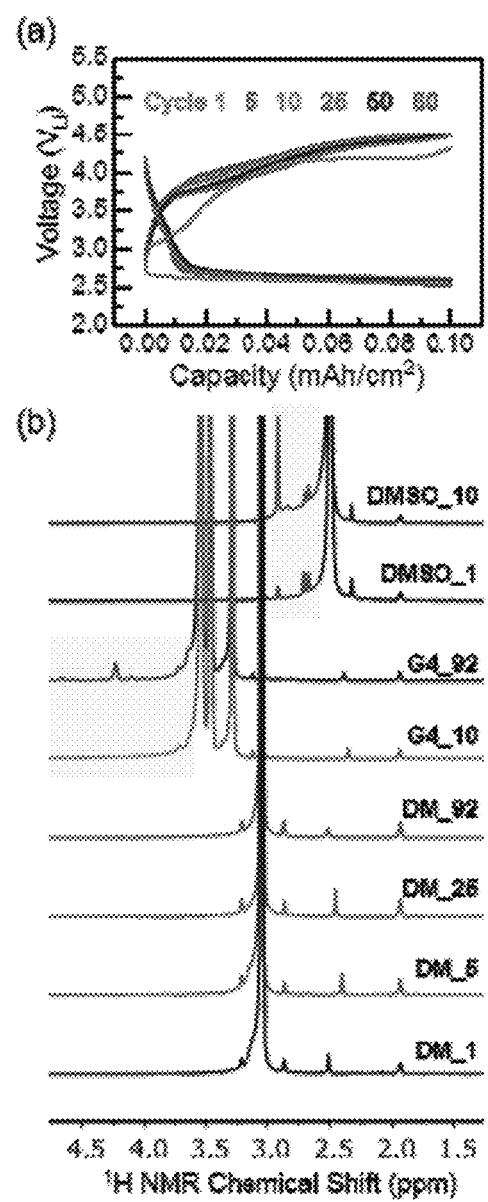
FIG. 5 depicts discharge data. Panel (a) shows galvanostatic discharge (0.03 mA/cm$^2$) and charge (0.02 mA/cm$^2$) profiles of select cycles (1st, 5th, 10th, 25th, 50th, and 80th cycles) of a Li—O$_2$ cell employing 0.2 M LiTFSI in DMCF$_3$SA as the electrolyte. (b) $^1$H NMR analyses on DMCF$_3$SA- (denoted by "DM" for brevity), G4-, and DMSO-based electrolytes collected after select cycles (denoted by "_cycle #").
Figure 12:
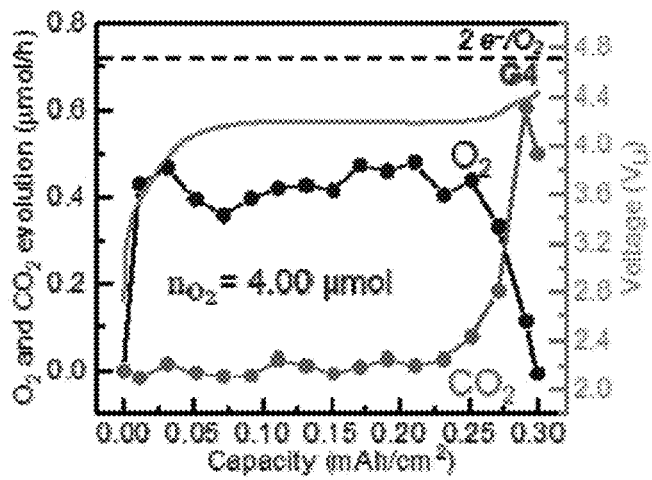
FIG. 12 depicts galvanostatic discharge/charge (0.03 mA/cm$^2$) curves and gas evolution rates on charge of a Li—O$_2$ cell containing 0.2 M LiTFSI in G4.
Figure 13:
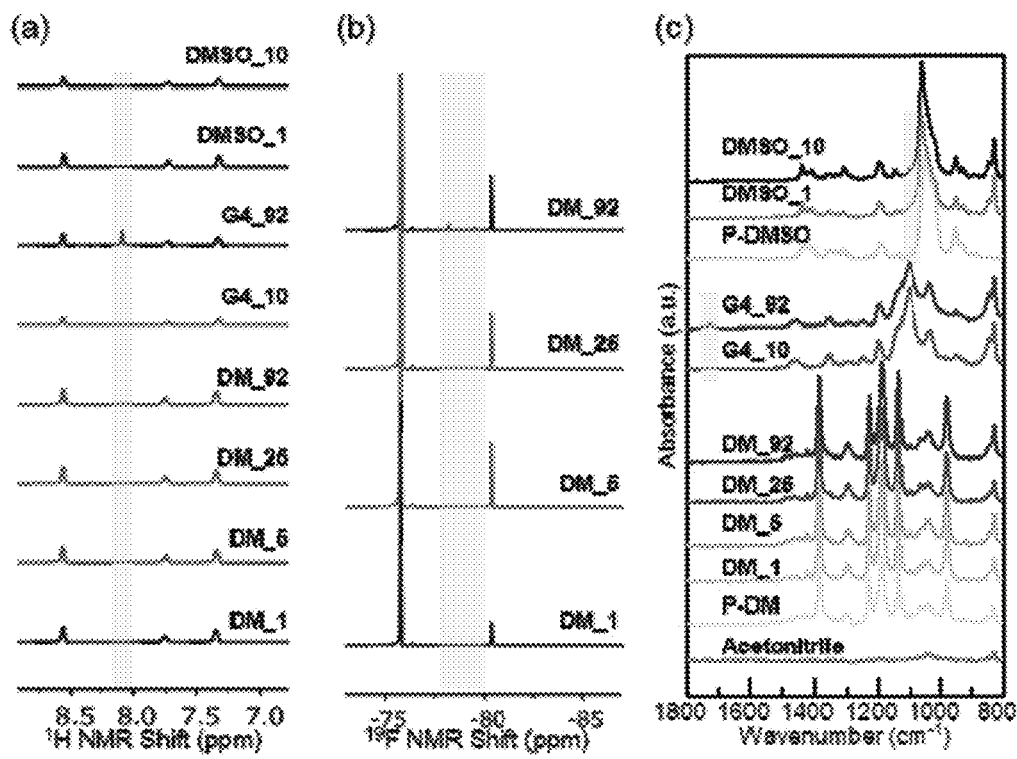
FIG. 13 depicts properties of DMCF$_3$SA. Panel (a) shows $^1$H NMR, panel (b) shows $^{19}$F NMR and panel (c) shows FTIR analyses on electrolytes (0.2 M LiTFSI in DMCF$_3$SA, denoted by DM for brevity, G4 and DMSO) collected after select galvanostatic cycles (denoted by "_cycle #").
Figure 14:
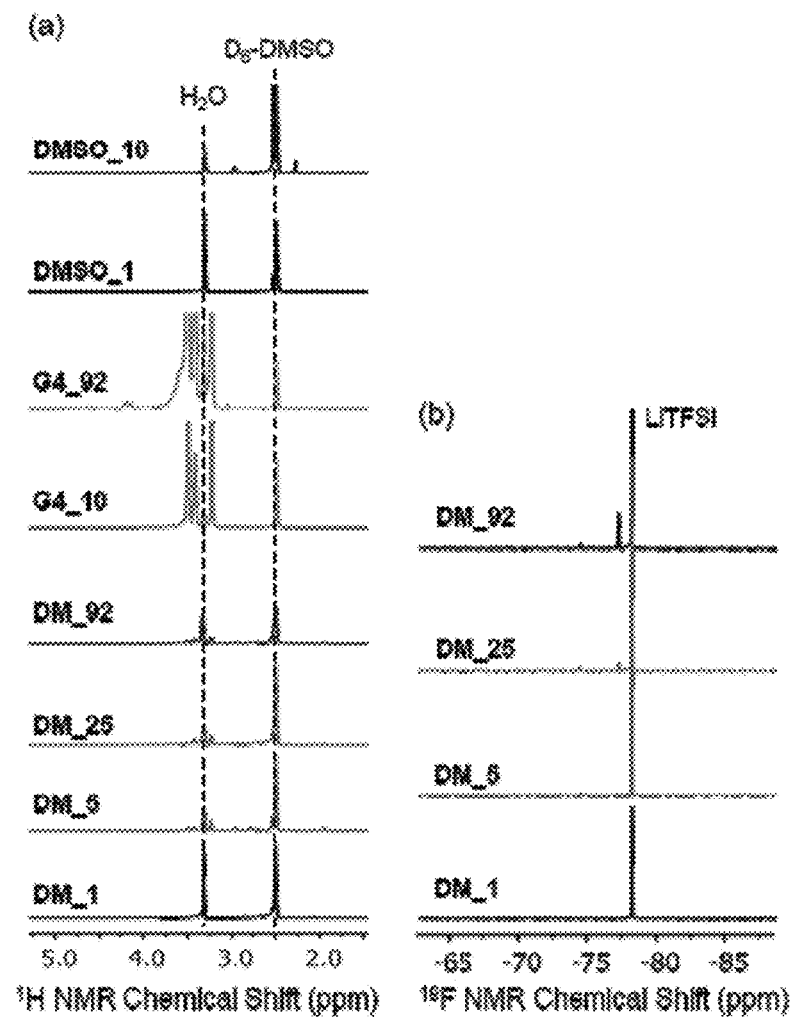
FIG. 14 depicts properties of DMCF$_3$SA. Panel (a) shows $^1$H NMR and panel (b) shows $^{19}$F NMR analyses on extracted positive electrodes of cells containing 0.2 M LiTFSI in DMCF$_3$SA, denoted by DM for brevity, G4 and DMSO after select galvanostatic cycles (denoted by "_cycle #").

Differential electrochemical mass spectrometry (DEMS) have been employed to investigate the gas evolution on charge under galvanostatic conditions. Results for Li—$O_2$ cells using more electrochemically stable electrolytes, DMCF$_3$SA, and BMCF$_3$SA compared to that of DMSO are summarized in FIG. 4. Upon charge, the voltage profiles associated with DMSO-based cell increased steadily and reached a plateau around 4.3~4.4 $V_{Li}$ (FIG. 4, panel a). The corresponding $O_2$ evolution rate initially peaked at ~0.4 mol/h then gradually decayed, yielding an overall evolution of 2.74 µmol $O_2$; significant $CO_2$ evolution was observed for the last 30% charging capacity (beginning at ~4.3 $V_{Li}$ and ~0.2 mAh/cm$^2$). In contrast, the DMCF$_3$SA-based cell showed a long plateau at ~4.2 $V_{Li}$ that was accompanied by a steady $O_2$ evolution rate of ~0.4 µmol/h (overall $O_2$ evolution=4.08 µmol), similar to the G4 cell as shown in FIG. 12; as the charging potential increased from 4.2 to 4.4 $V_{Li}$, $O_2$ evolution significantly decreased while $CO_2$ evolution rapidly increased (FIG. 4, panel b). Interestingly, the charging potential of the BMCF$_3$SA-based cell increased slowly; the potential corresponding to the first 70% charging capacity (~0.2 mAh/cm$^2$) remained below 3.9 $V_{Li}$, after which the voltage increased steadily to 4.3 $V_{Li}$ (FIG. 4, panel c). The $O_2$ evolution rate of the BMCF$_3$SA-based cell during early stage of charge was approximately twice as high as the DMSO-based cell (~0.6 vs. 0.3 µmol/h). As the potential of the BMCF$_3$SA-based cell increased from 3.9 $V_{Li}$ to 4.3 $V_{Li}$, $O_2$ production increased again then eventually diminished, evolving 4.42 µmol $O_2$ overall; $CO_2$ evolution became dominant at >4.2 $V_{Li}$. Li—$O_2$ cells employing 0.2 M LiTFSI in DMCF$_3$SA as the electrolyte were subject to prolonged galvanostatic cycling tests at 0.03 mA/cm$^2$ (capacity cutoff of 0.1 mAh/cm$^2$ unless otherwise noted). The discharge-charge profiles of select cycles are presented in FIG. 5, panel a. The electrolytes and positive electrodes of DMCF$_3$SA-based cells were collected after select cycles and analyzed using $^1$H NMR (FIG. 5, panel b, FIG. 13, panel a, and FIG. 14, panel a), $^{19}$F NMR (FIG. 13, panel b and FIG. 14, panel b) as well as FTIR (FIG. 13, panel c); the results are compared to DMSO- and G4-based cells cycled under the same galvanostatic conditions. The $^1$H NMR analyses (FIG. 5, panel b) revealed clear new peaks for the DMSO-based electrolyte after the first cycle (capacity cutoff=0.3 mAh/cm$^2$); the signal attributable to dimethyl sulfone (DMSO$_2$) significantly intensified after the 10$^{th}$ cycle (~2.9 ppm in FIG. 5, panel b and FIG. 14, panel a). G4 exhibited small amount of degradation product at ~3.7 ppm after 10 cycles (FIG. 5, panel b); after 92 cycles, however, numerous new peaks in the range of 3.6~4.7 ppm (FIG. 5, panel b) as well as a clear peak attributable to formate (~8.1 ppm, FIG. 13, panel a) appeared. Our FTIR analyses also confirmed the presence of formate in G4-based electrolyte at ~1700 cm-1 (FIG. 13, panel c). In contrast, the DMCF3SA-based electrolyte collected after the 1st (capacity cutoff=0.3 mAh/cm$^2$), 5th, 25th, and 92nd cycles appeared to be lack of appreciable new peaks in the $^1$H NMR (FIG. 5, panel b) and FTIR (FIG. 13, panel c) spectra, highlighting this solvent's desired stability under prolonged cycling conditions. Additionally, the $^{19}$F NMR analysis (FIG. 13, panel b) on the DMCF$_3$SA-based electrolyte showed negligible change for the first 25 cycles; nonetheless, the spectrum collected after 92 cycles revealed small amount of degradation products, likely resulting from parasitic reactions with Li metal electrode and/or the oxygen electrode.

In summary, design of three sulfonamide-based solvents, BTMSA, BMCF₃SA, and DMCF₃SA, for chemical and electrochemical oxidative stability in aprotic Li—O$_2$ batteries is presented. The donor numbers (DNs) of these solvents were determined to be 13~17 kcal/mol, and can dissolve lithium salts to show desirable conductivities; BTMSA-based electrolyte exhibited higher conductivity than that of tetraglyme (G4), BMCF₃SA, and DMCF₃SA. All three solvents were found to be stable in the presence of commercial Li$_2$O$_2$ and KO$_2$ powders at 80° C. for at least three days, showing superior chemical stability to DMSO. The electrochemical stability of the sulfamide- and sulfonamide-based electrolytes were evaluated using potentiostatic measurements, cyclic voltammetry (CV) and linear sweep voltammetry (LSV) tests; all three solvents showed higher electrochemical oxidative stability than DMSO. In particular, solvents with electron-withdrawing —CF$_3$ moiety, BMCF₃SA, and DMCF₃SA, were found to be considerably stable against oxidation ($V_{ox}$>4.5 $V_{Li}$). Differential electrochemical mass spectrometry (DEMS) measurements showed O$_2$ as the vastly predominant gas evolved on charge; cells employing sulfonamide-based electrolytes exhibited ~50% higher overall O$_2$ evolution than the DMSO cell. Li—O$_2$ cells employing DMCF₃SA-based electrolyte was cycled for 90 times without capacity decay. Results presented in this study demonstrate that sulfonamide-based solvents with thoughtfully designed molecular structures are promising candidates for aprotic Li—O$_2$ battery electrolytes.

Figure 16:
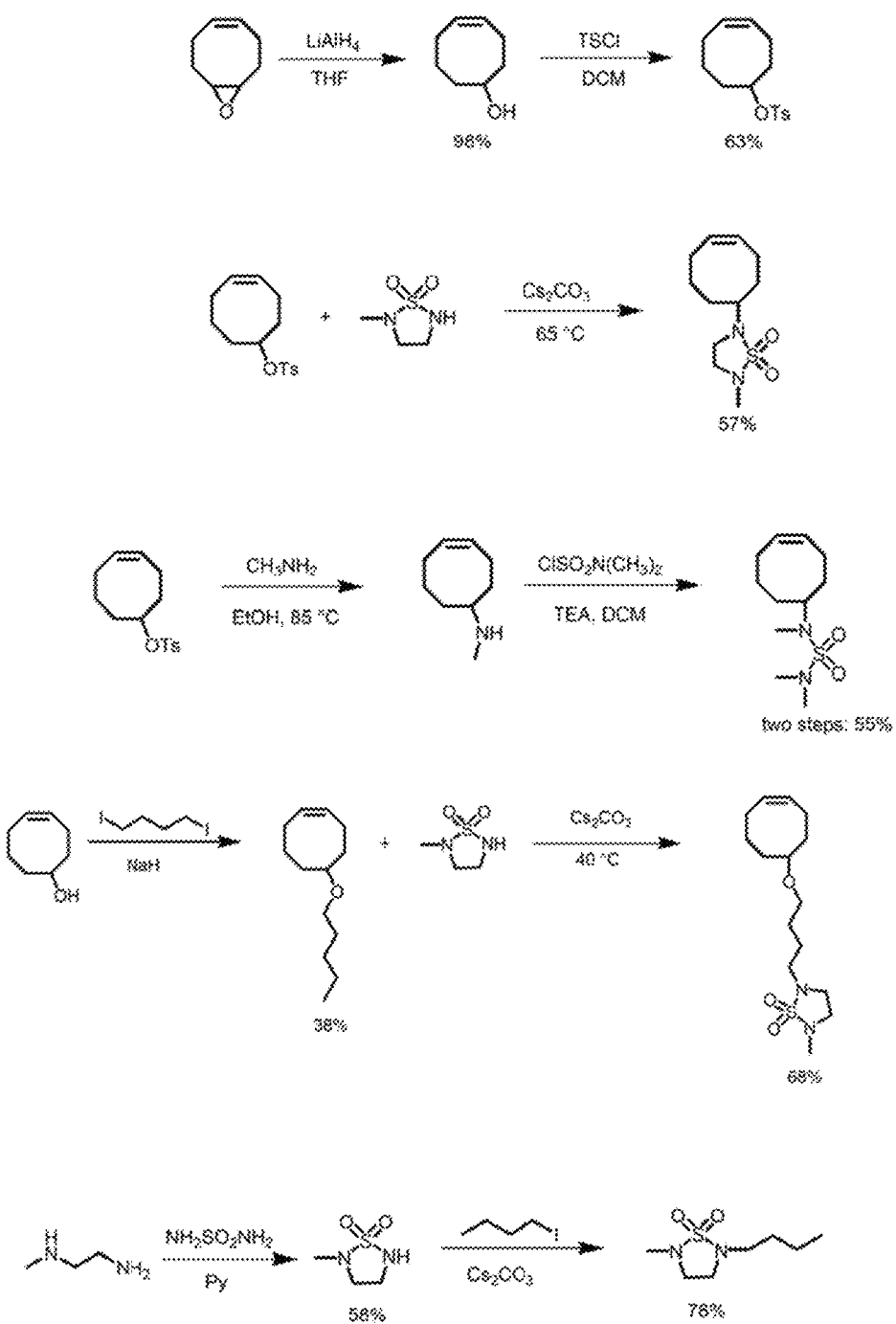
FIG. 16 depicts synthetic schemes to compounds described herein.

FIG. 16 depicts synthetic schemes to compounds described herein.

Figure 17:
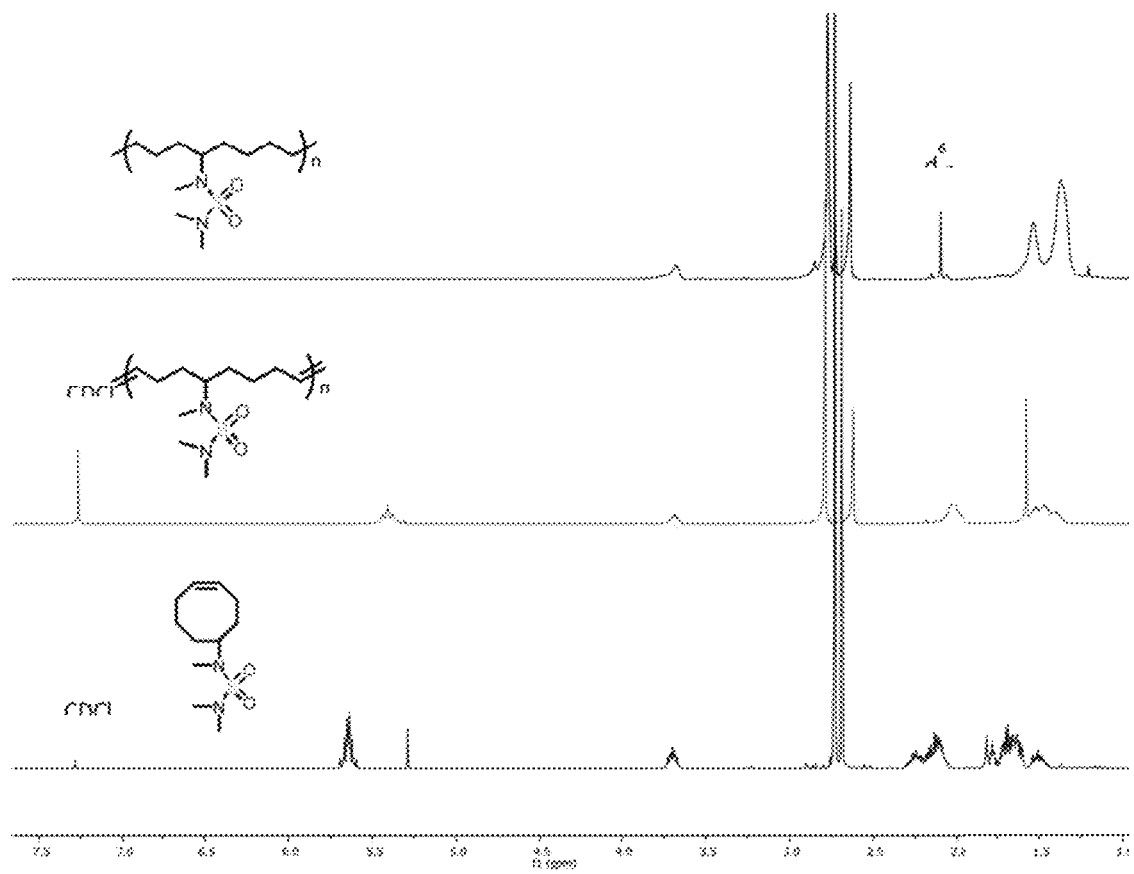
FIGS. 17-19 depict properties of compounds described herein.
Figure 18:
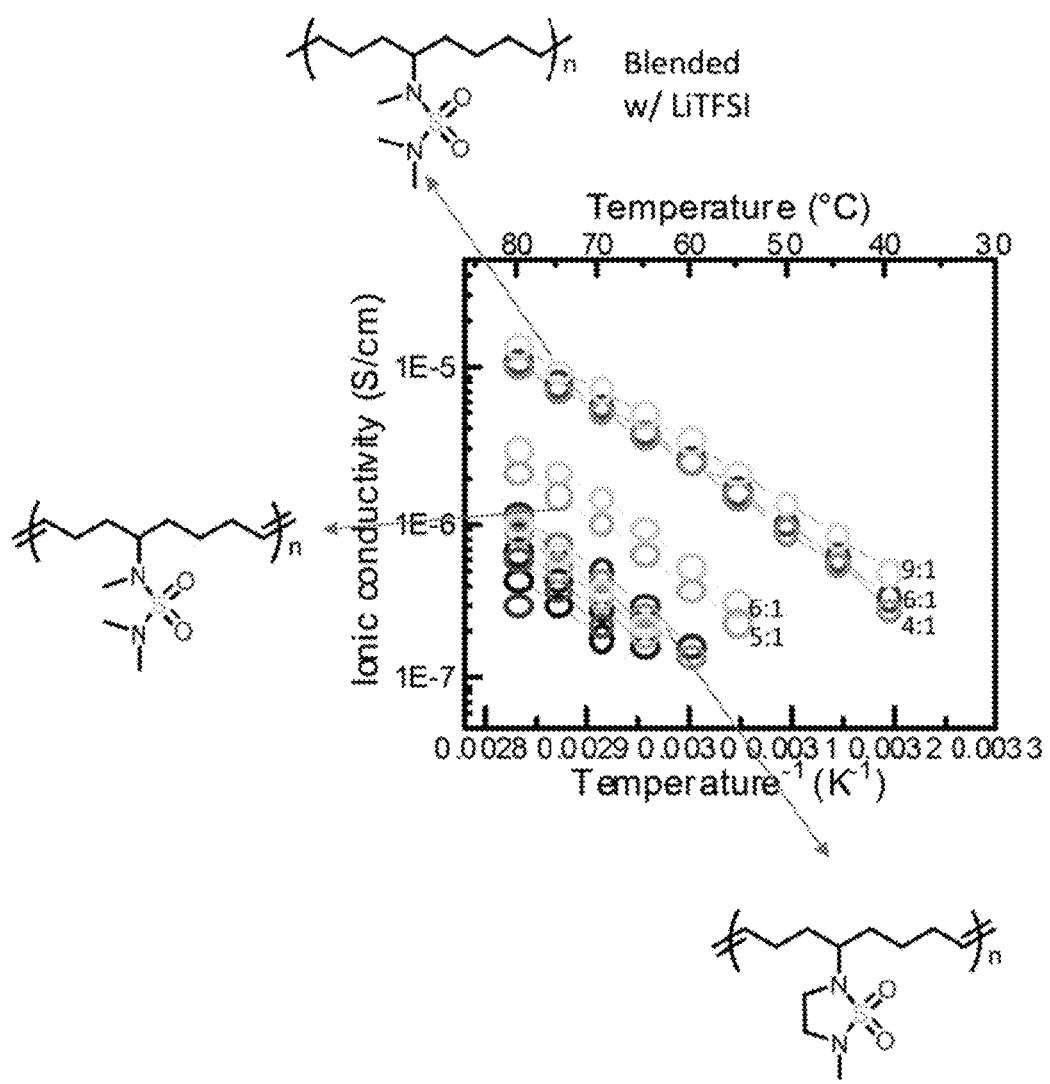
Figure 19:
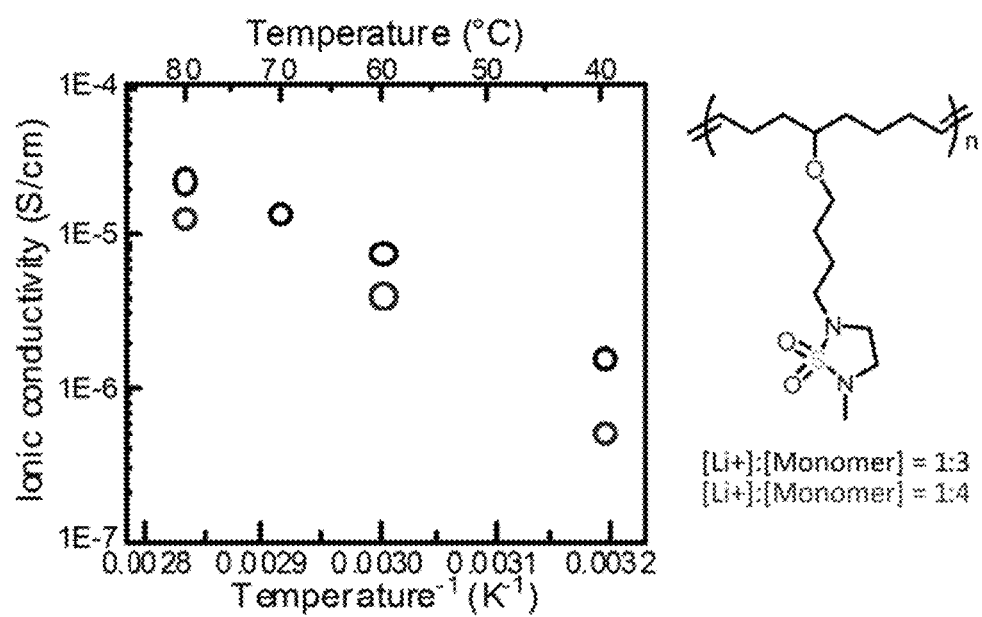

FIGS. 17-19 depict properties of compounds described herein.

Figure 20:
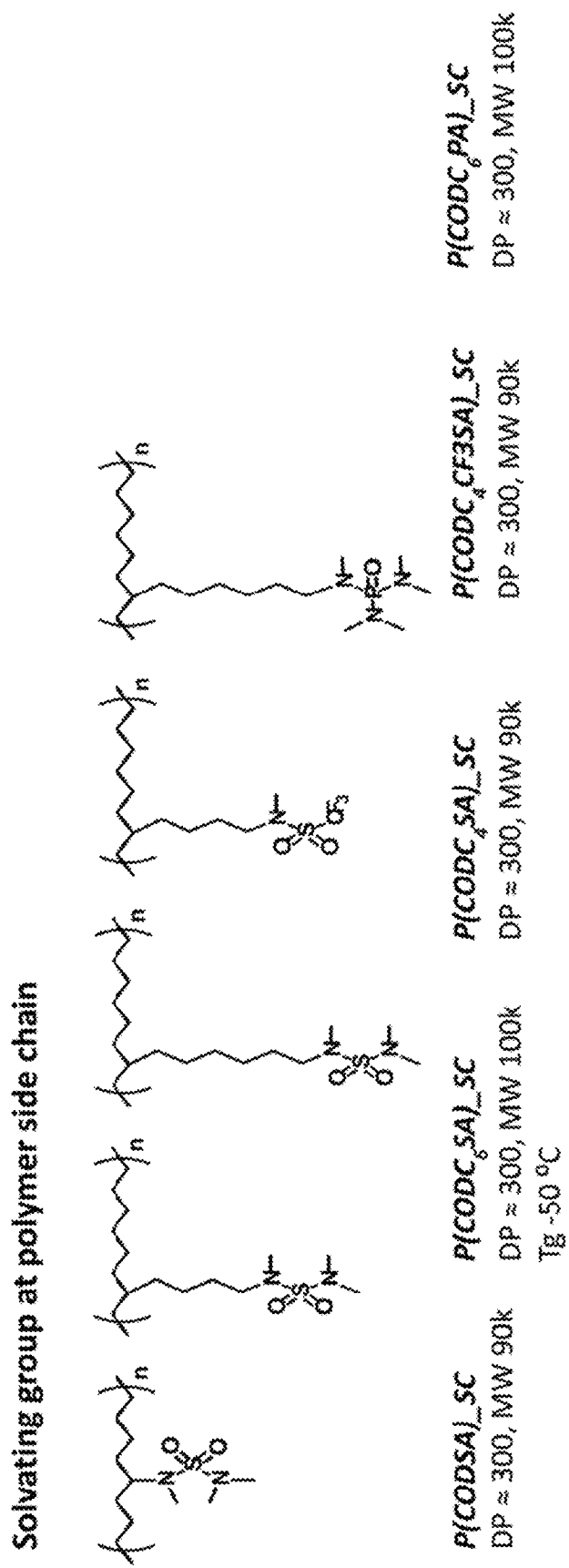
FIGS. 20-21 depict polymers described herein.
Figure 21:
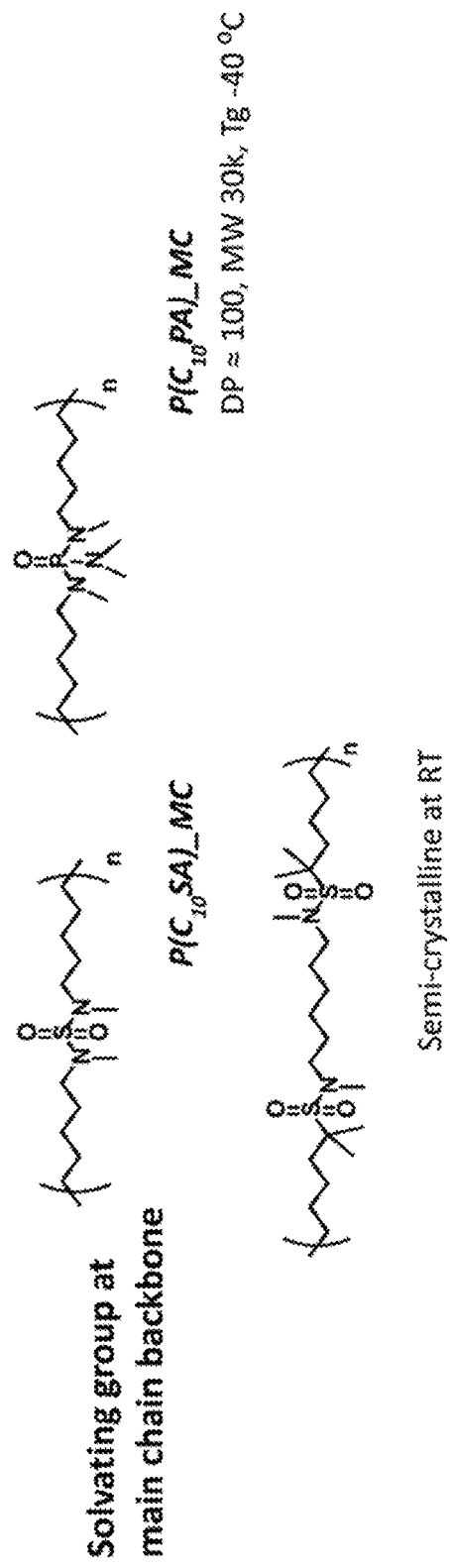

FIG. 20-21 depict polymers described herein.

Figure 22:
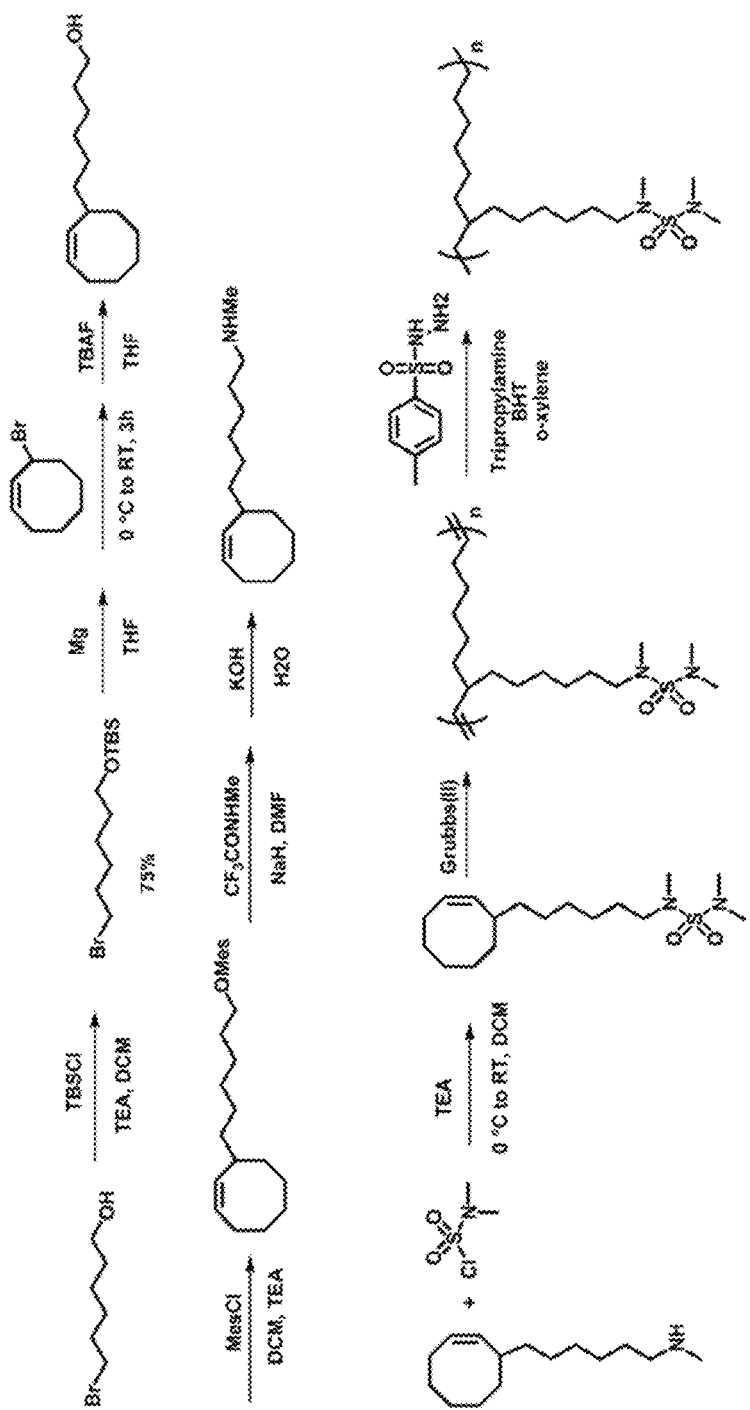
FIGS. 22-23 depict synthetic schemes to compounds and polymers described herein.
Figure 23:
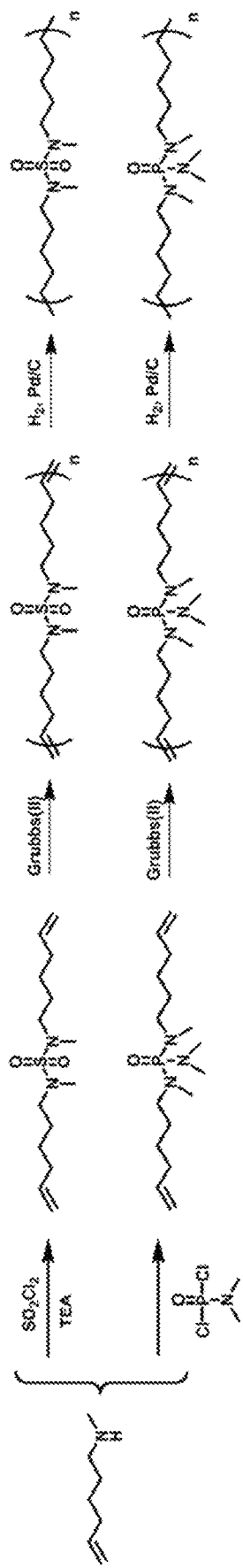

FIGS. 22-23 depict synthetic schemes to compounds and polymers described herein.

Figure 24:
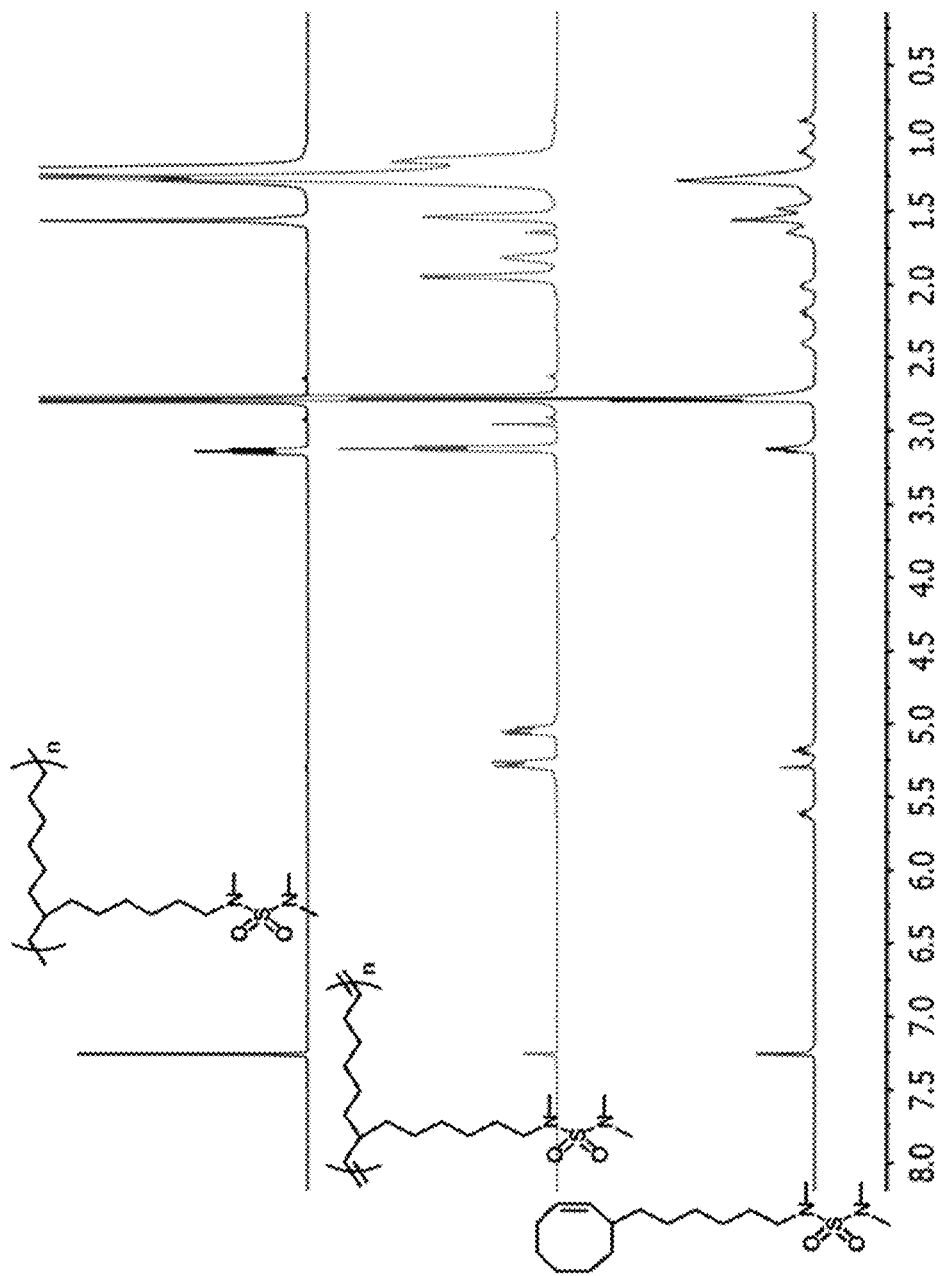
FIG. 24 depicts properties of polymers described herein.

FIG. 24 depicts properties of polymers described herein.

Figure 25:
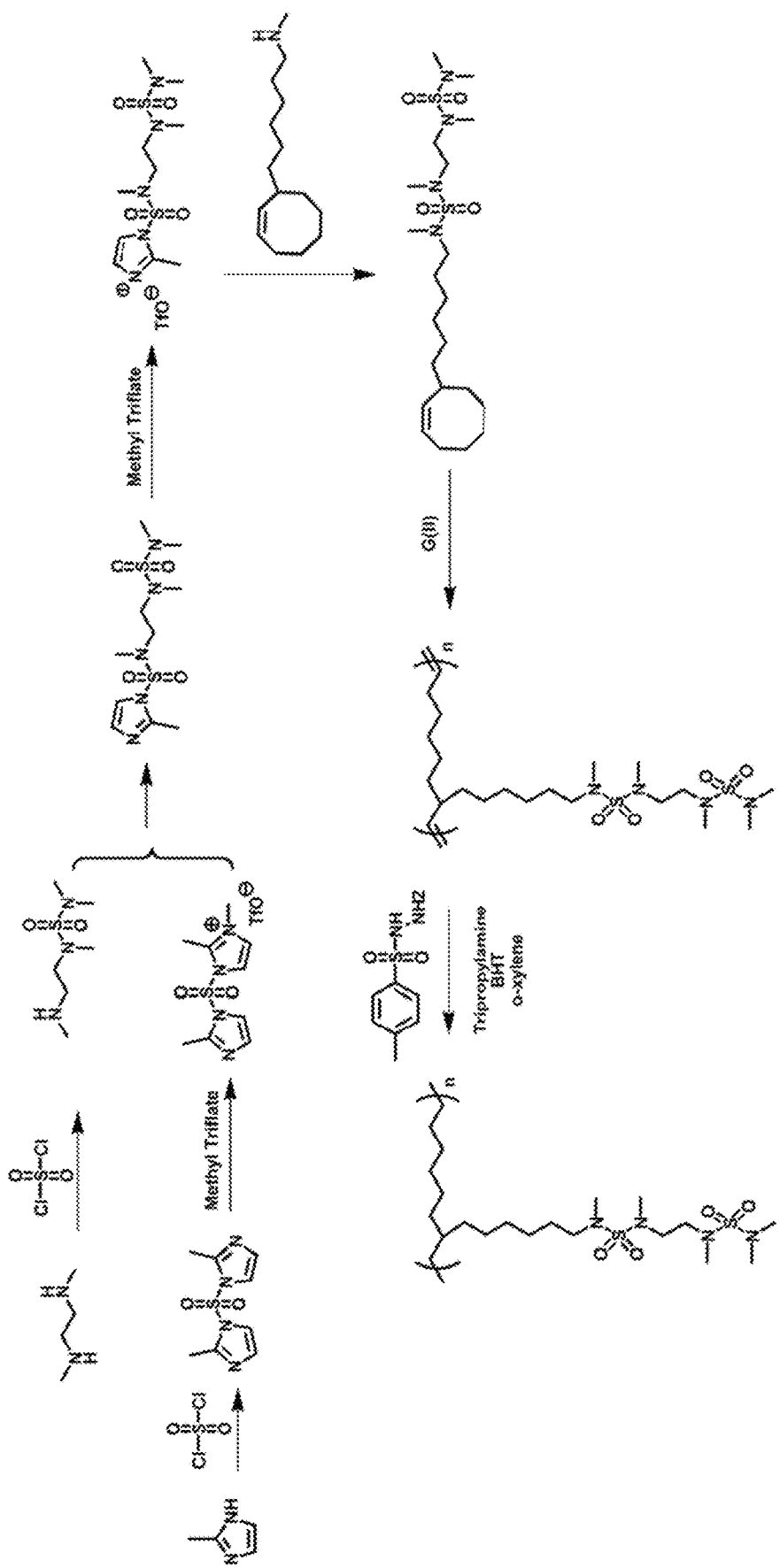
FIG. 25 depicts synthetic schemes to compounds and polymers described herein.

FIG. 25 depicts synthetic schemes to compounds and polymers described herein.

Figure 26:
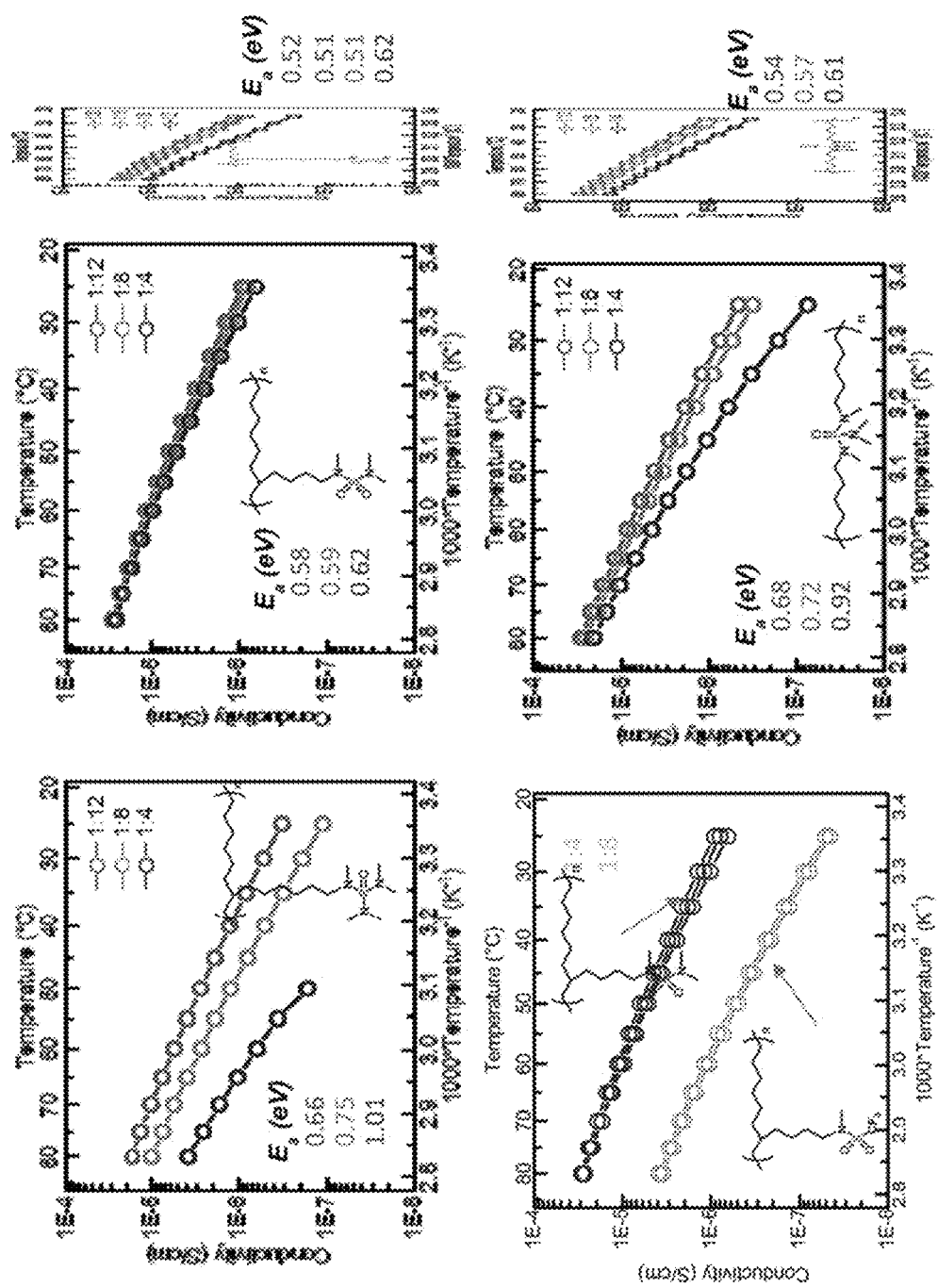
FIGS. 26-27 depict properties of polymers described herein.
Figure 27:
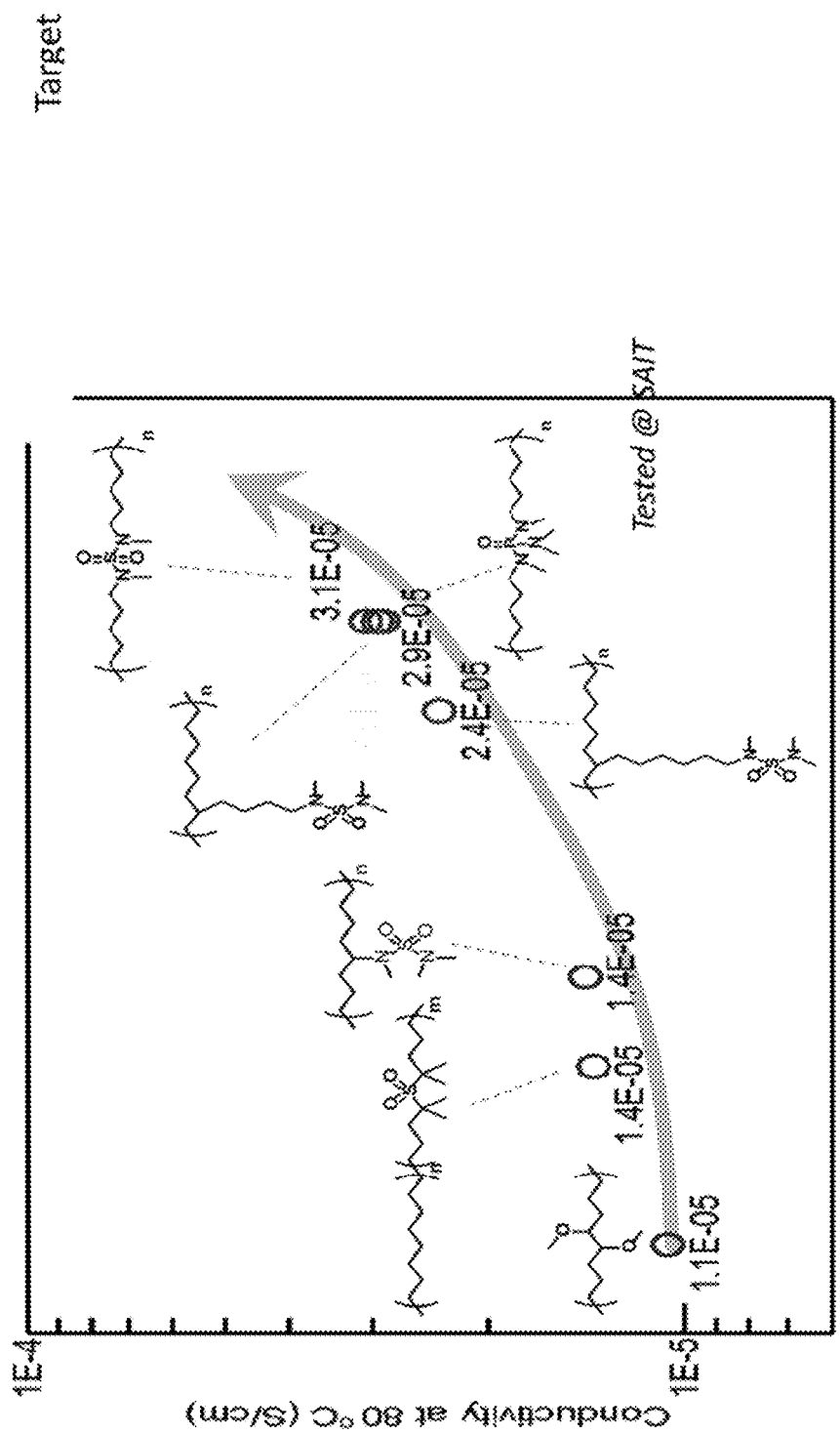

FIGS. 26-27 depict properties of polymers described herein.

Figure 29:
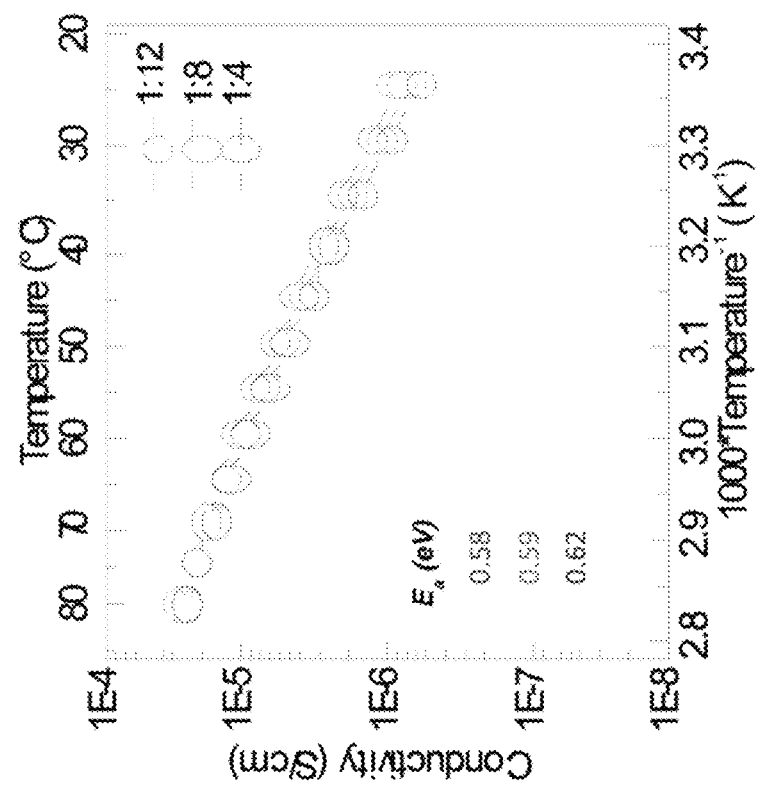

FIGS. 28-29 depict properties of batteries with polymers described herein, with different ratios of electrolyte to monomer groups.

Figure 30:
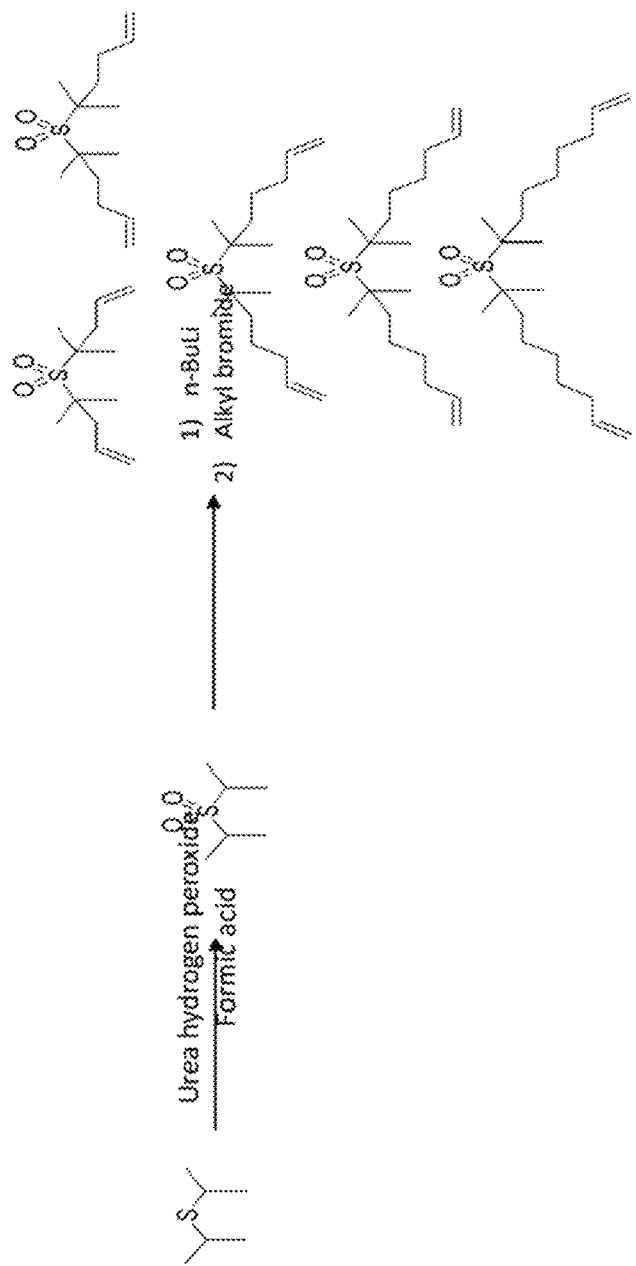
FIG. 30 depicts synthetic schemes to compounds described herein.

FIG. 30 depicts synthetic schemes to compounds described herein.

Figure 31:
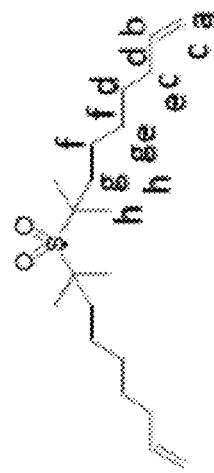
FIG. 31 depicts properties of compounds described herein.
Figure 31:
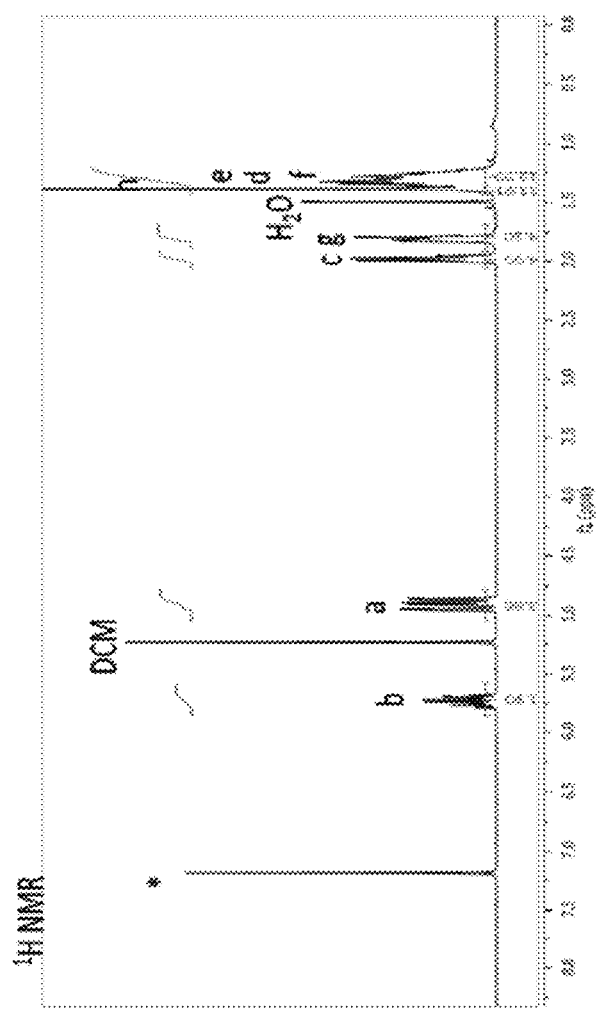

FIG. 31 depicts properties of compounds described herein.

Figure 32:
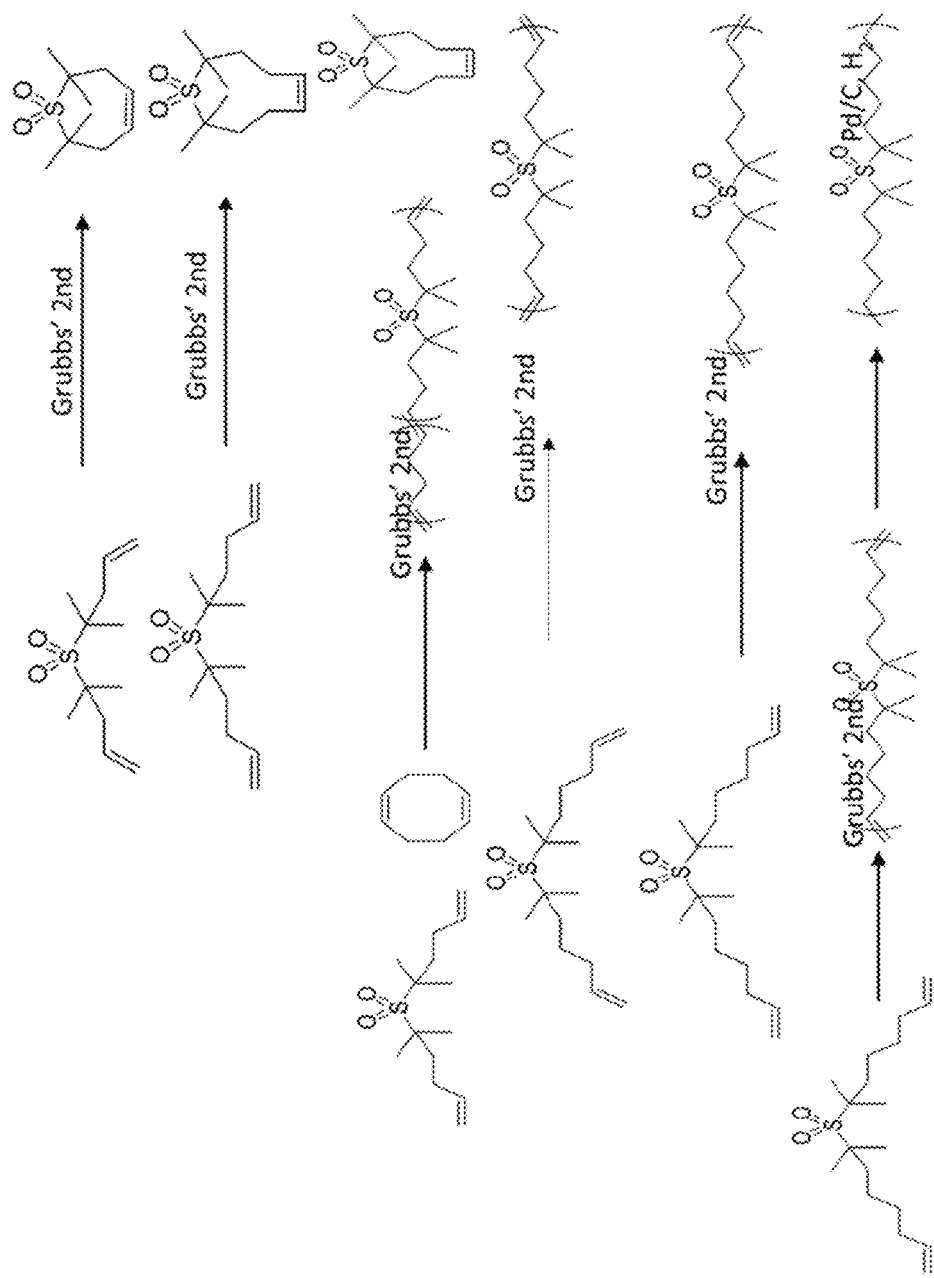
FIG. 32 depicts synthetic schemes to polymers described herein.

FIG. 32 depicts synthetic schemes to polymers described herein.

Figure 33:
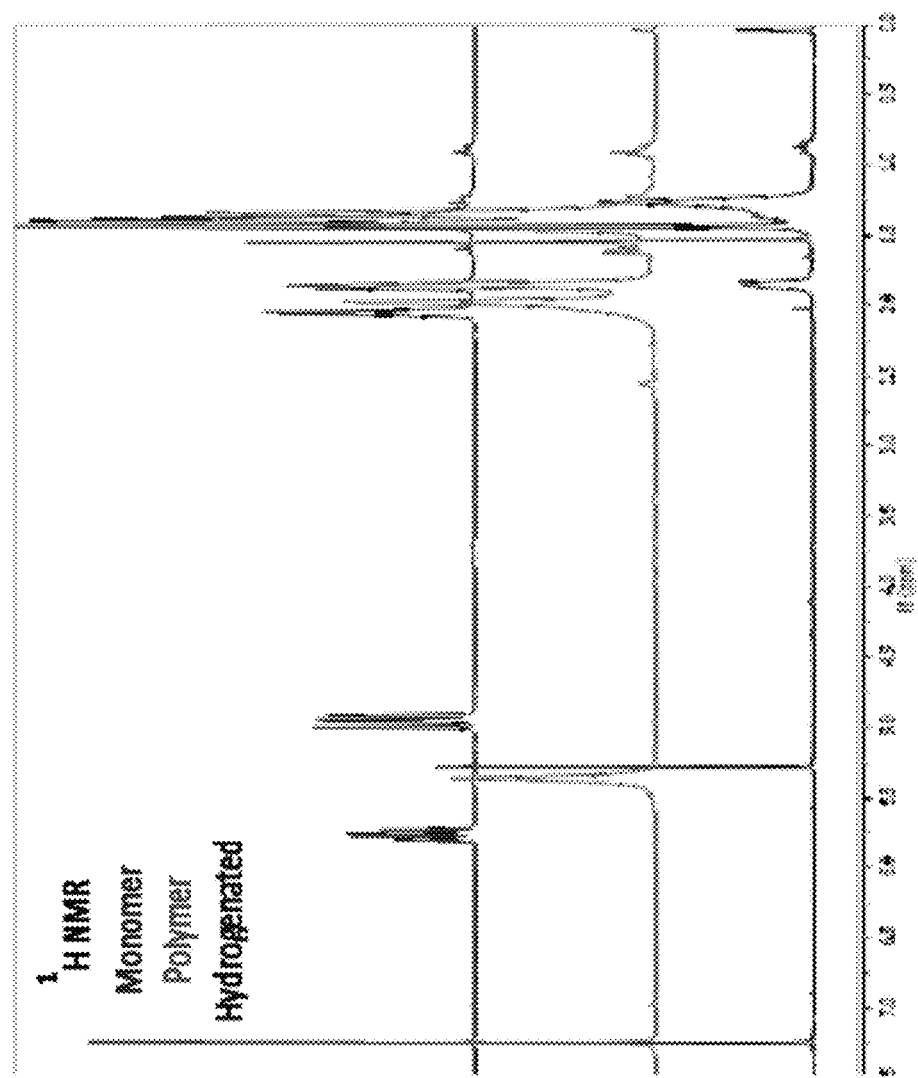
FIGS. 33-34 depict properties of polymers described herein.
Figure 34:
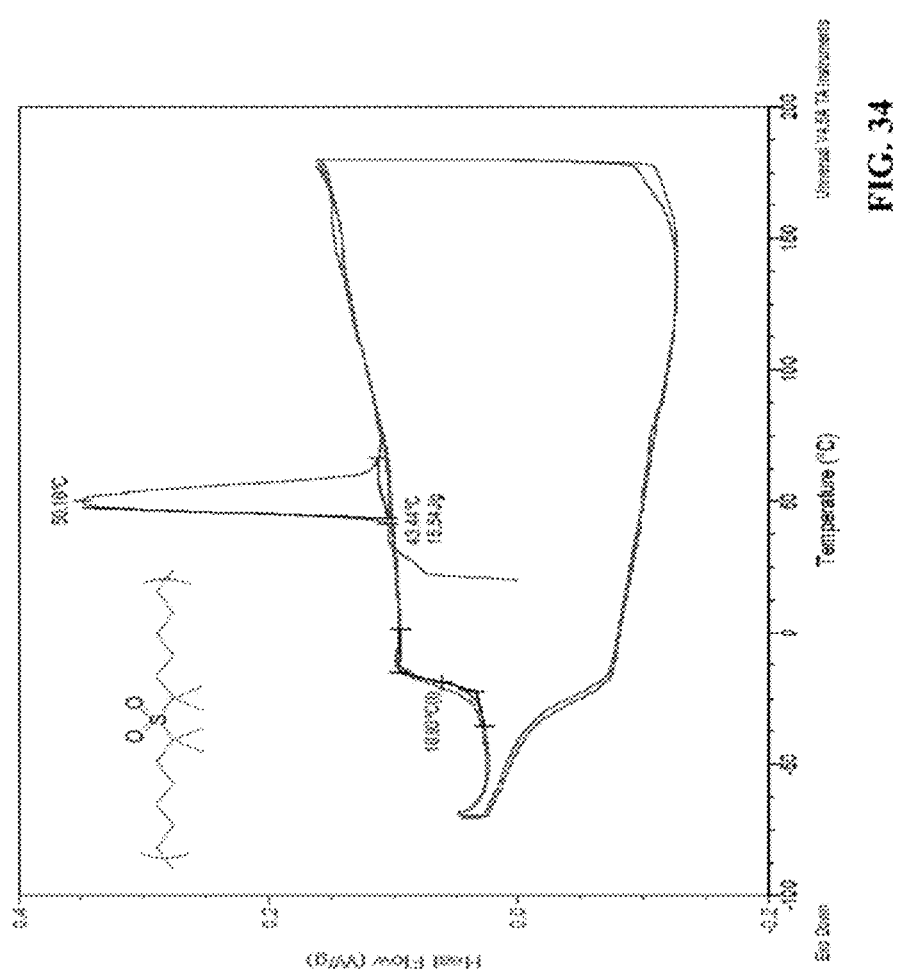

FIGS. 33-34 depict properties of polymers described herein.

Figure 35:
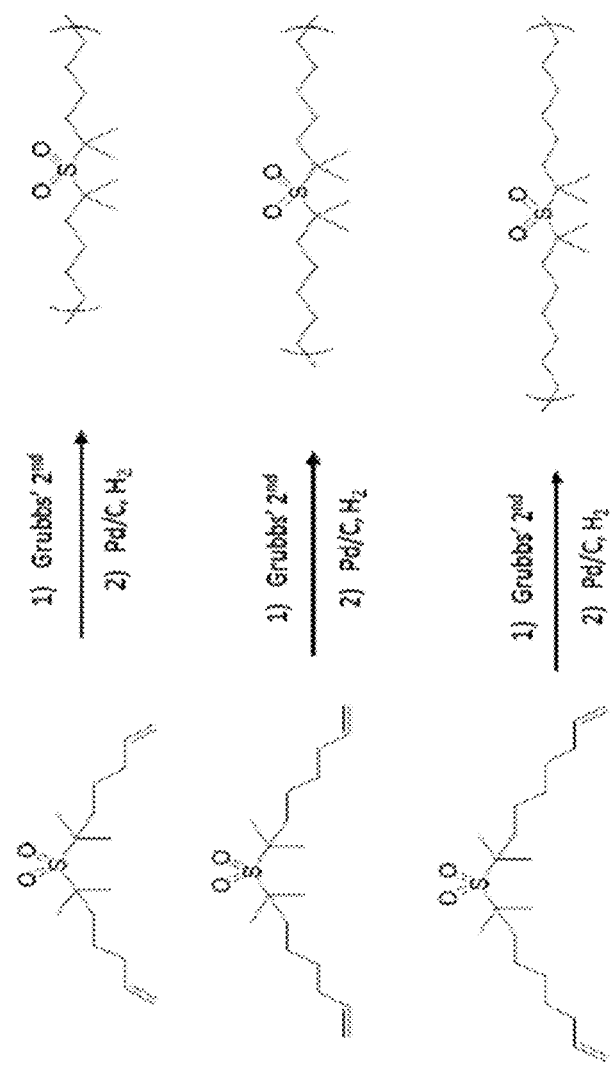
FIG. 35 depicts synthetic schemes to polymers described herein.

FIG. 35 depicts synthetic schemes to polymers described herein.

Figure 36:
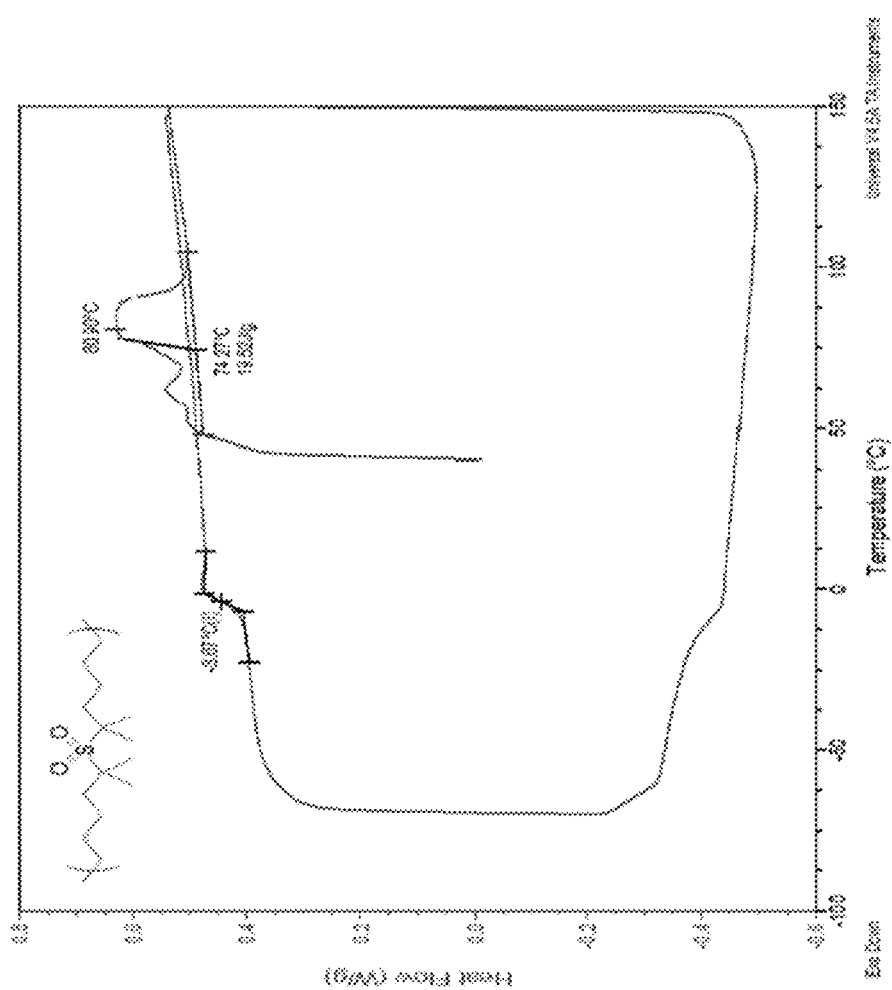
FIGS. 36-38 depict properties of polymers described herein.
Figure 37:
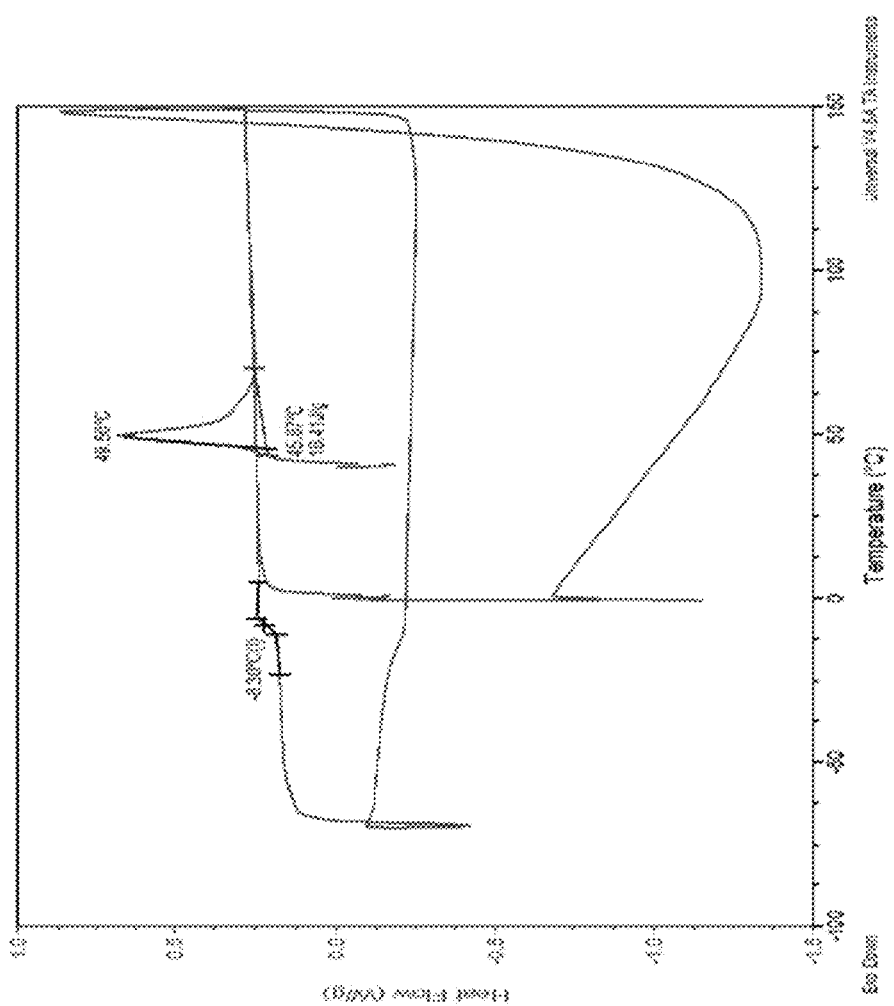
Figure 38:
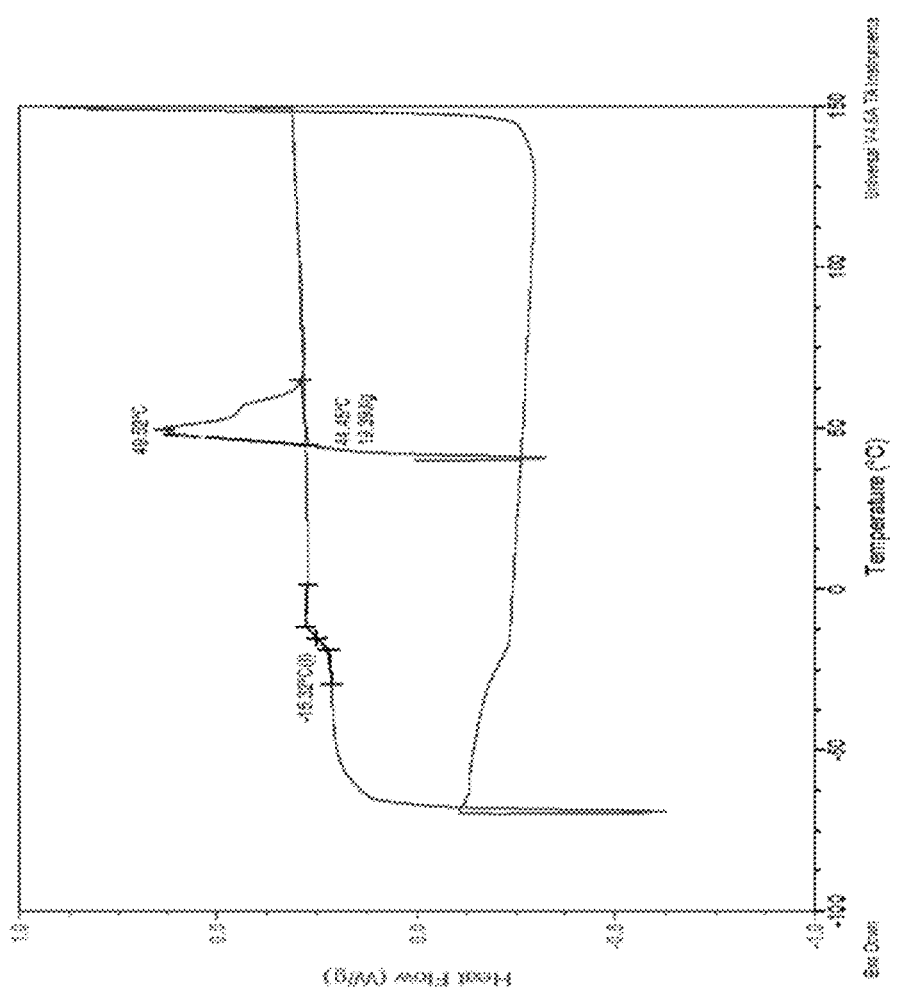

FIGS. 36-38 depict properties of polymers described herein.

Figure 39:
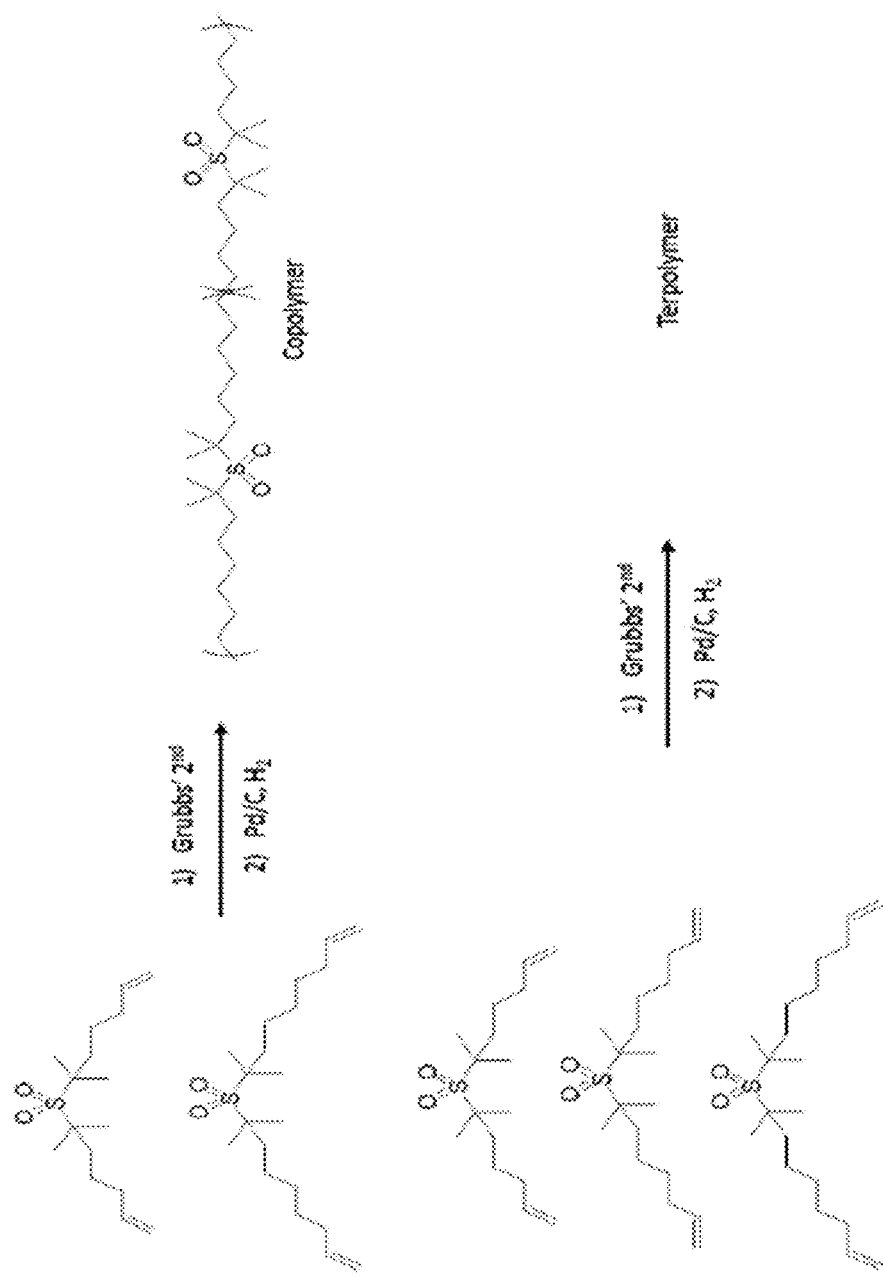
FIG. 39 depicts synthetic schemes to polymers described herein.
Figure 40:
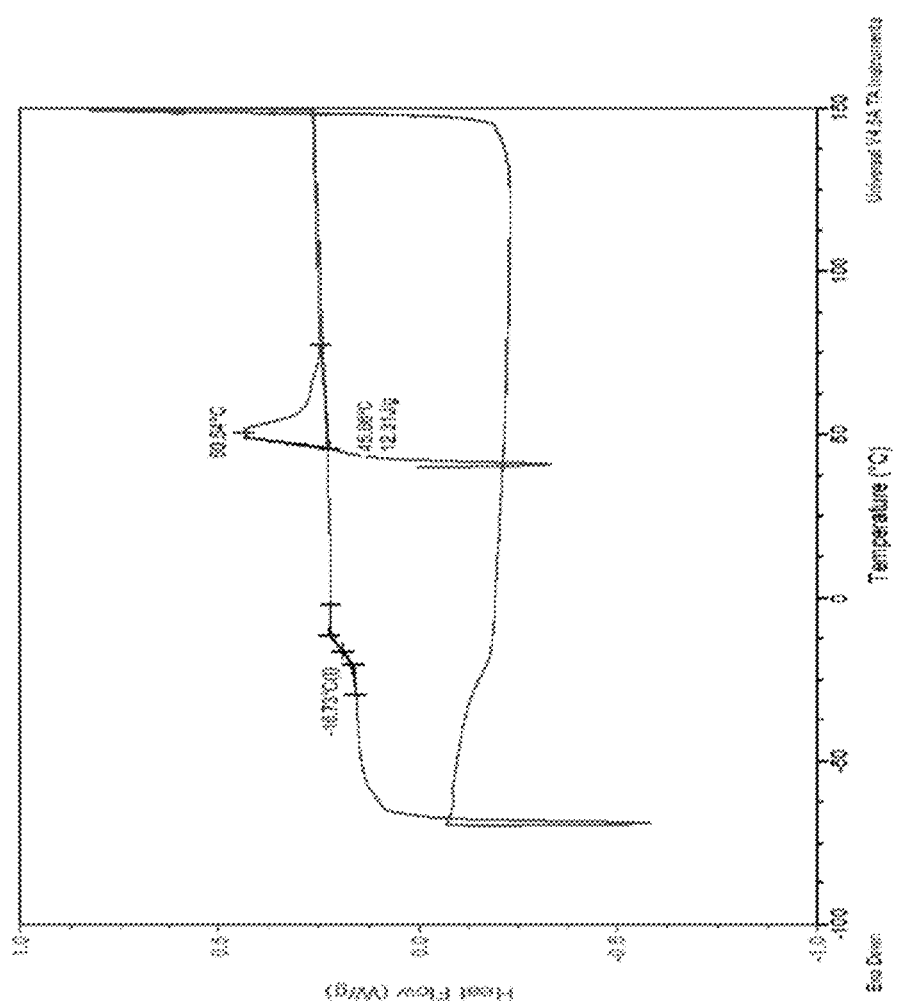
FIGS. 40-47 depict properties of polymers and batteries including the polymers described herein.
Figure 41:
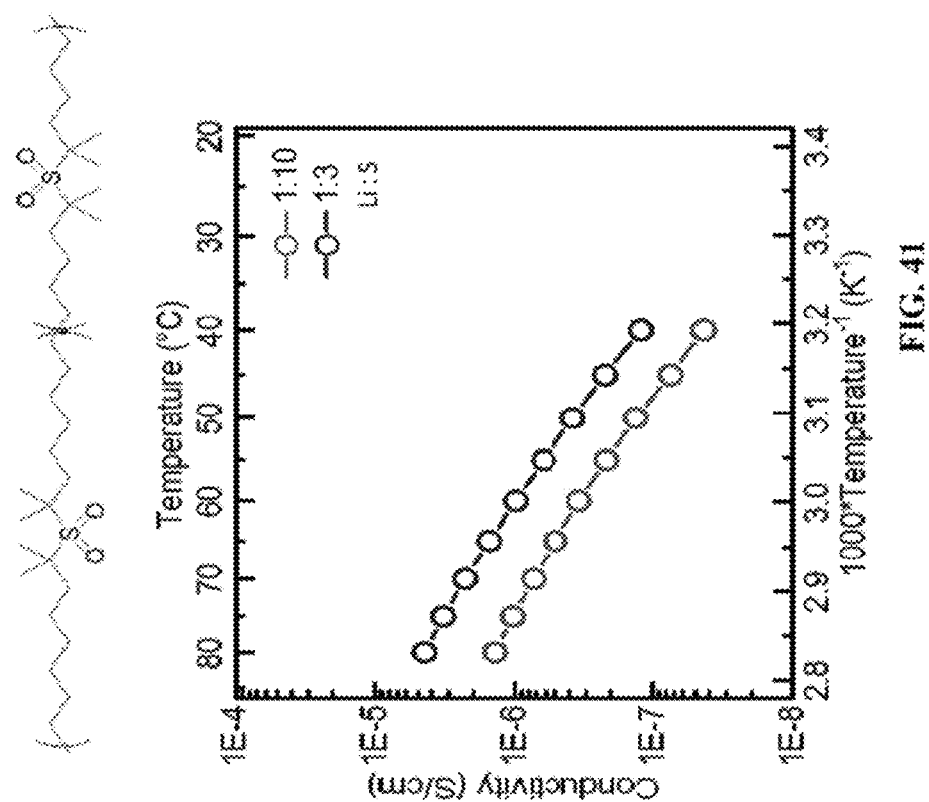
Figure 42:
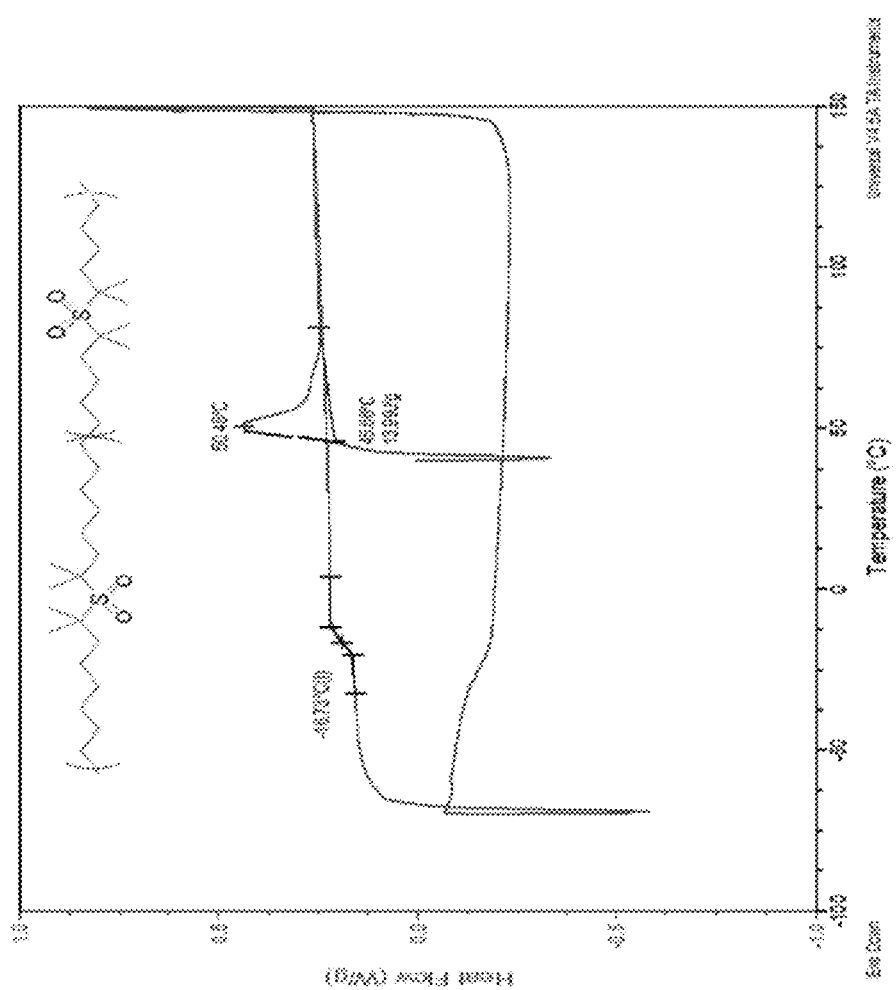
Figure 43:
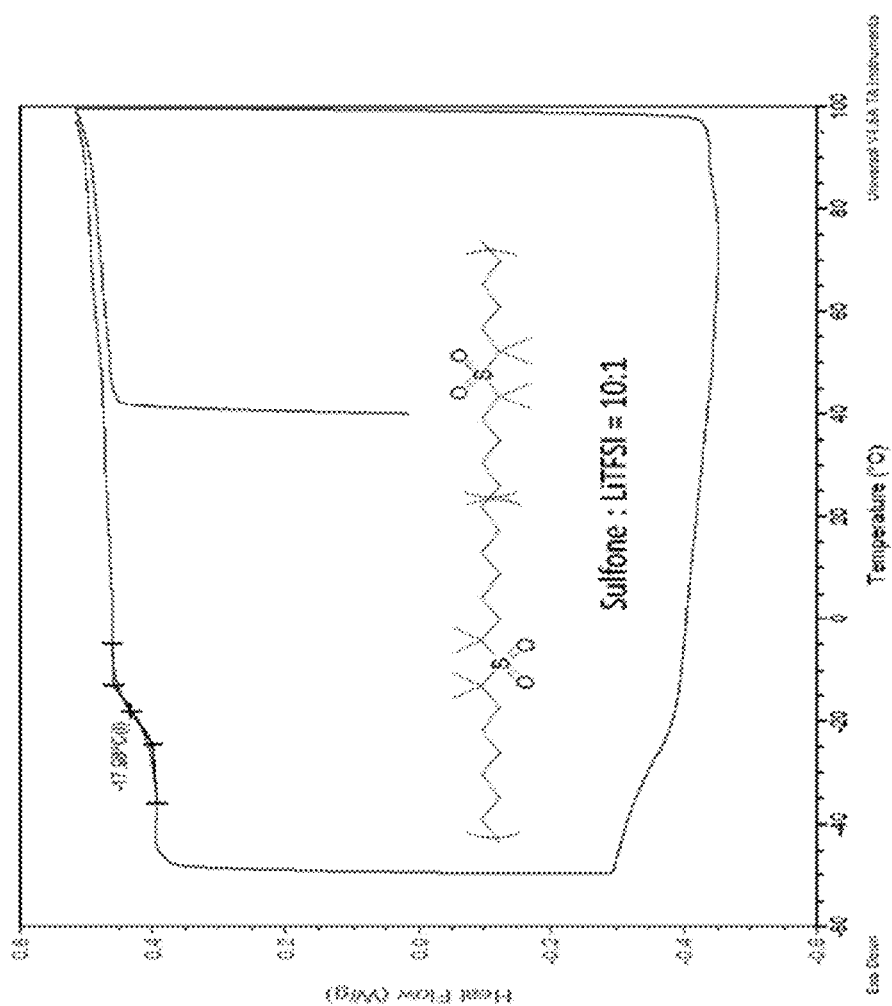
Figure 44:
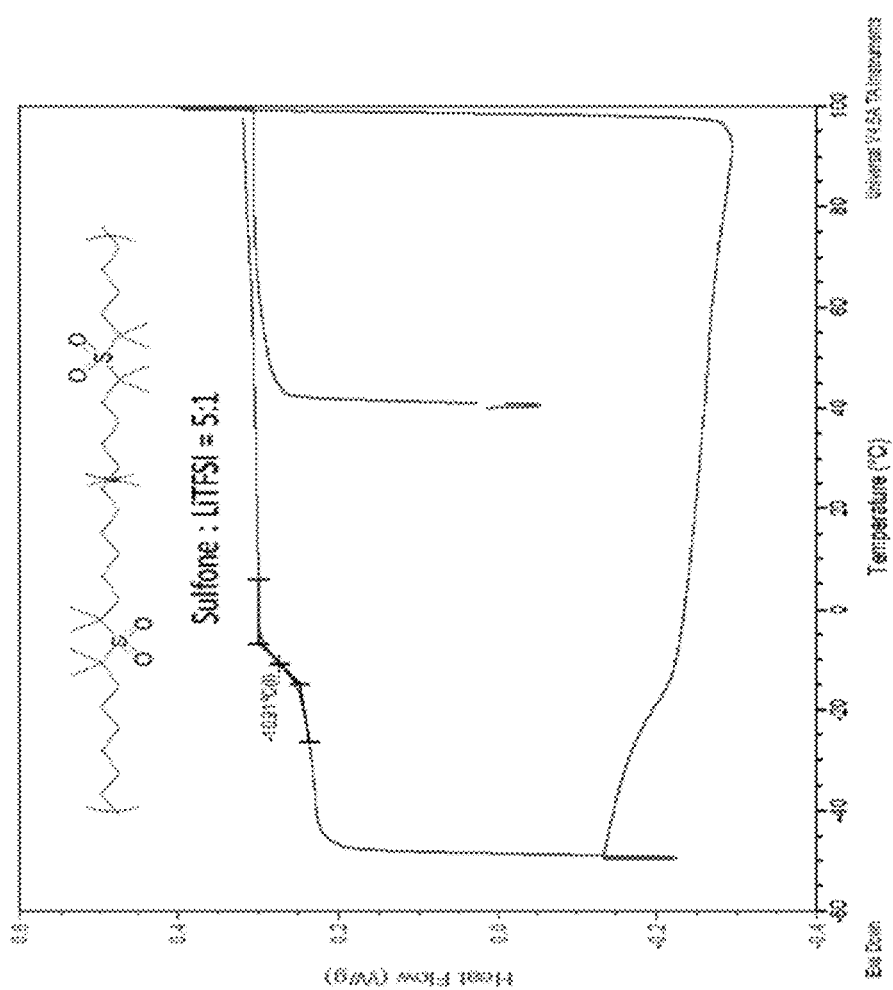
Figure 45:
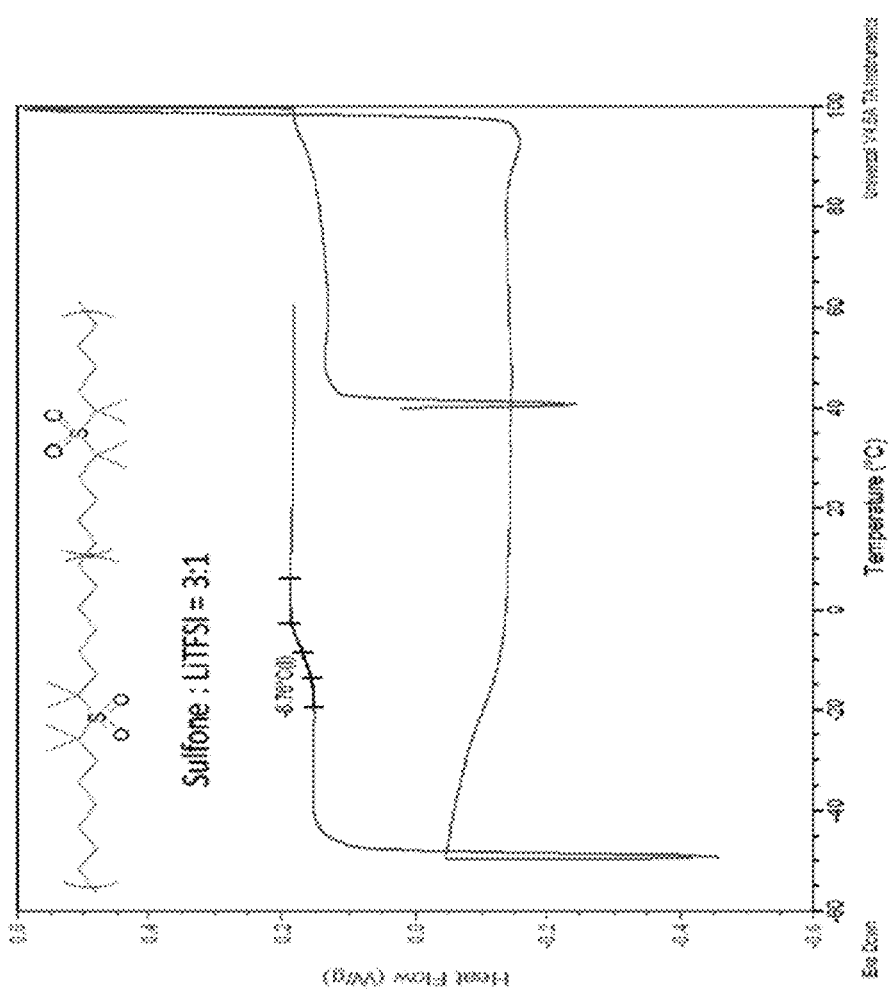
Figure 46:
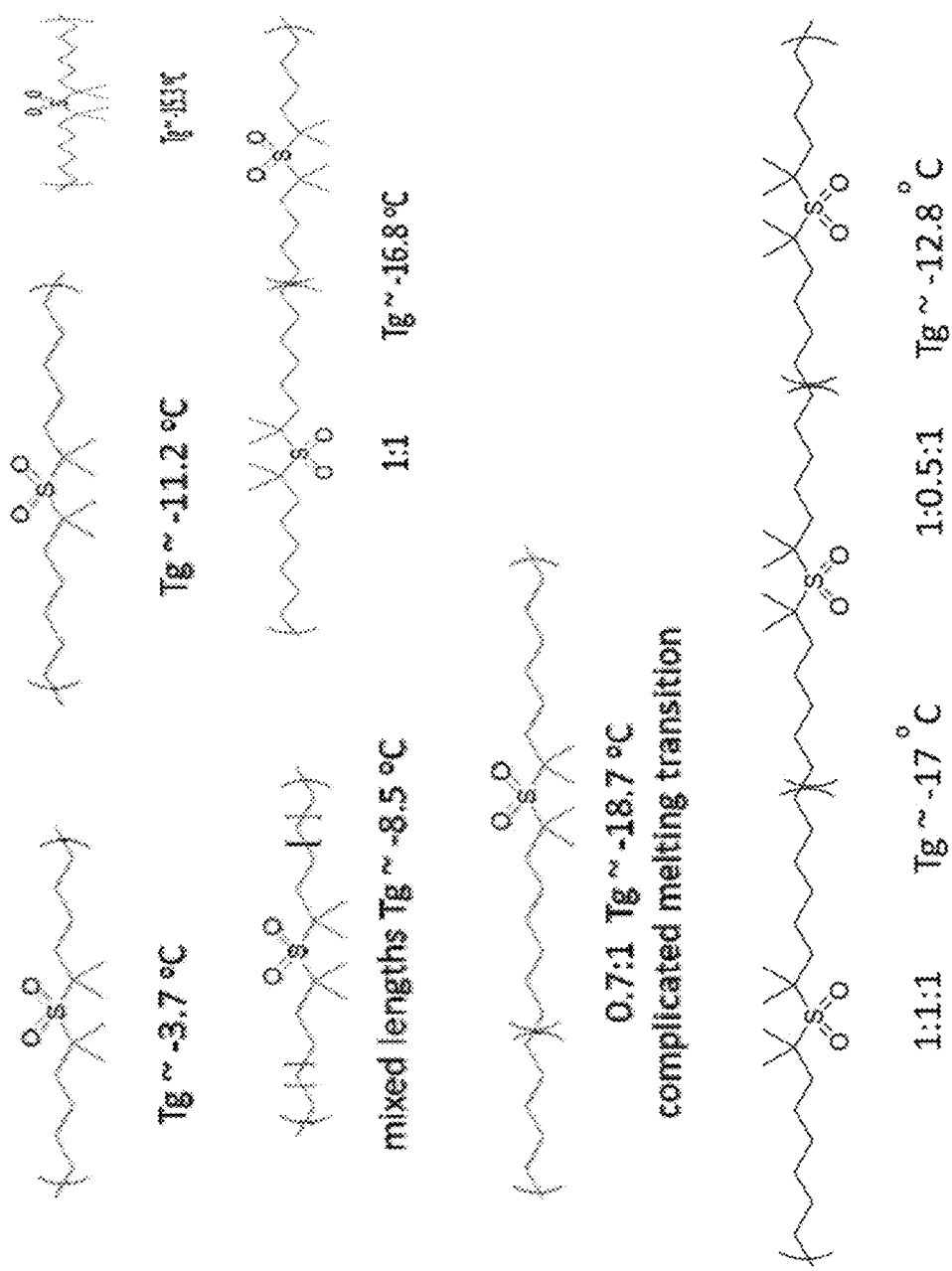
Figure 47:
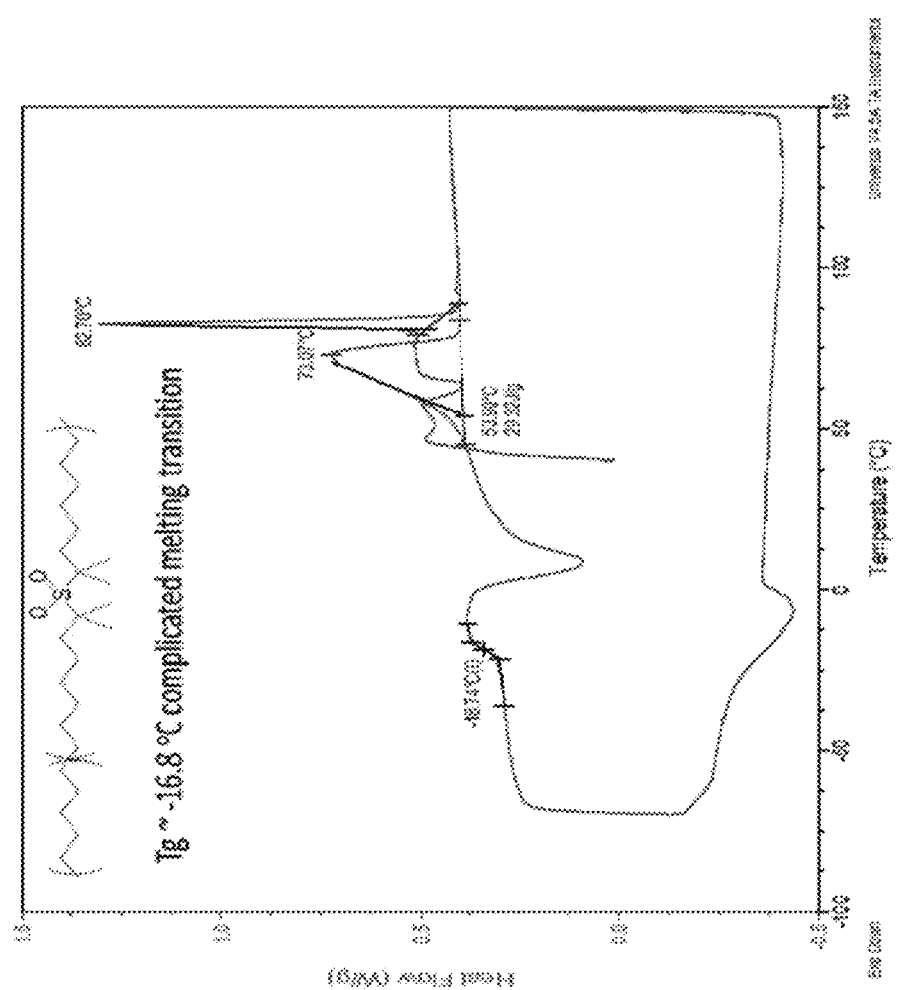

FIG. 39 depicts synthetic schemes to polymers described herein.

FIGS. 40-47 depict properties of polymers and batteries including the polymers described herein.

Figure 48:
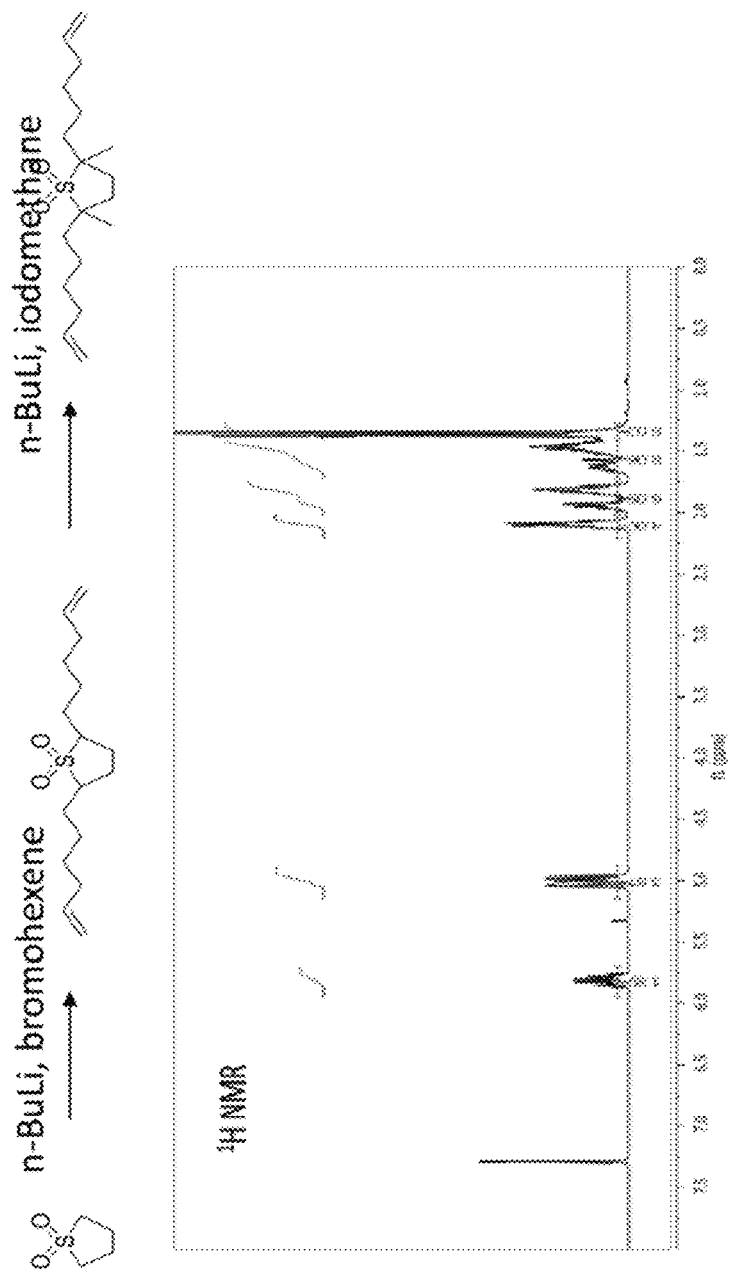
FIG. 48 depicts a synthetic scheme and properties of polymers described herein.

FIG. 48 depicts a synthetic scheme and properties of polymers described herein.

Figure 49:
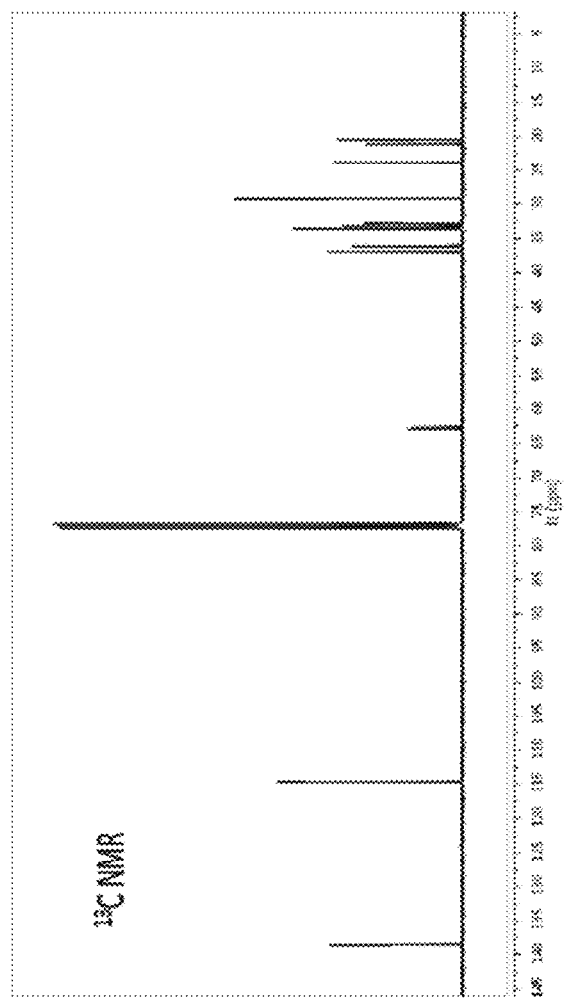
FIGS. 49-50 depict properties of polymers and batteries including the polymers described herein.
Figure 50:
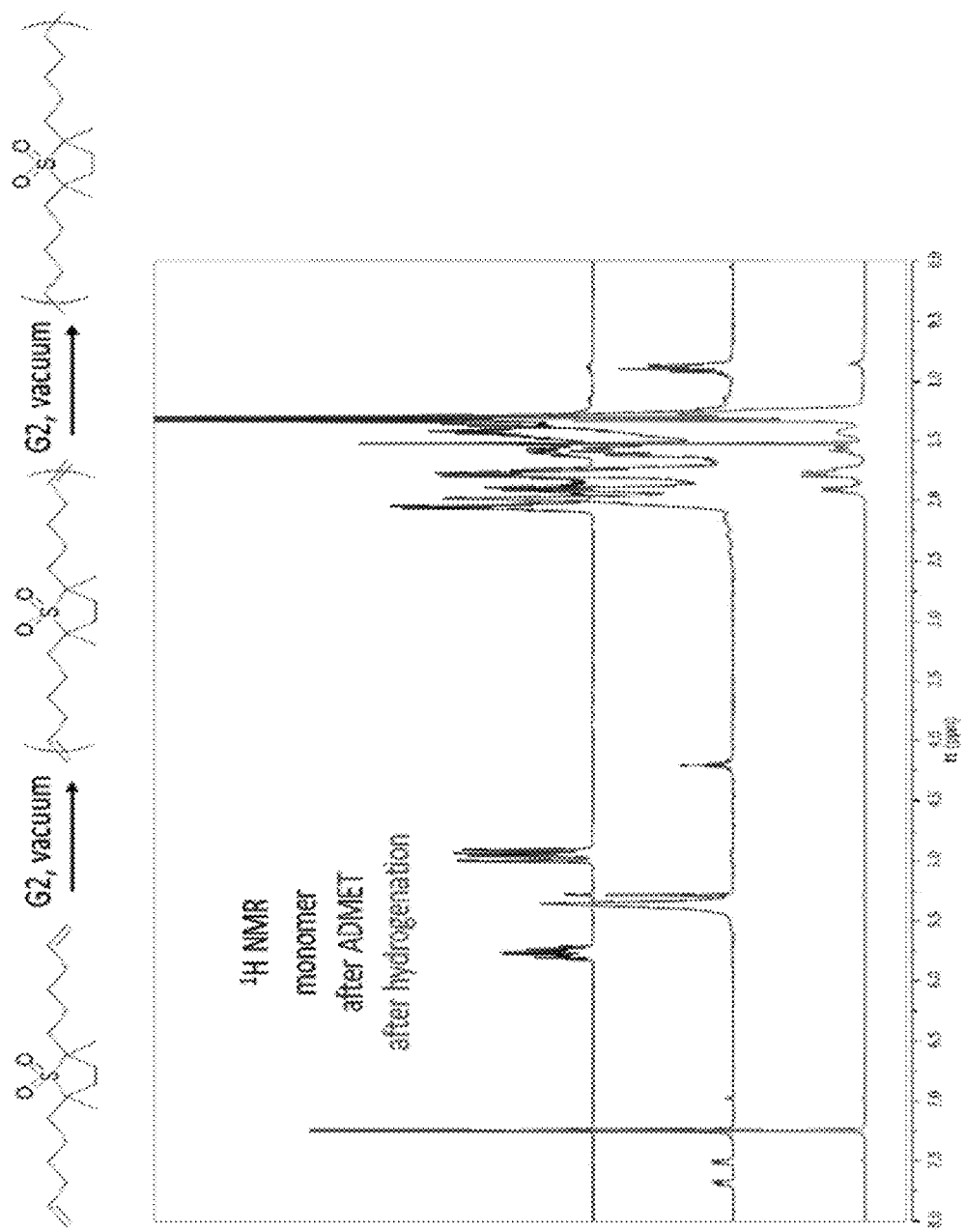

FIGS. 49-50 depict properties of polymers and batteries including the polymers described herein.

Figure 51:
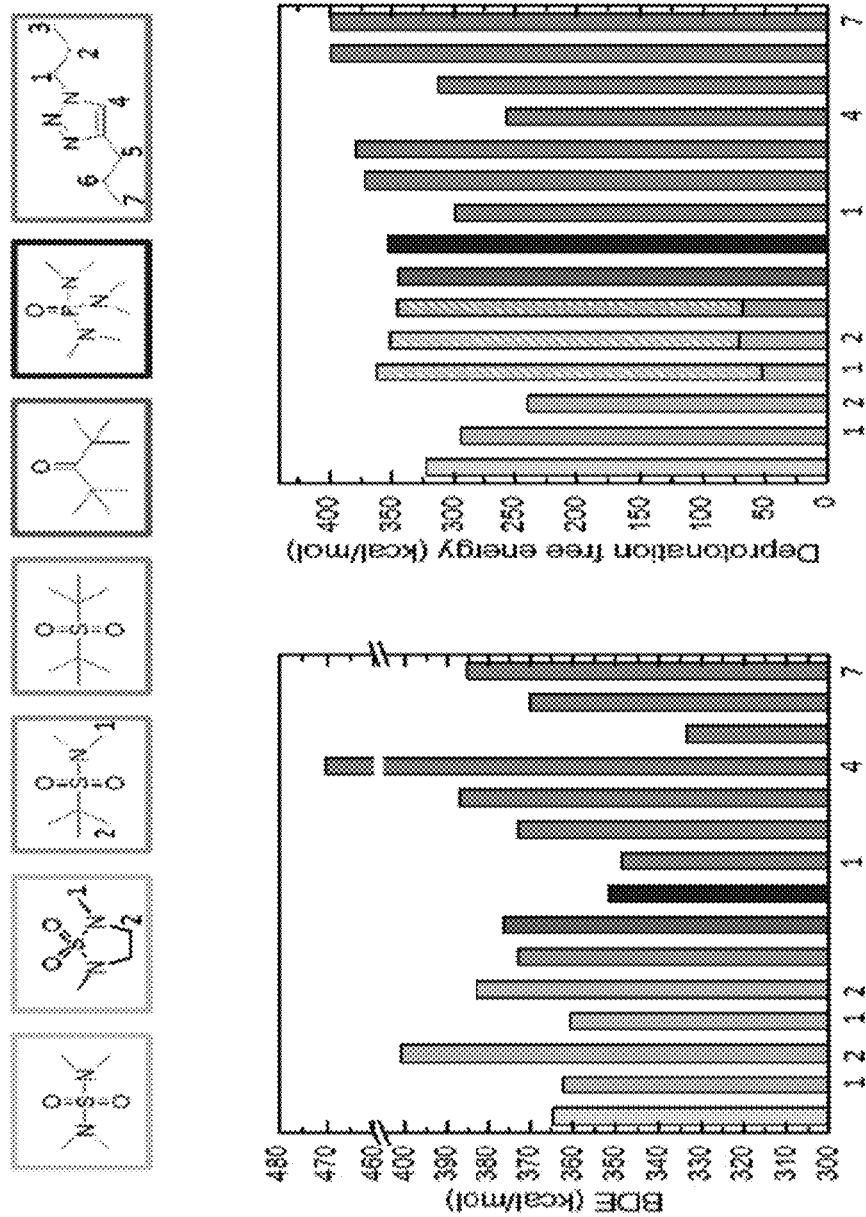
FIG. 51 depicts properties of solvents described herein.

FIG. 51 depicts properties of solvents described herein.

Details of one or more embodiments are set forth in the accompanying drawings and description. Other features, objects, and advantages will be apparent from the description, drawings, and claims. Although a number of embodiments of the invention have been described, it will be understood that various modifications may be made without departing from the spirit and scope of the invention. It should also be understood that the appended drawings are not necessarily to scale, presenting a somewhat simplified representation of various features and basic principles of the invention.

What is claimed:

1. A composition comprising a polyolefin including a plurality of functional groups in a backbone of the polyolefin, directly bonded to a backbone of the polyolefin via an N or O, or a C4-C6 alkyl or alkenyl optionally interrupted by O, S or NR, the functional groups including an aprotic polar group selected from the group consisting of sulfamide, a sulfonamide or phosphoramide groups.

2. A composition comprising a polyolefin including a plurality of functional groups, the functional groups including an aprotic polar group selected from the group consisting of sulfamide, sulfonamide or phosphoramide groups, wherein the polyolefin includes a polymer block selected from the group consisting of:

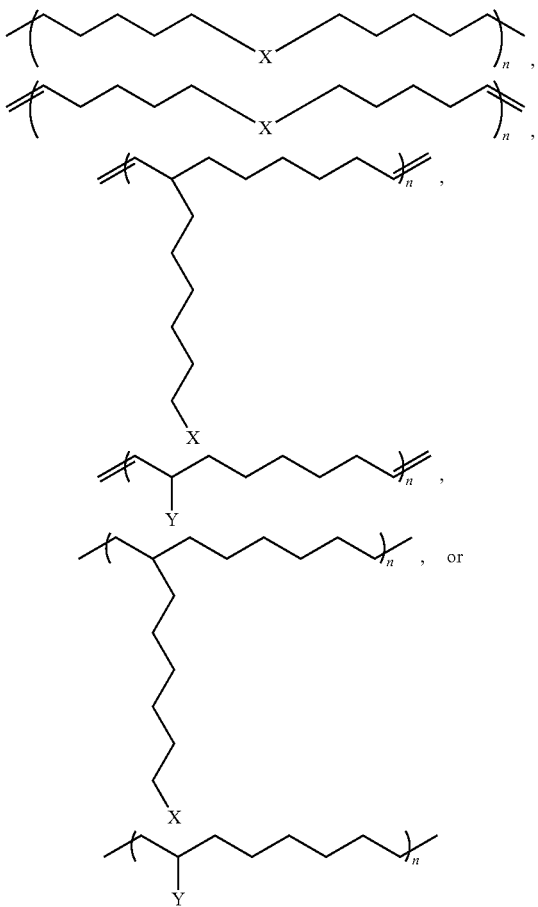

wherein n is 1 to 100,000 and X is a functional group including one or more sulfamide, sulfonamide, or phosphoramide groups, and Y is a bond or a C1-C6 alkyl or alkenyl optionally interrupted by O, S or NR, where NR is N-C1-C6 alkyl and including a moiety having one or more sulfamide, sulfonamide, or phosphoramide groups.

3. A composition comprising a polyolefin including a plurality of functional groups, the functional groups including an aprotic polar group selected from the group consisting of sulfamide, sulfonamide, sulfoxy, carbonyl, phosphoramide or heterocyclic groups, and wherein the polyolefin includes a polymer block selected from the group consisting of:

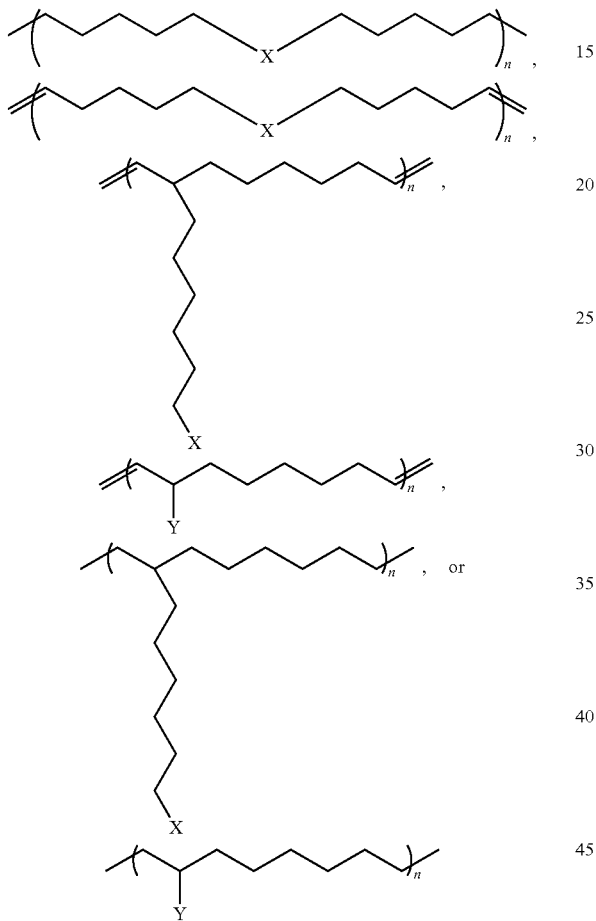

wherein n is 1 to 100,000 and X is a functional group including one or more sulfamide, sulfonamide, sulfoxy, carbonyl, phosphoramide or heterocyclic groups, and Y is a bond or a C1-C6 alkyl or alkenyl optionally interrupted by O, S or NR, where NR is N-C1-C6 alkyl and including a moiety having one or more functional group including sulfamide, sulfonamide, sulfoxy, carbonyl, phosphoramide or heterocyclic groups wherein X is a monovalent or divalent moiety having a structure selected from the group consisting of

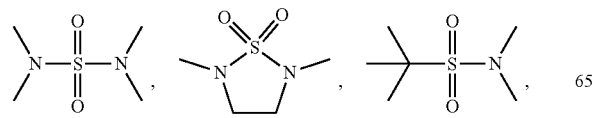

-continued

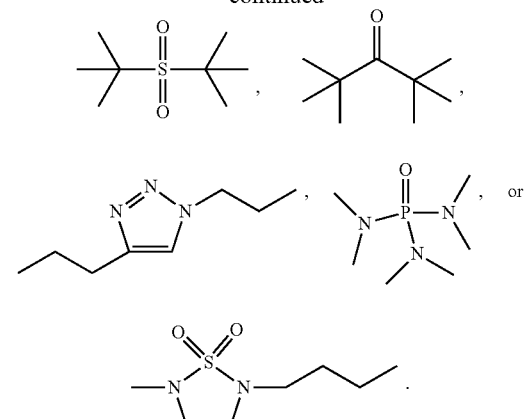

4. The composition of claim 3, wherein Y is a bond.
5. The composition of claim 3, wherein Y is a C1-C6 alkyl or alkenyl optionally interrupted by O, S or NR, where NR is N-C1-C6 alkyl.
6. A battery including a composition of claim 3.
7. A composition comprising a polyolefin including a plurality of functional groups, the functional groups including an aprotic polar group selected from the group consisting of sulfamide, sulfoxy, sulfonamide, carbonyl, phosphoramide or heterocyclic groups, and wherein the polyolefin includes a polymer block selected from the group consisting of:

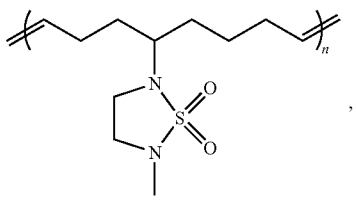

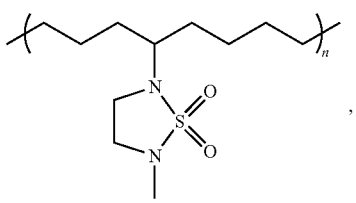

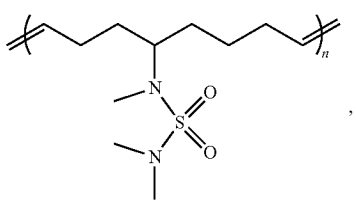

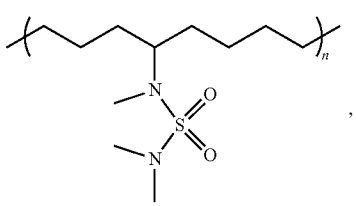

25
-continued
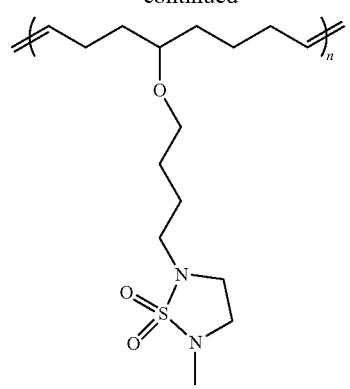
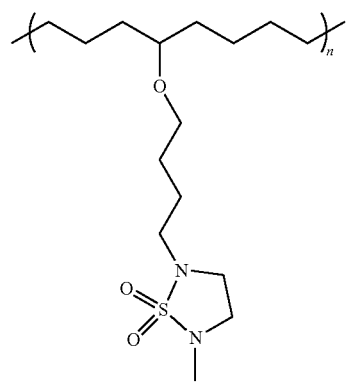
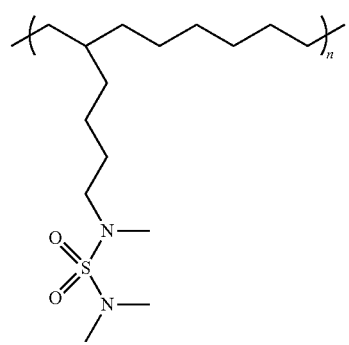
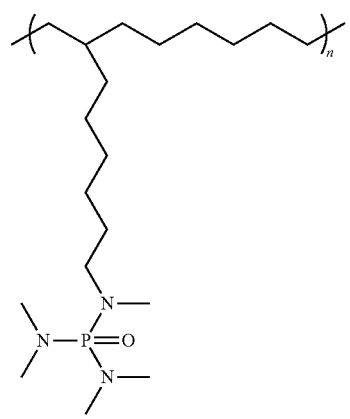
26
-continued
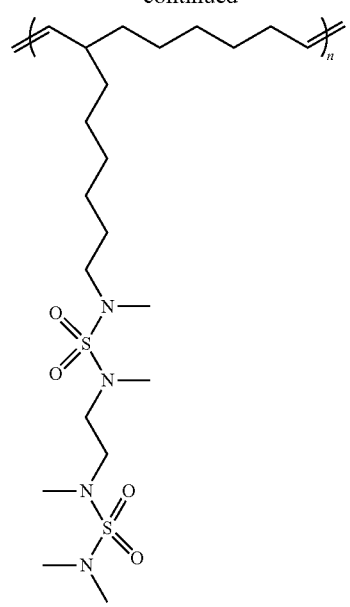
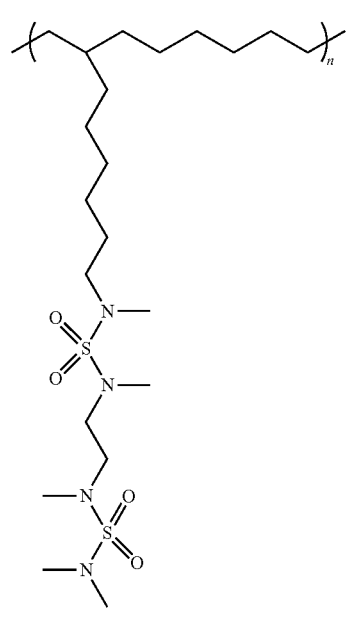
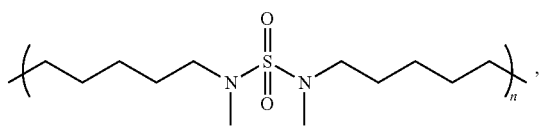
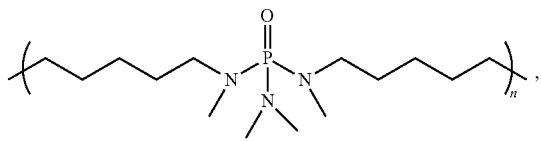
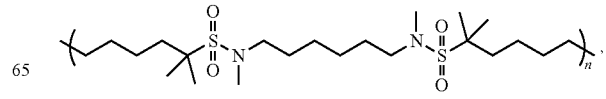

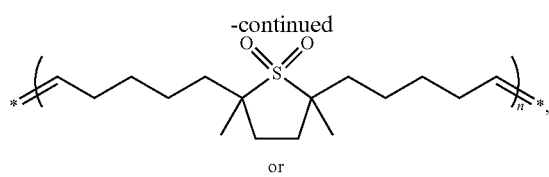
or
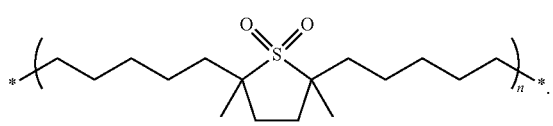

8. The composition of claim 7, wherein the polymer block is:

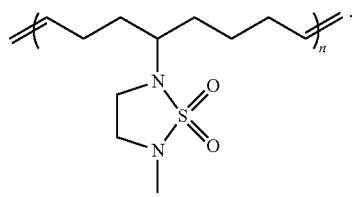

9. The composition of claim 7, wherein the polymer block is:

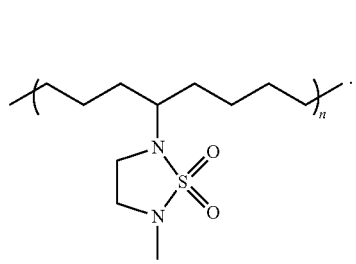

10. The composition of claim 7, wherein the polymer block is:

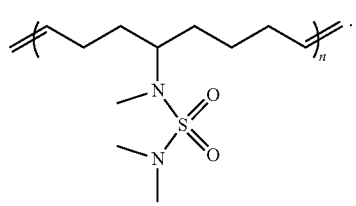

11. The composition of claim 7, wherein the polymer block is:

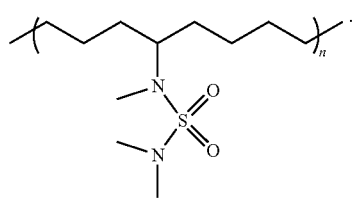

12. The composition of claim 7, wherein the polymer block is:

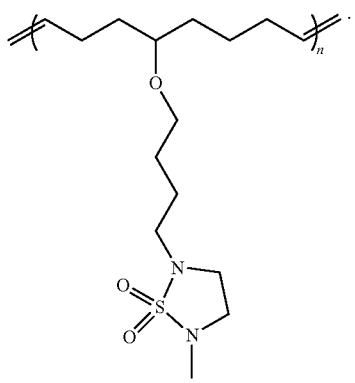

13. The composition of claim 7, wherein the polymer block is:

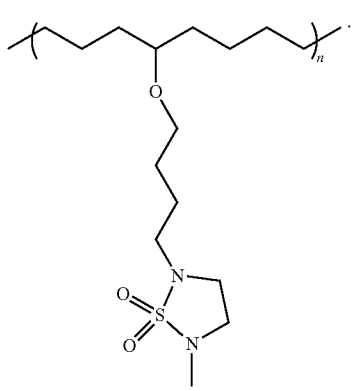

14. The composition of claim 7, wherein the polymer block is:

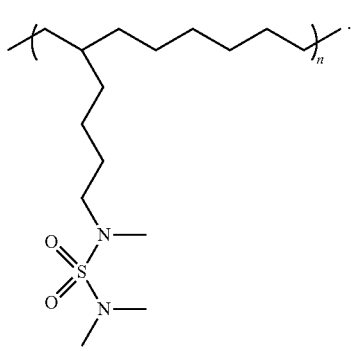

15. The composition of claim 7, wherein the polymer block is:

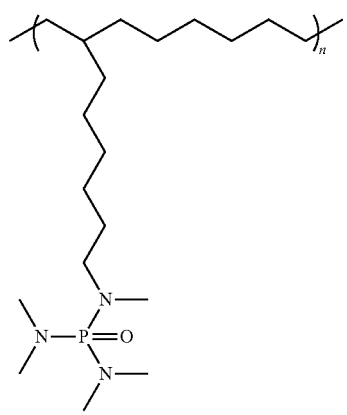

16. The composition of claim 7, wherein the polymer block is:

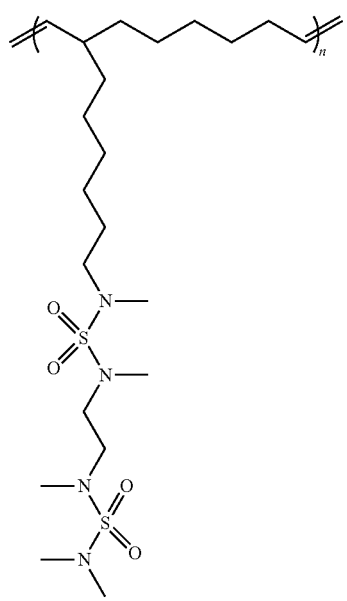

17. The composition of claim 7, wherein the polymer block is:

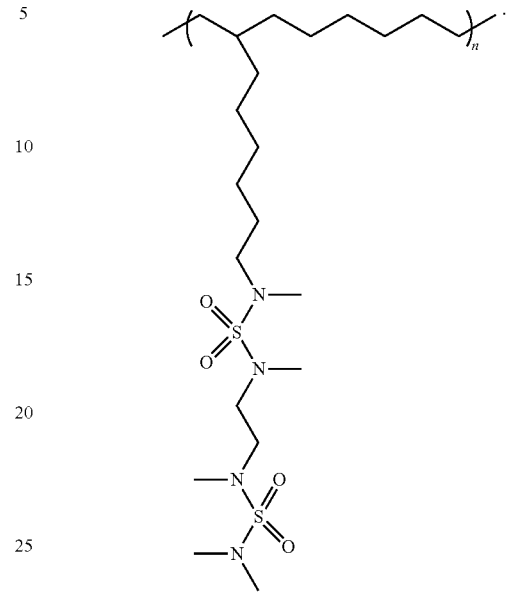

18. The composition of claim 7, wherein the polymer block is:

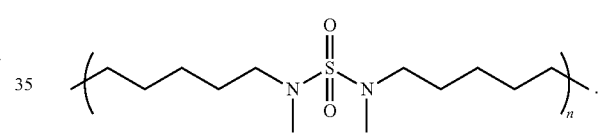

19. The composition of claim 7, wherein the polymer block is:

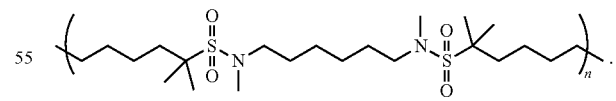

20. The composition of claim 7, wherein the polymer block is:

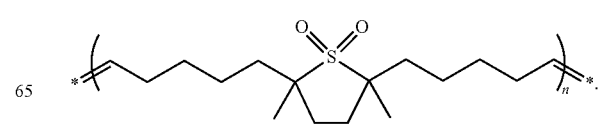

21. The composition of claim 7, wherein the polymer block is:

22. The composition of claim 7, wherein the polymer block is:

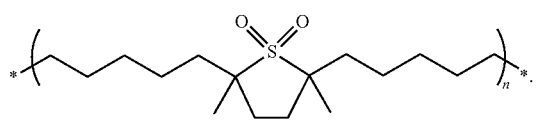

23. A battery having a composition comprising a polyolefin including a plurality of functional groups, the functional groups including an aprotic polar group selected from the group consisting of sulfamide, sulfonamide, sulfoxy, carbonyl, phosphoramide or heterocyclic groups, and wherein the polyolefin includes a polymer block selected from the group consisting of:

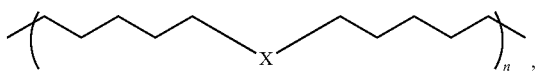

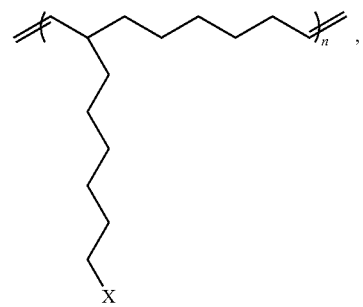

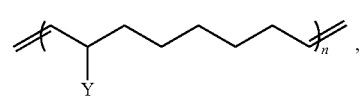

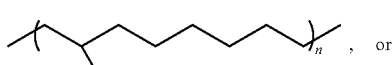, or

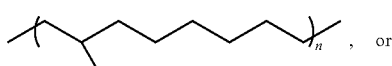

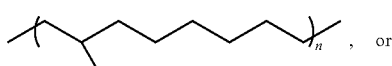

wherein n is 1 to 100,000 and X is a functional group including one or more sulfamide, sulfoxy, carbonyl, phosphoramide or heterocyclic groups, and Y is a bond or a C1-C6 alkyl or alkenyl optionally interrupted by O, S or NR, where NR is N-C1-C6 alkyl and including one or more functional group including sulfamide, sulfoxy, carbonyl, phosphoramide or heterocyclic groups.

24. The battery of claim 23, wherein the polyolefin includes a polymer block selected from the group consisting of:

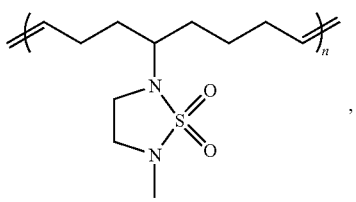

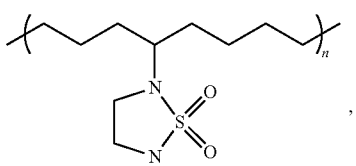

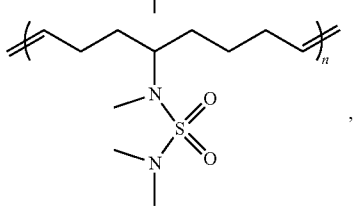

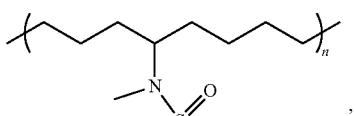

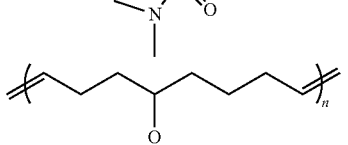

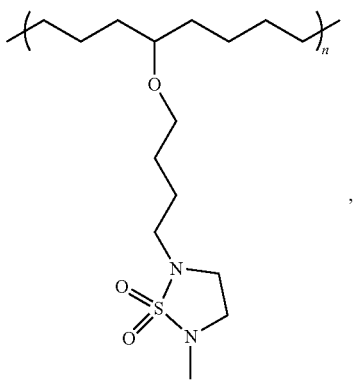

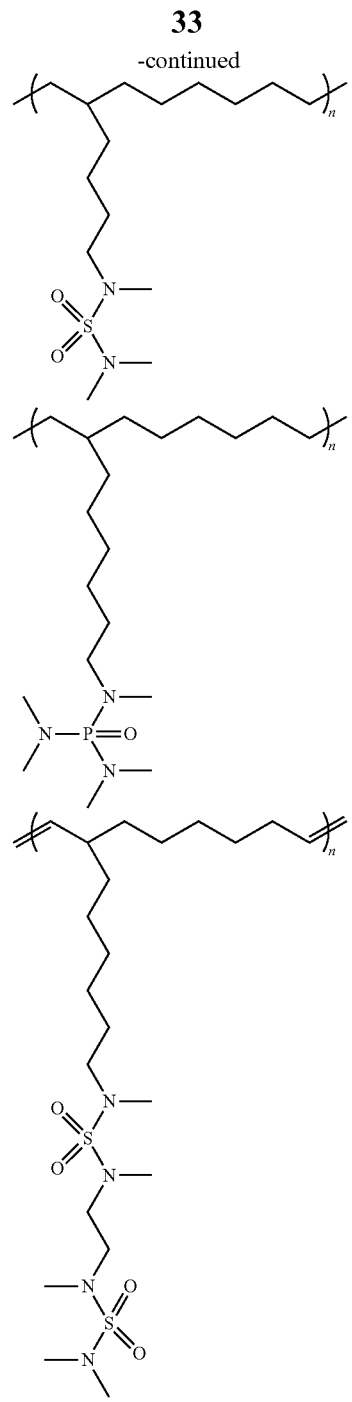
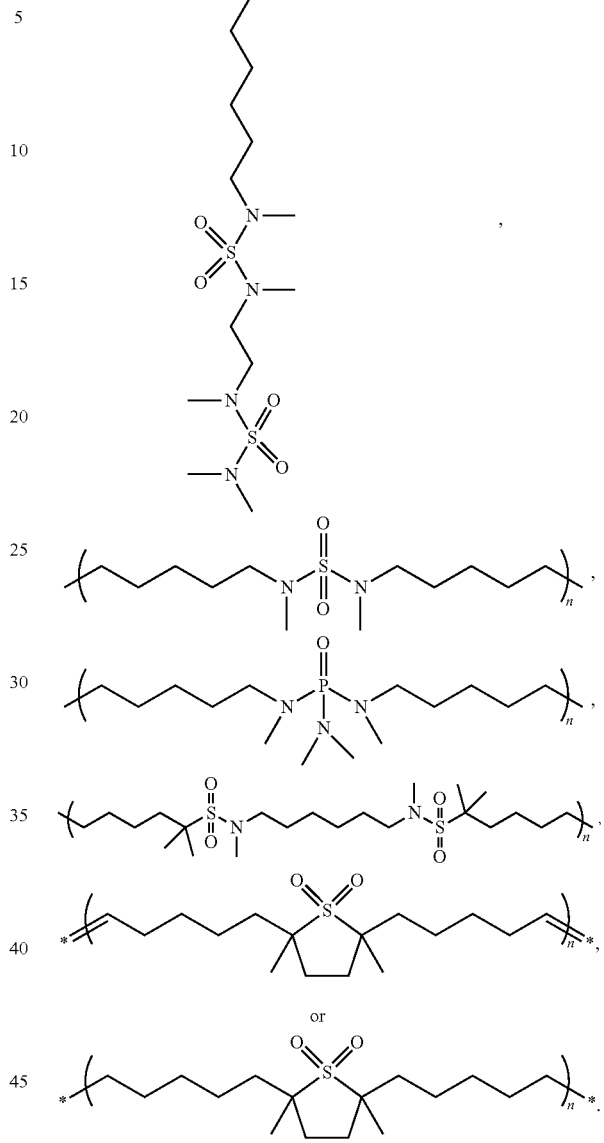
25. The battery of claim 23, further comprising a lithium salt electrolyte.
* * * * *